United States Patent
Ueda

(10) Patent No.: US 11,310,673 B2
(45) Date of Patent: Apr. 19, 2022

(54) COMMUNICATION APPARATUS, BASE STATION, TERMINAL APPARATUS, METHOD, PROGRAM, AND A NON-TRANSITORY COMPUTER READABLE RECORDING MEDIUM

(71) Applicant: NEC CORPORATION, Tokyo (JP)

(72) Inventor: Yoshio Ueda, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/963,991

(22) PCT Filed: Jan. 24, 2019

(86) PCT No.: PCT/JP2019/002346
§ 371 (c)(1),
(2) Date: Jul. 22, 2020

(87) PCT Pub. No.: WO2019/146721
PCT Pub. Date: Aug. 1, 2019

(65) Prior Publication Data
US 2021/0037391 A1    Feb. 4, 2021

(30) Foreign Application Priority Data
Jan. 29, 2018   (JP) .............................. JP2018-012422

(51) Int. Cl.
*H04W 16/14*        (2009.01)
*H04L 5/00*         (2006.01)
*H04W 28/24*        (2009.01)

(52) U.S. Cl.
CPC ........... *H04W 16/14* (2013.01); *H04L 5/0064* (2013.01); *H04L 5/0071* (2013.01); *H04W 28/24* (2013.01)

(58) Field of Classification Search
CPC .... H04L 5/0064; H04L 5/0071; H04W 16/14; H04W 28/0247; H04W 28/24
See application file for complete search history.

(56) References Cited

U.S. PATENT DOCUMENTS

2015/0003435 A1    1/2015 Horn et al.
2015/0256303 A1    9/2015 Belghoul et al.
(Continued)

FOREIGN PATENT DOCUMENTS

EP         3229520 A1    10/2017
JP       2012-49598 A     3/2012
(Continued)

OTHER PUBLICATIONS

3GPP TS 23.203 V15.1.0, "3rd Generation Partnership Project; Technical Specification Group Services and System Aspects; Policy and charging control architecture (Release 15)", Dec. 2017 (261 pages total).

(Continued)

*Primary Examiner* — Khoa Huynh
(74) *Attorney, Agent, or Firm* — Sughrue Mion, PLLC

(57) ABSTRACT

In order to make it possible to provide a good communication service even when unlicensed spectrum is used, a communication apparatus according to an example aspect of the present disclosure includes an information obtaining unit configured to obtain first control information indicating communication service quality for unlicensed spectrum, and a communication processing unit configured to transmit the first control information to a communication node which communicates in a radio access network.

20 Claims, 26 Drawing Sheets

| Field | Description |
|---|---|
| IMSI | IMSI is the main reference key. |
| MSISDN | The basic MSISDN of the UE (Presence of MSISDN is optional). |
| IMEI / IMEISV | International Mobile Equipment Identity - Software Version Number |
| External Identifier List | External Identifier(s) used in the external network(s) to refer to the subscription. See TS 23.682 [74] for more information. |
| MME Identity | The Identity of the MME currently serving this UE. |
| MME Capabilities | Indicates the capabilities of the MME with respect to core functionality e.g. regional access restrictions. |
| MS PS Purged from EPS | Indicates that the EMM and ESM contexts of the UE are deleted from the MME. |
| ODB parameters | Indicates that the status of the operator determined barring |
| Access Restriction | Indicates the access restriction subscription information. It may include different values for HPLMN and roaming case. It includes separate settings for WB-E-UTRAN and NB-IoT. |
| EPS Subscribed Charging Characteristics | The charging characteristics for the UE, e.g. normal, prepaid, flat-rate, and/or hot billing subscription. |
| Trace Reference | Identifies a record or a collection of records for a particular trace. |
| Trace Type | Indicates the type of trace, e.g. HSS trace, and/or MME/ Serving GW / PDN GW trace. |
| OMC Identity | Identifies the OMC that shall receive the trace record(s). |
| Subscribed-UE-AMBR | The Maximum Aggregated uplink and downlink MBRs to be shared across all Non-GBR bearers according to the subscription of the user. |
| APN-OI Replacement | Indicates the domain name to replace the APN OI when constructing the PDN GW FQDN upon which to perform a DNS resolution. This replacement applies for all the APNs in the subscriber's profile. See TS 23.003 [9] clause 9.1.2 for more information on the format of domain names that are allowed in this field. |
| . . . | |
| License Exempt Access Permission | Indicates whether to allow access using an unlicensed band: <br> - allow an unlicensed band <br> - not allow use of an unlicensed band <br> - use a licensed band as far as possible if resources of the licensed band is available <br> - use an unlicensed band as far as possible if resources of the unlicensed band is available |
| QoS for Unlicensed band | QoS when an unlicensed band is used |

(56) References Cited

U.S. PATENT DOCUMENTS

| | | | |
|---|---|---|---|
| 2015/0350988 | A1 | 12/2015 | Himayat et al. |
| 2016/0057689 | A1 | 2/2016 | Fujishiro et al. |
| 2016/0174078 | A1 | 6/2016 | Salem et al. |
| 2016/0330669 | A1 | 11/2016 | Li et al. |
| 2017/0041803 | A1 | 2/2017 | Shi |
| 2017/0201902 | A1* | 7/2017 | Chen ................. H04W 28/0247 |
| 2018/0192365 | A1 | 7/2018 | Feng |

FOREIGN PATENT DOCUMENTS

| | | |
|---|---|---|
| JP | 2014-230104 A | 12/2014 |
| JP | 2015-167313 A | 9/2015 |
| JP | 2016-526847 A | 9/2016 |
| JP | 2016-197796 A | 11/2016 |
| WO | 2011/050540 A1 | 5/2011 |
| WO | 2014/163138 A1 | 10/2014 |
| WO | 2015/187276 A1 | 12/2015 |

OTHER PUBLICATIONS

3GPP TS 23.401 V15.2.0, "3rd Generation Partnership Project; Technical Specification Group Services and System Aspects; General Packet Radio Service (GPRS) enhancements for Evolved Universal Terrestrial Radio Access Network (E-UTRAN) access (Release 15)", Dec. 2017 (404 pages total).

3GPP TS 23.501 V15.0.0, "3rd Generation Partnership Project; Technical Specification Group Services and System Aspects; System Architecture for the 5G System; Stage 2 (Release 15)", Dec. 2017 (181 pages total).

3GPP TS 24.008 V15.1.0, "3rd Generation Partnership Project; Technical Specification Group Core Network and Terminals; Mobile radio interface Layer 3 specification; Core network protocols; Stage 3 (Release 15)", Dec. 2017 (785 pages total).

3GPP TS 24.229 V15.1.0, "3rd Generation Partnership Project; Technical Specification Group Core Network and Terminals; IP multimedia call control protocol based on Session Initiation Protocol (SIP) and Session Description Protocol (SDP); Stage 3 (Release 15)", Dec. 2017 (999 pages total).

3GPP TS 24.301 V15.1.0, "3rd Generation Partnership Project; Technical Specification Group Core Network and Terminals; Non-Access-Stratum (NAS) protocol for Evolved Packet System (EPS); Stage 3 (Release 15)", Dec. 2017 (507 pages total).

3GPP TS 29.272 V14.3.0, "3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 14)", Mar. 2017 (162 pages total).

3GPP TS 29.281 V14.0.0, "3rd Generation Partnership Project; Technical Specification Group Core Network and Terminals; General Packet Radio System (GPRS) Tunnelling Protocol User Plane (GTPv1-U) (Release 14)", Mar. 2017 (29 pages total).

3GPP TS 32.251 V15.0.0, "3rd Generation Partnership Project; Technical Specification Group Services and System Aspects; Telecommunication management; Charging management; Packet Switched (PS) domain charging (Release 15)", Sep. 2017 (186 pages total).

3GPP TS 36.413 V15.0.0, "3rd Generation Partnership Project; Technical Specification Group Radio Access Network; Evolved Universal Terrestrial Radio Access Network (E-UTRAN); S1 Application Protocol (S1AP) (Release 15)", Dec. 2017 (367 pages total).

3GPP TS 38.300 V15.0.0, "3rd Generation Partnership Project; Technical Specification Group Radio Access Network; NR; NR and NG-RAN Overall Description; Stage 2 (Release 15)", Dec. 2017 (68 pages total).

3GPP TR 38.913 V14.3.0, "3rd Generation Partnership Project; Technical Specification Group Radio Access Network; Study on Scenarios and Requirements for Next Generation Access Technologies; (Release 14)", Jun. 2017 (39 pages total).

International Search Report dated Mar. 19, 2019 in PCT/JP2019/002346.

International Search Report dated Apr. 16, 2019 in PCT/JP2019/002347.

Extended European Search Report for EP Application No. EP19743126.5 dated Dec. 21, 2020.

3GPP draft Samsung, "LAA LBT priority classes", R1-155459, 3GPP TSG RAN WG1 #82bis, pp. 1-2, Oct. 9, 2015, Sweden.

International Preliminary Report on Patentability with the translation of Written Opinion dated Aug. 4, 2020 from the International Bureau in Application No. PCT/JP2019/002346.

International Preliminary Report on Patentability with the translation of Written Opinion dated Aug. 4, 2020 from the International Bureau in Application No. PCT/JP2019/002347.

Written Opinion of the International Searching Authority dated Mar. 19, 2019 in International Application No. PCT/JP2019/002346.

Written Opinion of the International Searching Authority dated Apr. 16, 2019 in International Application No. PCT/JP2019/002347.

LG Electronics Inc., "3GPP TSG-RAN WG2 Meeting #89bis R2-151347", Bratislava, Slovakia, Apr. 20-Apr. 24, 2015 (3 pages total).

U.S. Office Action and PTO-892 for U.S. Appl. No. 16/964.614 dated Jan. 24, 2022.

* cited by examiner

| Field | Description |
|---|---|
| IMSI | IMSI is the main reference key. |
| MSISDN | The basic MSISDN of the UE (Presence of MSISDN is optional). |
| IMEI / IMEISV | International Mobile Equipment Identity - Software Version Number |
| External Identifier List | External Identifier(s) used in the external network(s) to refer to the subscription. See TS 23.682 [74] for more information. |
| MME Identity | The Identity of the MME currently serving this UE. |
| MME Capabilities | Indicates the capabilities of the MME with respect to core functionality e.g. regional access restrictions. |
| MS PS Purged from EPS | Indicates that the EMM and ESM contexts of the UE are deleted from the MME. |
| ODB parameters | Indicates that the status of the operator determined barring |
| Access Restriction | Indicates the access restriction subscription information. It may include different values for HPLMN and roaming case. It includes separate settings for WB-E-UTRAN and NB-IoT. |
| EPS Subscribed Charging Characteristics | The charging characteristics for the UE, e.g. normal, prepaid, flat-rate, and/or hot billing subscription. |
| Trace Reference | Identifies a record or a collection of records for a particular trace. |
| Trace Type | Indicates the type of trace, e.g. HSS trace, and/or MME/ Serving GW / PDN GW trace. |
| OMC Identity | Identifies the OMC that shall receive the trace record(s). |
| Subscribed-UE-AMBR | The Maximum Aggregated uplink and downlink MBRs to be shared across all Non-GBR bearers according to the subscription of the user. |
| APN-OI Replacement | Indicates the domain name to replace the APN OI when constructing the PDN GW FQDN upon which to perform a DNS resolution. This replacement applies for all the APNs in the subscriber's profile. See TS 23.003 [9] clause 9.1.2 for more information on the format of domain names that are allowed in this field. |
| . . . | |
| License Exempt Access Permission | Indicates whether to allow access using an unlicensed band:<br>- allow an unlicensed band<br>- not allow use of an unlicensed band<br>- use a licensed band as far as possible if resources of the licensed band is available<br>- use an unlicensed band as far as possible if resources of the unlicensed band is available |
| QoS for Unlicensed band | QoS when an unlicensed band is used |

Figure 11

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | M | | 9.2.1.20 | | YES | reject |
| UE Aggregate Maximum Bit Rate for Unlicensed band | O | | 9.x.y.z1 | | YES | ignore |
| E-RAB to Be Setup List | | 1 | | | YES | reject |
| >E-RAB to Be Setup Item IEs | | 1.. <maxnoofE-RABs> | | | EACH | reject |
| >>E-RAB ID | M | | 9.2.1.2 | | - | - |
| >>E-RAB Level QoS Parameters | M | | 9.2.1.15 | Includes necessary QoS parameters. | - | - |
| >>Transport Layer Address | M | | 9.2.2.1 | | - | - |
| >>GTP-TEID | M | | 9.2.2.2 | | - | - |
| >>NAS-PDU | O | | 9.2.3.5 | | | |
| >>Correlation ID | O | | 9.2.1.80 | | YES | ignore |
| >>SIPTO Correlation ID | O | | Correlation ID 9.2.1.80 | | YES | ignore |
| >>Bearer Type | O | | 9.2.1.116 | | YES | reject |
| >> License exempt access profile | O | | 9.x.y.z2 | | YES | ignore |
| >> E-RAB Level QoS Parameters for Unlicensed band | O | | 9.x.y.z3 | Includes necessary QoS parameters for unlicensed band | YES | ignore |

Figure 12

9.x.y.z1  UE Aggregate Maximum Bit Rate for Unlicensed band
The UE Aggregate Maximum Bitrate is applicable for all Non-GBR bearers per UE which is defined for the Downlink and the Uplink direction and provided by the MME to the eNB <u>using unlicensed band</u>.

| IE/Group Name | Presence | Range | IE type and reference | Semantics description |
|---|---|---|---|---|
| UE Aggregate Maximum Bit Rate | | | | Applicable for non-GBR E-RABs <u>using Unlicensed band</u>. |
| >UE Aggregate Maximum Bit Rate Downlink | M | | Bit Rate 9.2.1.19 | This IE indicates the UE Aggregate Maximum Bit Rate as specified in TS 23.401 [11] in the downlink direction <u>using Unlicensed band</u>. |
| >UE Aggregate Maximum Bit Rate Uplink | M | | Bit Rate 9.2.1.19 | This IE indicates the UE Aggregate Maximum Bit Rate <u>using Unlicensed band</u>. as specified in TS 23.401 [11] in the uplink direction. Receiving both the *UE Aggregate Maximum Bit Rate Downlink* IE and the *UE Aggregate Maximum Bit Rate Uplink* IE equal to value zero shall be considered as a logical error by the eNB. |

Figure 13

9.x.yz3  E-RAB Level QoS Parameters for Unlicensed band
This IE defines the QoS to be applied to an E-RAB for Unlicensed band.

| IE/Group Name | Presence | Range | IE type and reference | Semantics description |
|---|---|---|---|---|
| E-RAB Level QoS Parameters | | | | |
| >QCI for Unlicensed band | O | | INTEGER (0..255) | QoS Class Identifier defined in TS 23.401 [11]. Coding specified in TS 23.203 [13]. |
| >Allocation and Retention Priority for Unlicensed band | O | | 9.2.1.60 | |
| >GBR QoS Information for Unlicensed band | O | | 9.2.1.18 | This IE applies to GBR bearers only and shall be ignored otherwise. |
| Packet Delay Budget for Unlicensed band | O | | INTEGER (0..65534) | Acceptable delay in unlicensed bands. (millisecond) |
| Packet Error Loss Rate for Unlicensed band | O | | ENUMERATED($10^{-2}$, $10^{-3}$, $10^{-4}$, $10^{-5}$, $10^{-6}$, $10^{-7}$, $10^{-8}$, $10^{-9}$) | Packet error rate in unlicensed bands. |

Figure 14

9.x.y.z2   License exempt access profile

| IE/Group Name | Presence | Range | IE type and reference | Semantics description |
|---|---|---|---|---|
| License exempt access profile | M | | ENUMERATED(Only License exempt access allowed, License exempt access not allowed, License access preferred, License exempt access preferred,....) | |

Figure 15

– LogicalChannelConfig

The IE *LogicalChannelConfig* is used to configure the logical channel parameters.

LogicalChannelConfig information element

```
-- ASN1START

LogicalChannelConfig ::=        SEQUENCE {
    ul-SpecificParameters           SEQUENCE {
        priority                        INTEGER (1..16),
        prioritisedBitRate              ENUMERATED {
                                            kBps0, kBps8, kBps16, kBps32, kBps64, kBps128,
                                            kBps256, infinity, kBps512-v1020, kBps1024-v1020,
                                            kBps2048-v1020, spare5, spare4, spare3, spare2,
                                            spare1},
        bucketSizeDuration              ENUMERATED {
                                            ms50, ms100, ms150, ms300, ms500, ms1000, spare2,
                                            spare1},
        logicalChannelGroup             INTEGER (0..3)                              OPTIONAL    -- Cond UL
    }                                                                               OPTIONAL,   -- Need OR
    ...,
    [[ logicalChannelSR-Mask-r9         ENUMERATED {setup}                          OPTIONAL    -- Cond SRmask
    ]],
    [[ logicalChannelSR-Prohibit-r12    BOOLEAN                                     OPTIONAL    -- Need ON
    ]],
    [[ laa-UL-Allowed-r14               BOOLEAN                                     OPTIONAL,   -- Need ON
       bitRateQueryProhibitTimer-r14 ENUMERATED {
                                            s0, s0dot4, s0dot8, sldot6, s3, s6, s12,
                                            s30}                                    OPTIONAL,   --Need OR
       laa-DL-Allowed-rxx               BOOLEAN                                     OPTIONAL,   -- Need ON
       dl-CarrierFreq-rxx               ARFCN-ValueEUTRA-rxx                        OPTIONAL,   -- Need ON
       QoS-unlicensed-band-rxx          QoS-Unlicensed-band-rxx                     OPTIONAL,   -- Need ON
    ]]
}
```

Figure 16

*laa-UL-Allowed*
Indicates whether the data of a logical channel is allowed to be transmitted via UL of LAA SCells or PSCell. Value *TRUE* indicates that the logical channel is allowed to be sent via UL of LAA SCells or PSCell. Value *FALSE* indicates that the logical channel is not allowed to be sent via UL of LAA SCells or PSCell.

Figure 17

| Next Extension Header Field Value | Type of Extension Header |
|---|---|
| 0000 0000 | No more extension headers |
| 0000 0001 | Reserved - Control Plane only. |
| 0000 0010 | Reserved - Control Plane only. |
| 0010 0000 | Service Class Indicator |
| 0100 0000 | UDP Port. Provides the UDP Source Port of the triggering message. |
| 1000 0001 | RAN Container |
| 1000 0010 | Long PDCP PDU Number |
| 1100 0000 | PDCP PDU Number [4]-[5]. See NOTE 1. |
| ... | |
| 1100 0101 | License exempt access |

NOTE 1: As an exception to the comprehension rule specified above, for a G-PDU with a Next Extension Header Field set to the value "1100 0000", the SGW shall consider this corresponding extension header as 'comprehension not required'.

Figure 20

COMMUNICATION APPARATUS, BASE STATION, TERMINAL APPARATUS, METHOD, PROGRAM, AND A NON-TRANSITORY COMPUTER READABLE RECORDING MEDIUM

CROSS REFERENCE TO RELATED APPLICATIONS

This application is a National Stage of International Application No. PCT/JP2019/002346 filed Jan. 24, 2019, claiming priority based on Japanese Patent Application No. 2018-012422, filed Jan. 29, 2018 the entire disclosures of which are incorporated herein

BACKGROUND

Technical Field

The present disclosure relates to a communication apparatus, a base station, a terminal apparatus, a method, a program, and a non-transitory computer readable recording medium.

Background Art

Traffic has increased rapidly in recent mobile communication networks. In Long Term Evolution (LTE), a method using unlicensed spectrum is being studied in order to increase radio capacity and increase data rates.

In Third Generation Partnership Project (3GPP), License-Assisted Access (LAA), LTE-WLAN aggregation (LWA) and LTE WLAN Radio Level Integration with IPsec Tunnel (LWIP) is being studied for Release 13 as methods using unlicensed spectrum. In addition, in LTE-U Forum, Long Term Evolution Unlicensed (LTE-U) is being studied as a method using unlicensed spectrum. Furthermore, in MuLTEFire forum, LTE system (MuLTEFire) for independently operating using unlicensed spectrum is being studied.

For example, PTL 1 discloses that a control apparatus transmits, to a base station, information indicating whether to perform data communication using only a licensed band, perform data communication using only an unlicensed band, or perform data communication using both a licensed band and an unlicensed band. In addition, PTL 1 discloses that a control apparatus also transmits, to a base station, information indicating quality of service (QoS) of a bearer.

CITATION LIST

Patent Literature

[PTL 1] JP 2016-197796 A

SUMMARY

Technical Problem

However, in a technology disclosed in PLT 1, for example, the same QoS (e.g. a relatively high QoS) with data communication using licensed spectrum may be required for data communication using unlicensed spectrum because a QoS is common between licensed spectrum and unlicensed spectrum. Therefore, for example, traffic in unlicensed spectrum may be increased and unlicensed spectrum may be congested. As a result, it may be difficult to achieve a QoS which is essentially needed for unlicensed spectrum.

An example object of the present disclosure is to provide a communication apparatus, a base station and a terminal apparatus which make it possible to provide a good communication service even when unlicensed spectrum is used.

Solution to Problem

A communication apparatus according to an example aspect of the present disclosure includes an information obtaining unit configured to obtain first control information indicating communication service quality for unlicensed spectrum, and a communication processing unit configured to transmit the first control information to a communication node which communicates in a radio access network.

A base station according to an example aspect of the present disclosure includes a first communication processing unit configured to receive first control information indicating communication service quality for unlicensed spectrum, and a second communication processing unit configured to perform, based on the first control information, control of radio communication using unlicensed spectrum.

A terminal apparatus according to an example aspect of the present disclosure includes a communication processing unit configured to receive first control information indicating communication service quality for unlicensed spectrum, and a measurement unit configured to perform, based on the first control information, measurement for achievement status of the communication service quality in unlicensed spectrum.

A first method according to an example aspect of the present disclosure includes obtaining first control information indicating communication service quality for unlicensed spectrum, and transmitting the first control information to a communication node which communicates in a radio access network.

A second method according to an example aspect of the present disclosure includes receiving first control information indicating communication service quality for unlicensed spectrum, and performing, based on the first control information, control of radio communication using unlicensed spectrum.

A third method according to an example aspect of the present disclosure includes receiving first control information indicating communication service quality for unlicensed spectrum, and performing, based on the first control information, measurement for achievement status of the communication service quality in unlicensed spectrum.

A first program according to an example aspect of the present disclosure is a program that causes a processor to execute obtaining first control information indicating communication service quality for unlicensed spectrum, and transmitting the first control information to a communication node which communicates in a radio access network.

A second program according to an example aspect of the present disclosure is a program that causes a processor to execute receiving first control information indicating communication service quality for unlicensed spectrum, and performing, based on the first control information, control of radio communication using unlicensed spectrum.

A third program according to an example aspect of the present disclosure is a program that causes a processor to execute receiving first control information indicating communication service quality for unlicensed spectrum, and performing, based on the first control information, measurement for achievement status of the communication service quality in unlicensed spectrum.

A first non-transitory computer readable recording medium according to an example aspect of the present disclosure is a non-transitory computer readable recording medium having recorded thereon a program that causes a processor to execute obtaining first control information indicating communication service quality for unlicensed spectrum, and transmitting the first control information to a communication node which communicates in a radio access network.

A second non-transitory computer readable recording medium according to an example aspect of the present disclosure is a non-transitory computer readable recording medium having recorded thereon a program that causes a processor to execute receiving first control information indicating communication service quality for unlicensed spectrum, and performing, based on the first control information, control of radio communication using unlicensed spectrum.

A third non-transitory computer readable recording medium according to an example aspect of the present disclosure is a non-transitory computer readable recording medium having recorded thereon a program that causes a processor to execute receiving first control information indicating communication service quality for unlicensed spectrum, and performing, based on the first control information, measurement for achievement status of the communication service quality in unlicensed spectrum.

Advantageous Effects of Invention

According to an example aspect of the present disclosure, it is possible to provide a good communication service even when unlicensed spectrum is used. Note that the present disclosure may exert other advantageous effects instead of the above advantageous effects or together with the above advantageous effects.

BRIEF DESCRIPTION OF THE DRAWINGS

FIG. 11 is an explanatory diagram illustrating an example of subscriber information stored in a third core network node.

FIG. 12 is an explanatory diagram illustrating an example of an INITIAL CONTEXT SETUP REQUEST message according to a first example embodiment.

FIG. 13 is an explanatory diagram illustrating an example of UE Aggregate Maximum Bit Rate for Unlicensed band according to a first example embodiment.

FIG. 14 is an explanatory diagram illustrating an example of E-RAB Level QoS Parameters for Unlicensed band according to a first example embodiment.

FIG. 15 is an explanatory diagram illustrating an example of License Exempt Access Profile according to a first example embodiment.

FIG. 16 is an explanatory diagram illustrating an example of LogicalChannelConfig according to a first example embodiment.

FIG. 17 is an explanatory diagram illustrating an example of laa-DL-Allowed-rxx according to a first example embodiment.

FIG. 20 is an explanatory diagram illustrating an example of a GTP header according to a second example modification of a first example embodiment.

DESCRIPTION OF THE EXAMPLE EMBODIMENTS

Figure 1:
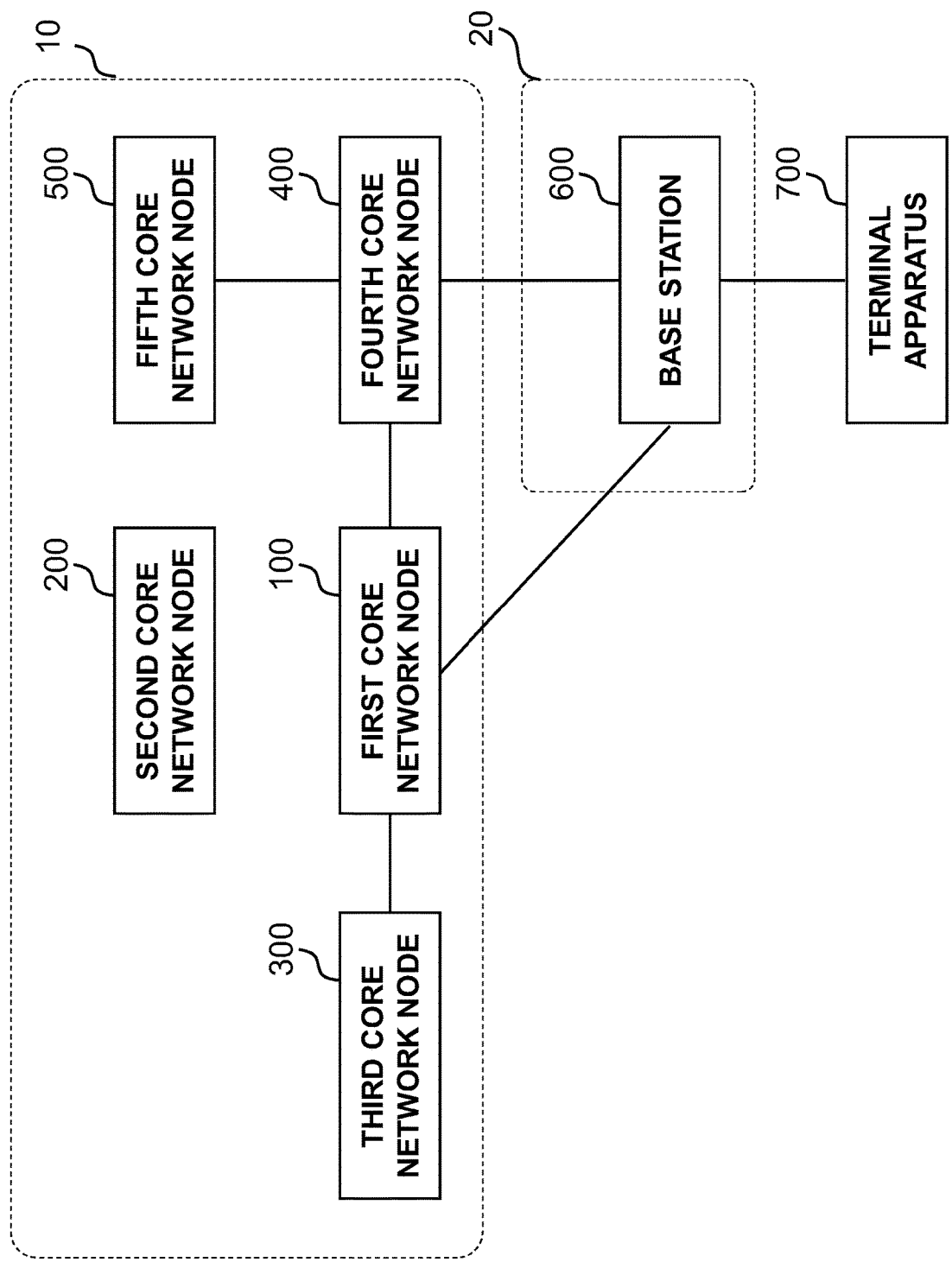
FIG. 1 is an explanatory diagram illustrating an example of a schematic configuration of a system according to a first example embodiment.

Example embodiments of the present disclosure will be described below in detail with reference to the accompanying drawings. Note that, in the present description and drawings, elements to which the same or similar descriptions are applicable are denoted by the same reference signs, whereby overlapping descriptions may be omitted.

Description will be given in the following order.
1. Related Art
2. First Example Embodiment
  2.1. Configuration of System
  2.2. Configuration of Each Node
    2.2.1. Configuration of First Core Network Node
    2.2.2. Configuration of Second Core Network Node
    2.2.3. Configuration of Third Core Network Node 2.2.4. Configuration of Fourth Core Network Node
2.2.5. Configuration of Fifth Core Network Node
2.2.6. Configuration of Base Station
2.2.7. Configuration of Terminal Apparatus
2.3. Technical Features
2.4. First Example Modification
2.5. Second Example Modification
3. Second Example Embodiment
3.1. Configuration of System
3.2. Configuration of Communication Apparatus
3.3. Technical Features
4. Third Example Embodiment
4.1. Configuration of System
4.2. Configuration of Each Node
4.2.1. Configuration of Terminal Apparatus
4.2.2. Configuration of Base Station
4.2.3. Configuration of Core Network Node
4.3. Technical Features <<<1. Related Art>>>

Methods using unlicensed spectrum and so on is described as arts related to example embodiments of the present disclosure.

(1) Methods using Unlicensed Spectrum

Unlicensed spectrum is spectrum usable without obtaining a radio wave license (i.e. spectrum for which no license is required). A term "unlicensed band" may be used instead of "unlicensed spectrum". There are for example spectrum of 2.4 MHz band, spectrum of 5 MHz band and so on as unlicensed spectrum.

There is wireless local area network (WLAN) communication using 2.4 MHz band or 5 MHz band as an example of radio communication using unlicensed spectrum. Radio communication using unlicensed spectrum may be called as License Exempt Access.

There are LAA, LTE-U, LWA, LWIP, RCLWI, MuLTE-Fire and so on as methods using unlicensed spectrum in LTE.

(2) License-Assisted Access (LAA)

Telecommunication carriers are considering expanding existing LTE-Advanced (LTE-A) with unlicensed spectrum. In 3GPP Release 13, a method called LAA is being studied. In LAA, it is possible to apply carrier aggregation (CA) of LTE to a combination of licensed spectrum and unlicensed spectrum (e.g. spectrum of 5 GHz frequency band).

As a method of LAA is based on technologies of LTE, it is possible to use Evolved Packet Core (EPC), an authentication method and an operation and maintenance system as well as LTE. Note, however, that it is necessary to consider required conditions of regulations of each country for unlicensed spectrum of 5 GHz band. For example, there are regulations on available channels, transmission power and so on for WLAN products which uses 5 GHz band. In addition, Listen Before Talk (LBT) is needed in order to avoid interference with other communication methods in unlicensed spectrum of 5 GHz band. In LBT, apparatuses perform Clear Channel Assessment (CCA) before using channels of unlicensed spectrum. There is Carrier Sense Multiple Access/Collision Avoidance (CSMA/CA) of WLAN as one example of LBT. Measurement for unlicensed spectrum is performed in order to confirm whether unlicensed spectrum is idle (i.e. whether other communication is being performed in unlicensed spectrum).

In addition, unlicensed spectrum (spectrum of 5 GHz band in particular) are already used for radio communication of WiFi (WLAN). When LTE services in 5 GHz band is initiated by LAA, it is not desirable to greatly influence communication of WiFi side. Therefore, LBT is performed in LAA. That is, a base station or a terminal apparatus monitors or listens to usage status of a channel before initiating communication. In addition, when a base station or a terminal apparatus communicate using a channel, a burst length (communication time) is limited to a short length (e.g. within 4 msec in Japan). Note that regulations for unlicensed spectrum are different among countries.

In LAA, fair coexistence with WiFi is realized by applying LBT to communication in a secondary cell (SCell) as well as WiFi. LBT is applied among communication (communication in a SCell in LAA) of different mobile network operators (MNOs). This realizes fairness among mobile network operators. Furthermore, a function of Dynamic Frequency Selection (DFS) is needed for communication in 5 GHz band. DFS is a function which changes a used channel so that communication of WLAN does not influence weather radar and so on. As a channel used by WLAN in 5 GHz band overlaps spectrum used by each type of existing radar, an access point which uses this channel always monitors interference waves of radars and so on and performs channel switch from the channel to another channel if the interference waves are detected. Such a DFS is an essential function for a WLAN access point supporting 5 GHz band as well as a transmit power control (TPC) function which adjusts powers of the access point in response to wave status. DFS and TPC are needed when unlicensed spectrum (e.g. spectrum of 5 GHz band) is used by LAA in LTE.

Realization of LAA makes it possible to increase capacity of small cells and perform high speed communication as a lot of unlicensed spectrum can be used in 5 GHz band (e.g. more than 600 MHz in Europe). Thus, mobile network operators are seeking introduction of LAA. Communication service in 5 GHz band enables subscribers of LTE to enjoy services with higher data rates.

In carrier aggregation it is possible to use licensed spectrum as a primary cell (PCell) and use unlicensed spectrum as a secondary cell (SCell).

(3) Long Term Evolution Unlicensed (LTE-U)

LTE-U is a communication method defined as a standard in LTE-U Forum, and is a method which is compatible with 3GPP REL10/REL11/REL12 and satisfy regulations of the USA. Note that Listen Before Talk (LBT) before radio wave emission in 5 GHz band is not necessary in the USA. In LTE-U, carrier aggregation (CA) in supplementary downlink (SDL) spectrum is performed using a licensed band and an unlicensed band of 5 GHz band as well as LAA.

(4) LTE-WLAN Aggregation (LWA)

Radio level aggregation by LTE and wireless local area network (WLAN) is realized by performing IEEE 802.11 (IEEE802.11a/b/g/n/ac and so on) based WLAN communication in unlicensed spectrum and performing LTE communication in licensed spectrum. For LWA, a case in which a device of LTE and a device of WLAN co-exist in one apparatus, and a case in which a device of LTE and a device of WLAN non-co-exist are being studied.

(5) LTE/WLAN Radio Level Integration with IPsec Tunnel (LWIP)

LWIP is a method combining LTE and radio resources of WLAN using Security Architecture for Internet Protocol (IPsec) tunnel. Data of a bearer is transmitted and received using one IPsec tunnel per user equipment (UE). Each IPsec tunnel is located over GPRS Tunneling Protocol for User Plane (GTP-U) and Xw interface. Each data bearer is configured so that only downlink data, only uplink data, or both downlink data and uplink data is transmitted and received through an IPsec tunnel.

(6) RAN Controlled WLAN Interworking (RCLWI)

While a UE is connected by LTE, control of traffic between an E-UTRAN and a WLAN is performed. The E-UTRAN can instruct the UE to move traffic from an E-UTRAN side to a WLAN side or from a WLAN side to an E-UTRAN side by transmitting a steering command to the UE.

(7) Carrier Aggregation (CA)

Carrier Aggregation (CA) is a function that increases a bandwidth by aggregating a plurality of component carriers (CCs) of the same eNB. A UE establishes one radio resource control (RRC) connection. The UE transmits mobility information of non-access stratum (NAS) in a serving cell at the time of an RRC connection establishment/reestablishment or a handover. This serving cell is called as a primary cell (PCell). It is possible to configure a plurality of SCells for the PCell in response to capability of the UE. While up to 5 CCs can be aggregated in 3GPP Release 12, up to 32 CCs can be aggregated by extension in 3GPP Release 13.

(8) Policy and Charging Control (PCC)

In architecture of Policy and Charging Control (PCC), a policy and Charging Rules Function (PCRF) performs determination for policy and charging using configuration of a mobile network operator, charging information of users, service information and so on. The PCRF notifies a PCEF of determination of PCC in the form of PCC rules. PCC rules include service data flow (SDF) information enabling identification of IP traffic, charging information for charging for traffic, QoS information to be applied to IP traffic, and so on.

(9) New Radio (NR)

NR is a mobile communication method of fifth generation (5G), and targets communication rate of 10 Gbps or more, low latency of 1 millisecond from end to end, and reliability of 99.999%. Use of a high frequency band such as 28 GHz and a frequency band of 6 GHz or less is assumed.

(10) Voice over LTE (VoLTE)

For Voice over LTE (VoLT) which is one of IMS services, it is necessary to guarantee QoS in the whole network in order to achieve voice communication with high quality as prescribed in GSMA IR.92. In particular, it is necessary, in a radio part, to reserve a bandwidth for communication at admission control and to perform allocation of resource blocks (RBs) considering a Guaranteed Bit Rate (GBR) in packet scheduling of LTE, in order to guarantee the GBR.

(11) Others

A function called 3GPP PS Data off is defined in 3GPP TS 23.401 and 3GPP TS 24.22. This function enables users to select whether to use a 3GPP access method. Note that this function is not a function which enables users to select whether to use an access method using an unlicensed band (License Exempt Access) in a 3GPP access method.

In 3GPP TS 36.413, a Mobility Management Entity (MME) can not indicate an eNB whether to use licensed spectrum or unlicensed spectrum in terms of QoS. In addition, even if use of unlicensed spectrum is advantageous for users in terms of charging, the users cannot select use of unlicensed spectrum (i.e. LAA, LWA, LWIP, RCLWI, LTE-U or the like) in a 3GPP access method.

In 3GPP TS 36.413, a Subscriber Profile ID for RAT/Frequency priority is defined. However, this information is applied to all radio bearers. Therefore, this information cannot indicate a mapping/correspondence relation between radio bearers and spectrums. For example, if a base station uses a plurality of spectrums by carrier aggregation (CA), dual connectivity or the like, the base station cannot know, from the information, a mapping/correspondence relation between radio bearers and spectrums.

<<<2. First Example Embodiment>>>

Subsequently, a first example embodiment of the present disclosure will be described with reference to FIG. 1 to FIG. 20.

<<2.1. Configuration of System>>

Firstly, a system 1 according to the first example embodiment is described with reference to FIG. 1 to FIG. 3. FIG. 1 is an explanatory diagram illustrating an example of a schematic configuration of the system 1 according to the first example embodiment of the present disclosure. Referring to FIG. 1, the system 1 includes a first core network node 100, a second core network node 200, a third core network node 300, a fourth core network node 400, a fifth core network node 500, a base station 600 and a terminal apparatus 700.

The system 1 is a mobile communication system (or cellular system) and includes a core network 10 and a radio access network 20.

The first core network node 100, the second core network node 200, the third core network node 300, the fourth core network node 400 and the fifth core network node 500 are nodes included in the core network 10.

For example, the first core network node 100 is a node responsible for control plane functions. More specifically, for example, the first core network node 100 performs mobility management, session management and/or service management. For example, the first core network node 100 transmits control information to the base station 600, and receives control information from the base station 600. In addition, for example, the first core network node 100 transmits a non-access stratum (NAS) message to the terminal apparatus 700 via the base station 600, and receives a NAS message from the terminal apparatus 700 via the base station 600.

For example, the second core network node 200 performs control for quality of service (QoS) of user data transmission and/or control for charging.

For example, the third core network node 300 is a node which stores subscriber information.

For example, the fourth core network node 400 and the fifth core network node 500 are nodes responsible mainly for user plane functions. For example, the fourth core network node 400 and the fifth core network node 500 performs user data forwarding. The fourth core network node 400 and the fifth core network node 500 may be different nodes or may be one node.

The base station 600 is a node included in the radio access network 20. The base station 600 performs radio communication with a terminal apparatus (e.g. the terminal apparatus 700) located within its own coverage area. Particularly in first example embodiment, the base station 600 performs radio communication with the terminal apparatus 700 using licensed spectrum and/or unlicensed spectrum.

Note that licensed spectrum may be called as a licensed band and unlicensed spectrum may be called as an unlicensed band. That is, in the descriptions of the first example embodiment (and the other embodiments), "licensed spectrum" and "unlicensed spectrum" may be replaced with "a licensed band" and "an unlicensed band" respectively.

(1) Case of 4G System

For example, the system 1 is a fourth generation (4G) system of 3GPP (i.e. Evolved Packet System (EPS) or LTE system). FIG. 2 is an explanatory diagram illustrating an example of a case where the system 1 is a 4G system of 3GPP.

For example, the core network 10 is Evolved Packet Core (EPC). Furthermore, for example, the first core network node 100 is a Mobility Management Entity (MME), the second core network 200 is a PCRF, the third core network node 300 is a Home Subscriber Server (HSS), the fourth core network node 400 is a Serving Gateway (S-GW), and the fifth core network node 500 is a Packet Data Network Gateway (P-GW).

For example, the radio access network 20 is an Evolved UMTS Terrestrial Radio Access Network (E-UTRAN). Furthermore, for example, the base station 600 is an evolved Node B (eNB), and the terminal apparatus 700 is a User Equipment (UE).

Figure 2:
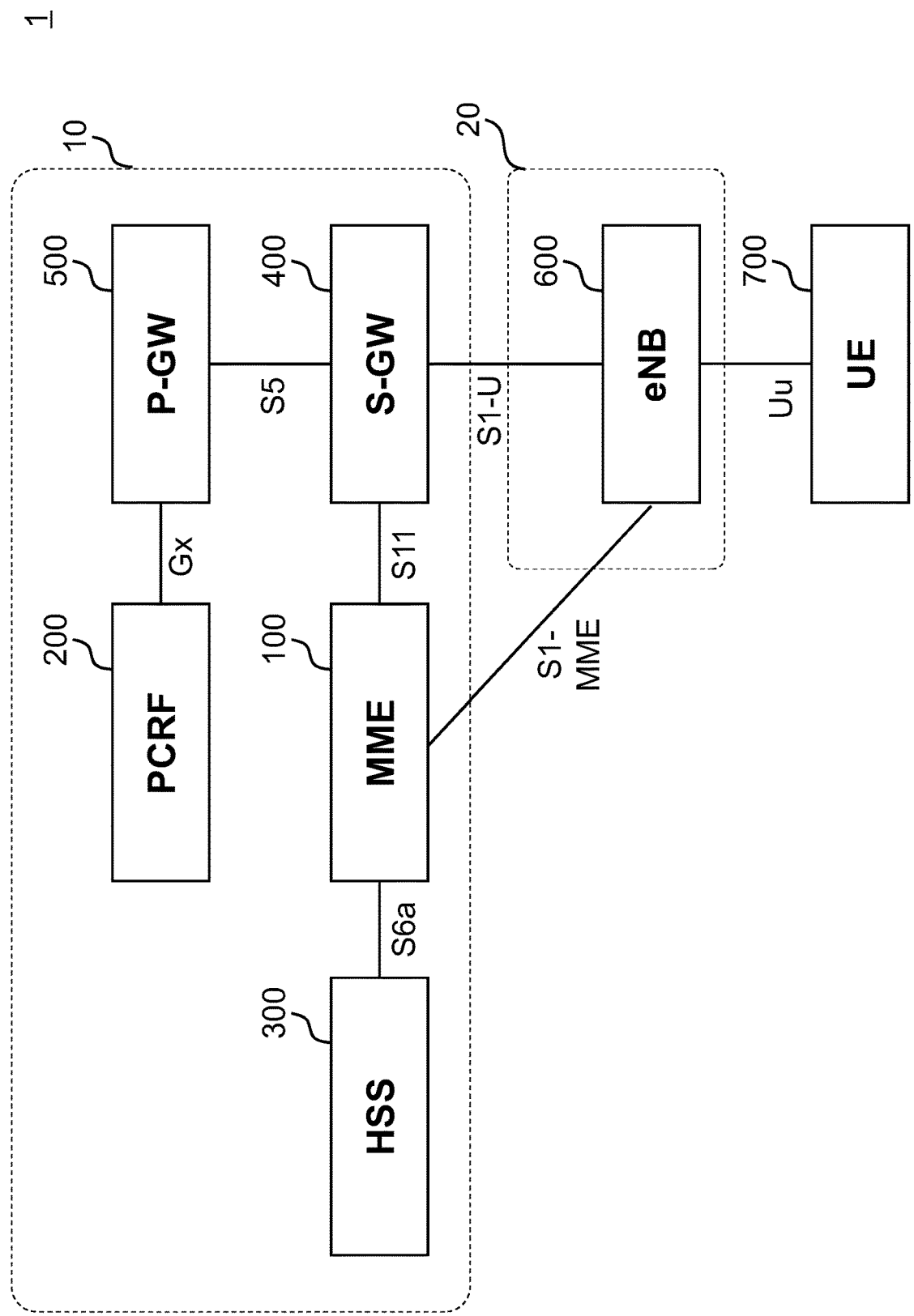
FIG. 2 is an explanatory diagram illustrating an example of a case where a system according to a first example embodiment is a 4G system of 3GPP.

As illustrated in FIG. 2, for example, interfaces between nodes are called as Uu, S1-MME, S1-U, S5, S6a and Gx.

For example, the P-GW500 has an interface function between the EPC and an external packet data network (PDN). In addition, in the S-GW 400 and the P-GW 500, user data forwarding is performed and information on charging is collected. According to 3GPP TS 32.251, charging data records (CDRs) are collected for each UE in connection with use of a radio network. In the P-GW 500, CDRs are collected for each UE in connection with use of an external PDN.

The PCRF 200 and the P-GW 500 is connected via Gx interface and can change charging information when dynamic PCC rules are used according to 3GPP TS 32.251. In this way, the PCRF 200 generates rules of QoS control and charging for each user from static rules (e.g. a contract course) for each user and dynamic rule information which applications such as Integrated Management System (IMS) and so on notifies the PCRF 200 of, and notifies a PCEF of the rules. For example, the PCEF is the P-GW 500.

(2) Case of 5G System

The system 1 may be a fifth generation (5G) system of 3GPP. FIG. 3 is an explanatory diagram illustrating an example of a case where the system 1 is a 5G system of 3GPP.

For example, the core network 10 is a 5G Core Network (5GC) (or a Next Generation Core Network (NGC)). Furthermore, for example, the first core network node 100 is an Access and Mobility Management Function (AMF) and/or a Session Management Function (SMF), the second core network 200 is a Policy Control Function (PCF), the third core network node 300 is a Unified Data Management (UDM), the fourth core network node 400 and the fifth core network node 500 are a User Plane Function (UPF).

For example, the radio access network 20 is a Next Generation Radio Access Network (NG-RAN). Furthermore, for example, the base station 600 is a next Generation Node B (gNB) or a next generation evolved Node B (ng-eNB), and the terminal apparatus 700 is a User Equipment (UE).

Figure 3:
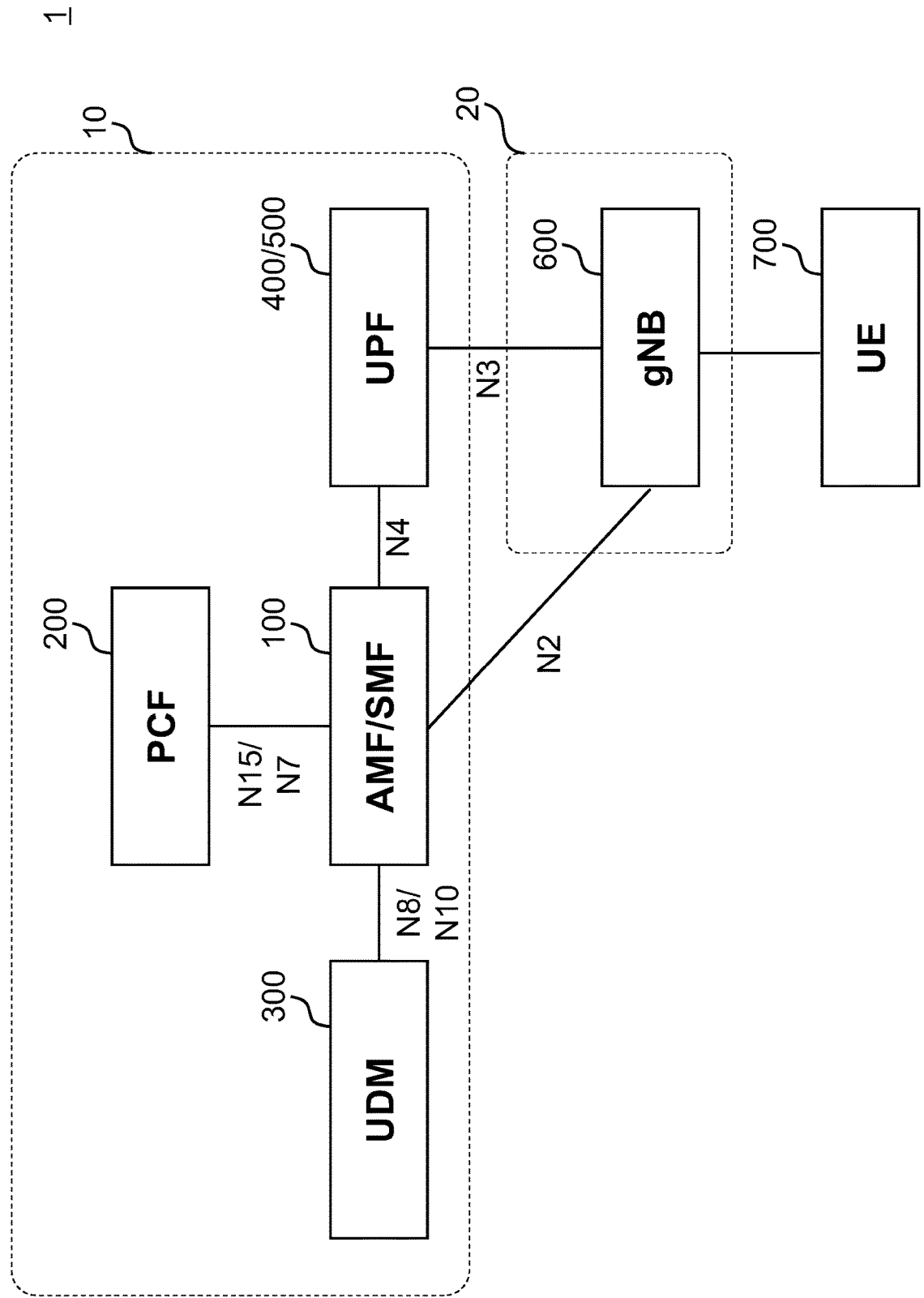
FIG. 3 is an explanatory diagram illustrating an example of a case where a system according to a first example embodiment is a 5G system of 3GPP.

As illustrated in FIG. 3, for example, interfaces between nodes are called as N2, N3, N4, N7 (an interface between the PCF and the SMF), N8 (an interface between the AMF and the UDM), N10 (an interface between the SMF and the UDM) and N15 (an interface between the PCF and the AMF).

For example, the gNB 600 (or the ng-eNB 600) combines radio communication of an NR method in licensed spectrum and radio communication of an NR method or an LTE method in unlicensed spectrum.

Note that a 5G system is being studied in 3GPP TR 38.913, 3GPP TS 38.300, 3GPP TS 23.501 and so on.

<<2.2. Configuration of Each Node>>

Next, a configuration of each node according to the first example embodiment is described with reference to FIG. 4 to FIG. 10.

<<2.2.1. Configuration of First Core Network Node>>

Figure 4:
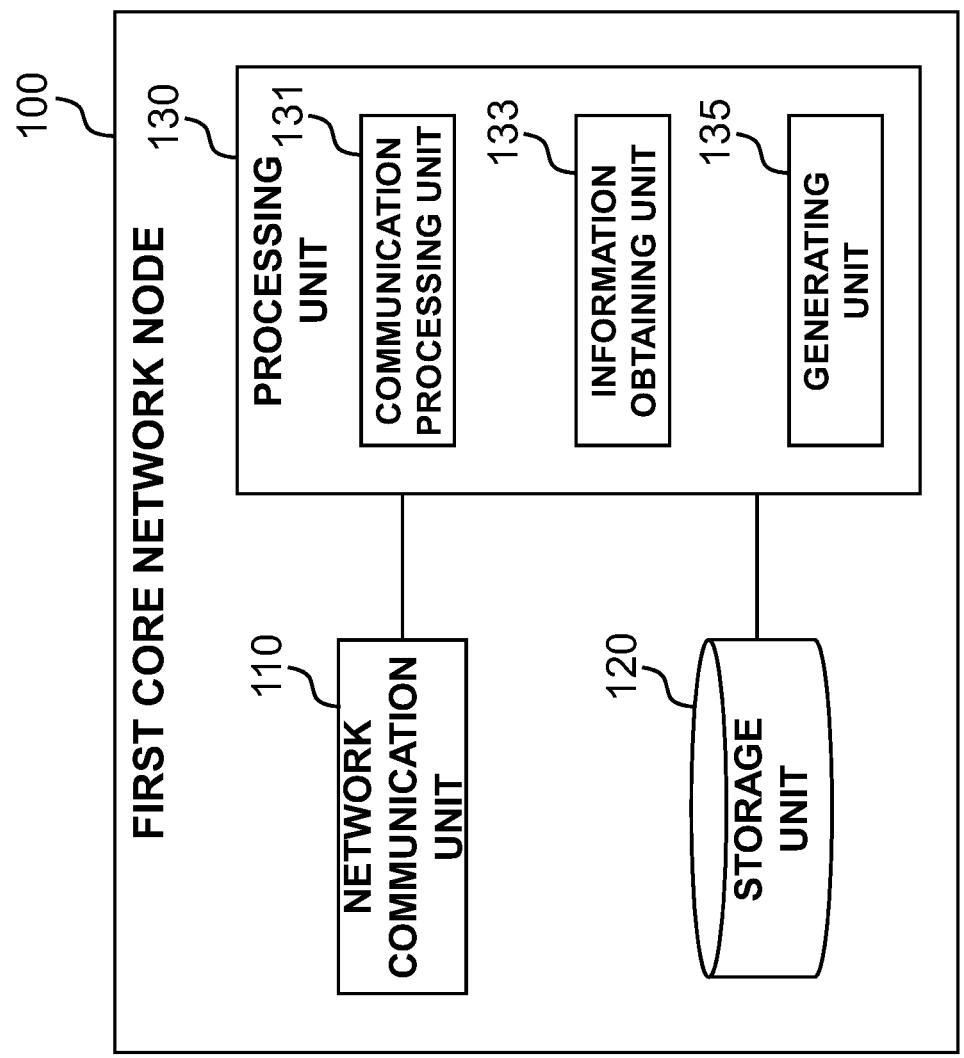
FIG. 4 is a block diagram illustrating an example of a schematic configuration of a first core network node according to a first example embodiment.

FIG. 4 is a block diagram illustrating an example of a schematic configuration of the first core network node 100 according to the first example embodiment. Referring to FIG. 4, the first core network node 100 includes a network communication unit 110, a storage unit 120 and a processing unit 130.

(1) Network Communication Unit 110

The network communication unit 110 is configured to receive signals from a network and transmit signals to a network.

(2) Storage Unit 120

The storage unit 120 is configured to store programs (instructions) and parameters for operations of the first core network node 100 as well as various data temporarily or permanently. The programs include one or more instructions for operations of the first core network node 100.

(3) Processing Unit 130

The processing unit 130 is configured to provide various functions of the first core network node 100. The processing unit 130 includes a communication processing unit 131, an information obtaining unit 133 and a generating unit 135. Note that the processing unit 130 may further include another constituent element than these constituent elements. That is, the processing unit 130 may perform operations other than the operations of these constituent elements. Specific operations of the communication processing unit 131, the information obtaining unit 133 and the generating unit 135 will be described later.

For example, the processing unit 130 (the communication processing unit 131) communicates with another network node (e.g. another core network node or the base station 600) through the network communication unit 110.

(4) Example Implementations

The network communication unit 110 may be implemented with a network adapter, a network interface card and/or the like. The storage unit 120 may be implemented with a memory (for example, non-volatile memory and/or volatile memory), hard disc and/or the like. The processing unit 130 may be implemented with one or more processors. The communication processing unit 131, the information obtaining unit 133 and the generating unit 135 may be implemented with the same processor or implemented separately with different processors. The above memory (storage unit 120) may be included in the one or more processors, or may be outside of the one or more processors.

The first core network node 100 may include a memory storing a program (instructions) and one or more processors capable of executing the program (instructions). The one or more processors may execute the program to perform the operations of the processing unit 130 (the operations of the communication processing unit 131, the information obtaining unit 133 and/or the generating unit 135). The program may be a program that causes a processor to execute the operations of the processing unit 130 (the operations of the communication processing unit 131, the information obtaining unit 133 and/or the generating unit 135).

Note that the first core network node 100 may be virtualized. In other words, the first core network node 100 may be implemented as a virtualized machine. In this case, the first core network node 100 (the virtualized machine) may operate as a virtual machine on a physical machine (hardware) including a processor, a memory and the like and a hypervisor.

<<2.2.2. Configuration of Second Core Network Node>>

Figure 5:
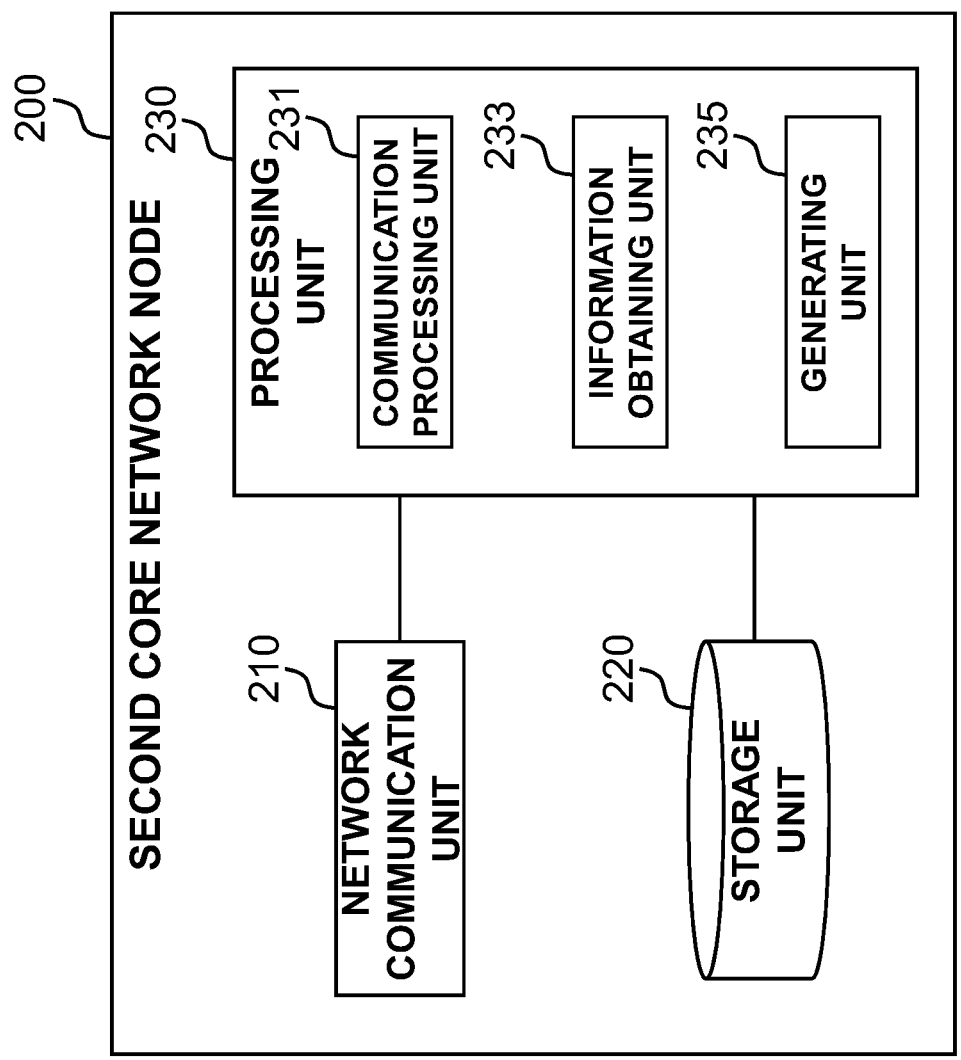
FIG. 5 is a block diagram illustrating an example of a schematic configuration of a second core network node according to a first example embodiment.

FIG. 5 is a block diagram illustrating an example of a schematic configuration of the second core network node 200 according to the first example embodiment. Referring to FIG. 5, the second core network node 200 includes a network communication unit 210, a storage unit 220 and a processing unit 230.

(1) Network Communication Unit 210

The network communication unit 210 is configured to receive signals from a network and transmit signals to a network.

(2) Storage Unit 220

The storage unit 220 is configured to store programs (instructions) and parameters for operations of the second core network node 200 as well as various data temporarily or permanently. The programs include one or more instructions for operations of the second core network node 200.

(3) Processing Unit 230

The processing unit 230 is configured to provide various functions of the second core network node 200. The processing unit 230 includes a communication processing unit 231, an information obtaining unit 233 and a generating unit 235. Note that the processing unit 230 may further include another constituent element than these constituent elements. That is, the processing unit 230 may perform operations other than the operations of these constituent elements. Specific operations of the communication processing unit 231, the information obtaining unit 233 and the generating unit 235 will be described later.

For example, the processing unit 230 (the communication processing unit 231) communicates with another network node (e.g. another core network node) through the network communication unit 210.

(4) Example Implementations

The network communication unit 210 may be implemented with a network adapter, a network interface card and/or the like. The storage unit 220 may be implemented with a memory (for example, non-volatile memory and/or volatile memory), hard disc and/or the like. The processing unit 230 may be implemented with one or more processors. The communication processing unit 231, the information obtaining unit 233 and the generating unit 235 may be implemented with the same processor or implemented separately with different processors. The above memory (storage unit 220) may be included in the one or more processors, or may be outside of the one or more processors.

The second core network node 200 may include a memory storing a program (instructions) and one or more processors capable of executing the program (instructions). The one or more processors may execute the program to perform the operations of the processing unit 230 (the operations of the communication processing unit 231, the information obtaining unit 233 and/or the generating unit 235). The program may be a program that causes a processor to execute the operations of the processing unit 230 (the operations of the communication processing unit 231, the information obtaining unit 233 and/or the generating unit 235).

Note that the second core network node 200 may be virtualized. In other words, the second core network node 200 may be implemented as a virtualized machine. In this case, the second core network node 200 (the virtualized machine) may operate as a virtual machine on a physical machine (hardware) including a processor, a memory and the like and a hypervisor.

<<2.2.3. Configuration of Third Core Network Node>>

Figure 6:
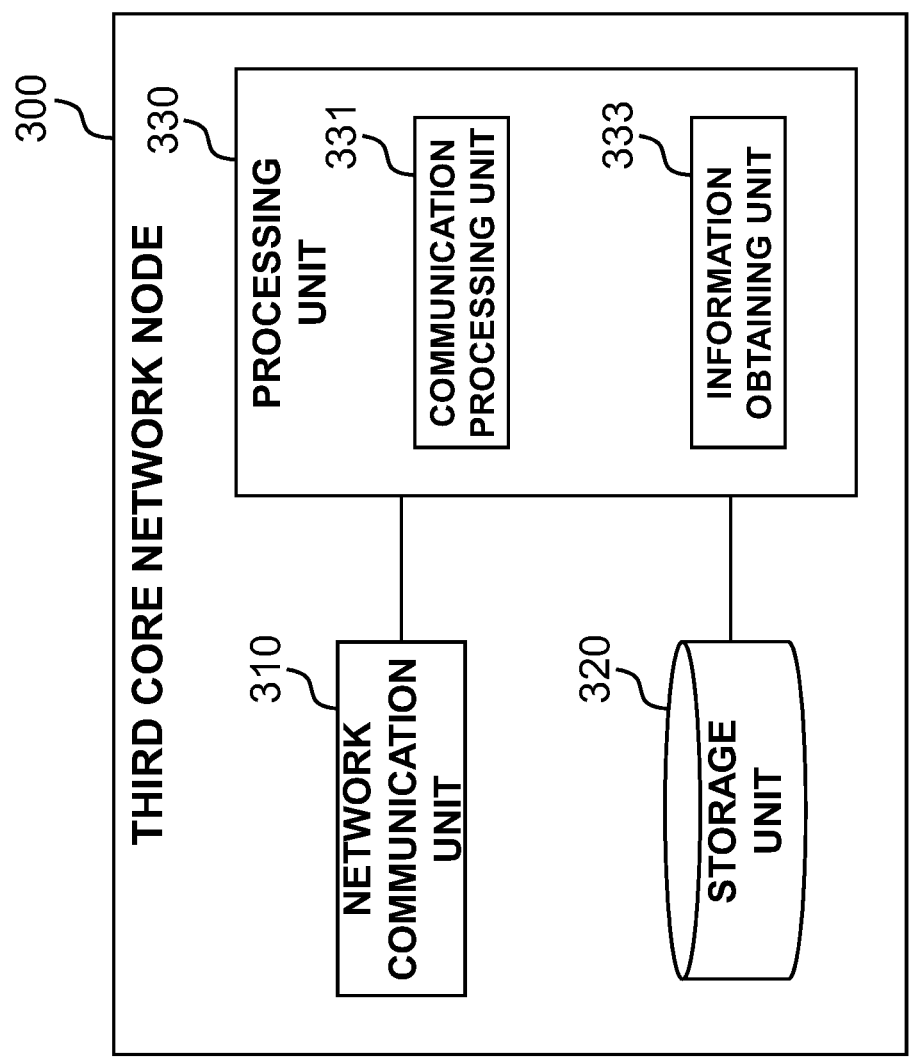
FIG. 6 is a block diagram illustrating an example of a schematic configuration of a third core network node according to a first example embodiment.

FIG. 6 is a block diagram illustrating an example of a schematic configuration of the third core network node 300 according to the first example embodiment. Referring to FIG. 6, the third core network node 300 includes a network communication unit 310, a storage unit 320 and a processing unit 330.

(1) Network Communication Unit 310

The network communication unit 310 is configured to receive signals from a network and transmit signals to a network.

(2) Storage Unit 320

The storage unit 320 is configured to store subscriber information in the system 1.

In addition, the storage unit 320 is configured to store programs (instructions) and parameters for operations of the third core network node 300 as well as various data temporarily or permanently. The programs include one or more instructions for operations of the third core network node 300.

(3) Processing Unit 330

The processing unit 330 is configured to provide various functions of the third core network node 300. The processing unit 330 includes a communication processing unit 331 and an information obtaining unit 333. Note that the processing unit 330 may further include another constituent element than these constituent elements. That is, the processing unit 330 may perform operations other than the operations of these constituent elements. Specific operations of the communication processing unit 331 and the information obtaining unit 333 will be described later.

For example, the processing unit 330 (the communication processing unit 331) communicates with another network node (e.g. another core network node) through the network communication unit 310.

(4) Example Implementations

The network communication unit 310 may be implemented with a network adapter, a network interface card and/or the like. The storage unit 320 may be implemented with a memory (for example, non-volatile memory and/or volatile memory), hard disc and/or the like. The processing unit 330 may be implemented with one or more processors. The communication processing unit 331 and the information obtaining unit 333 may be implemented with the same processor or implemented separately with different processors. The above memory (storage unit 320) may be included in the one or more processors, or may be outside of the one or more processors.

The third core network node 300 may include a memory storing a program (instructions) and one or more processors capable of executing the program (instructions). The one or more processors may execute the program to perform the operations of the processing unit 330 (the operations of the communication processing unit 331 and/or the information obtaining unit 333). The program may be a program that causes a processor to execute the operations of the processing unit 330 (the operations of the communication processing unit 331 and/or the information obtaining unit 333).

Note that the third core network node 300 may be virtualized. In other words, the third core network node 300 may be implemented as a virtualized machine. In this case, the third core network node 300 (the virtualized machine)

may operate as a virtual machine on a physical machine (hardware) including a processor, a memory and the like and a hypervisor.

<<2.2.4. Configuration of Fourth Core Network Node>>

Figure 7:
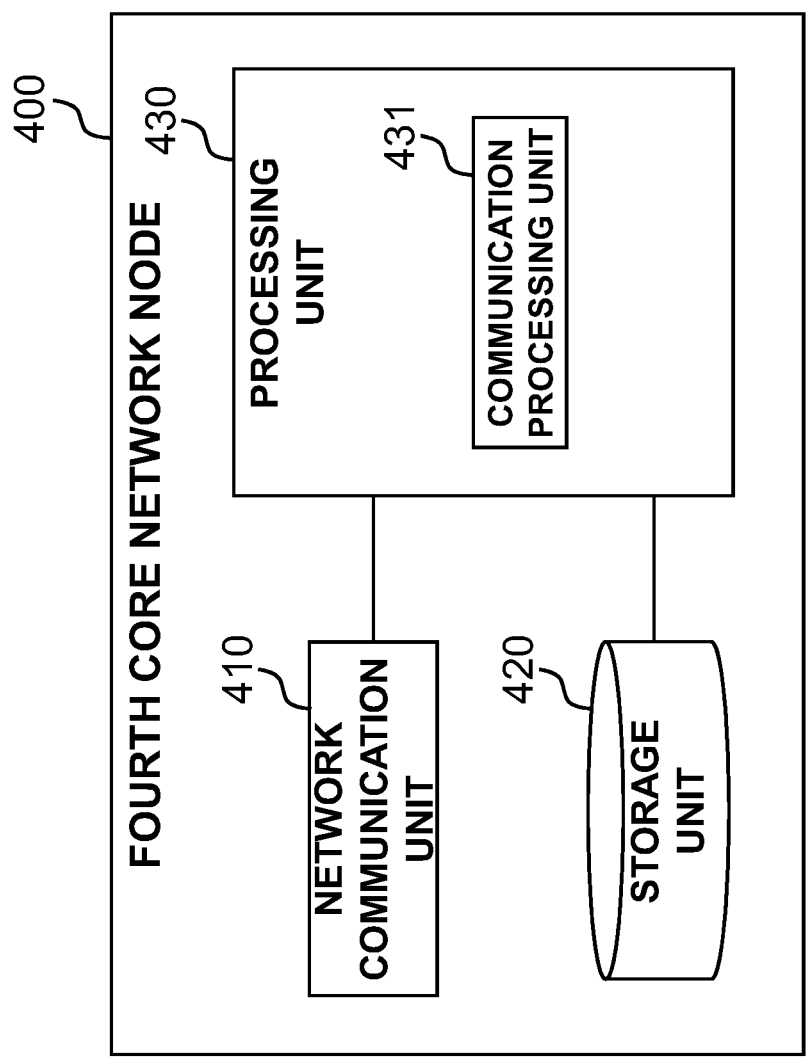
FIG. 7 is a block diagram illustrating an example of a schematic configuration of a fourth core network node according to a first example embodiment.

FIG. 7 is a block diagram illustrating an example of a schematic configuration of the fourth core network node 400 according to the first example embodiment. Referring to FIG. 7, the fourth core network node 400 includes a network communication unit 410, a storage unit 420 and a processing unit 430.

(1) Network Communication Unit 410

The network communication unit 410 is configured to receive signals from a network and transmit signals to a network.

(2) Storage Unit 420

The storage unit 420 is configured to store programs (instructions) and parameters for operations of the fourth core network node 400 as well as various data temporarily or permanently. The programs include one or more instructions for operations of the fourth core network node 400.

(3) Processing Unit 430

The processing unit 430 is configured to provide various functions of the fourth core network node 400. The processing unit 430 includes a communication processing unit 431. Note that the processing unit 430 may further include another constituent element than this constituent element. That is, the processing unit 430 may perform operations other than the operations of this constituent element. Specific operations of the communication processing unit 431 will be described later.

For example, the processing unit 430 (the communication processing unit 431) communicates with another network node (e.g. another core network node or the base station 600) through the network communication unit 410.

(4) Example Implementations

The network communication unit 410 may be implemented with a network adapter, a network interface card and/or the like. The storage unit 420 may be implemented with a memory (for example, non-volatile memory and/or volatile memory), hard disc and/or the like. The processing unit 430 may be implemented with one or more processors. The above memory (storage unit 420) may be included in the one or more processors, or may be outside of the one or more processors.

The fourth core network node 400 may include a memory storing a program (instructions) and one or more processors capable of executing the program (instructions). The one or more processors may execute the program to perform the operations of the processing unit 430 (the operations of the communication processing unit 431). The program may be a program that causes a processor to execute the operations of the processing unit 430 (the operations of the communication processing unit 431).

Note that the fourth core network node 400 may be virtualized. In other words, the fourth core network node 400 may be implemented as a virtualized machine. In this case, the fourth core network node 400 (the virtualized machine) may operate as a virtual machine on a physical machine (hardware) including a processor, a memory and the like and a hypervisor.

<<2.2.5. Configuration of Fifth Core Network Node>>

Figure 8:
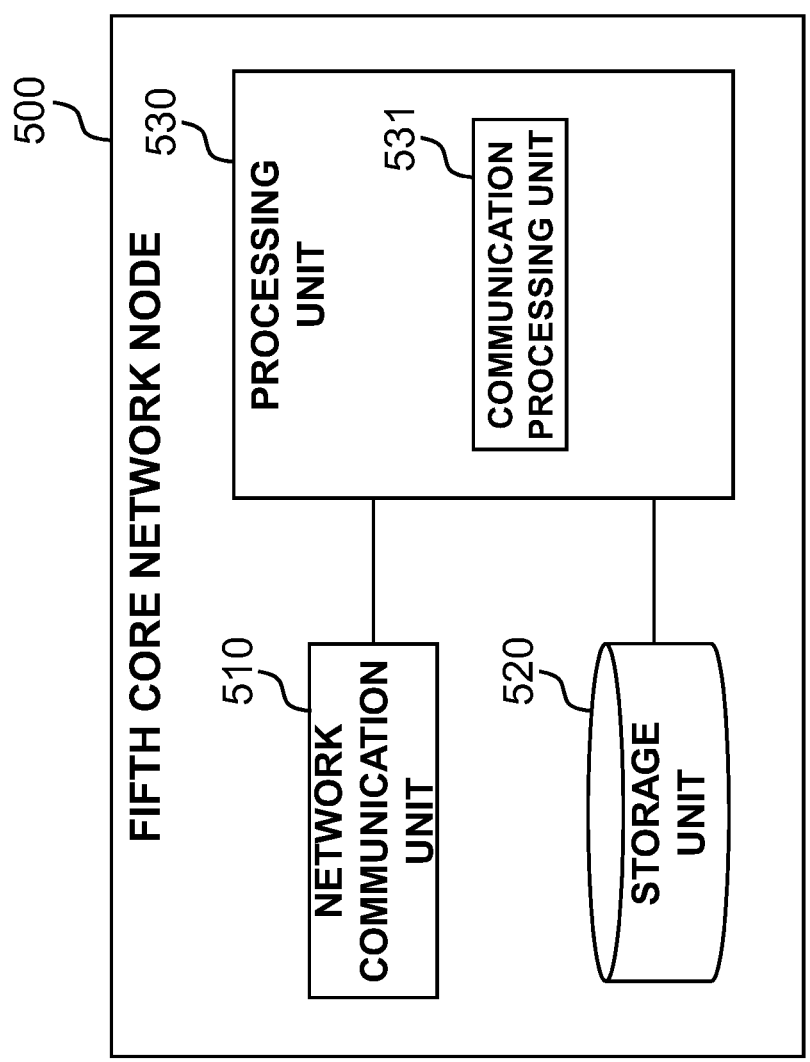
FIG. 8 is a block diagram illustrating an example of a schematic configuration of a fifth core network node according to a first example embodiment.

FIG. 8 is a block diagram illustrating an example of a schematic configuration of the fifth core network node 500 according to the first example embodiment. Referring to FIG. 8, the fifth core network node 500 includes a network communication unit 510, a storage unit 520 and a processing unit 530.

(1) Network Communication Unit 510

The network communication unit 510 is configured to receive signals from a network and transmit signals to a network.

(2) Storage Unit 520

The storage unit 520 is configured to store programs (instructions) and parameters for operations of the fifth core network node 500 as well as various data temporarily or permanently. The programs include one or more instructions for operations of the fifth core network node 500.

(3) Processing Unit 530

The processing unit 530 is configured to provide various functions of the fifth core network node 500. The processing unit 530 includes a communication processing unit 531. Note that the processing unit 530 may further include another constituent element than this constituent element. That is, the processing unit 530 may perform operations other than the operations of this constituent element. Specific operations of the communication processing unit 531 will be described later.

For example, the processing unit 530 (the communication processing unit 531) communicates with another network node (e.g. another core network node) through the network communication unit 510.

(4) Example Implementations

The network communication unit 510 may be implemented with a network adapter, a network interface card and/or the like. The storage unit 520 may be implemented with a memory (for example, non-volatile memory and/or volatile memory), hard disc and/or the like. The processing unit 530 may be implemented with one or more processors. The above memory (storage unit 520) may be included in the one or more processors, or may be outside of the one or more processors.

The fifth core network node 500 may include a memory storing a program (instructions) and one or more processors capable of executing the program (instructions). The one or more processors may execute the program to perform the operations of the processing unit 530 (the operations of the communication processing unit 531). The program may be a program that causes a processor to execute the operations of the processing unit 530 (the operations of the communication processing unit 531).

Note that the fifth core network node 500 may be virtualized. In other words, the fifth core network node 500 may be implemented as a virtualized machine. In this case, the fifth core network node 500 (the virtualized machine) may operate as a virtual machine on a physical machine (hardware) including a processor, a memory and the like and a hypervisor.

<<2.2.6. Configuration of Base Station>>

Figure 9:
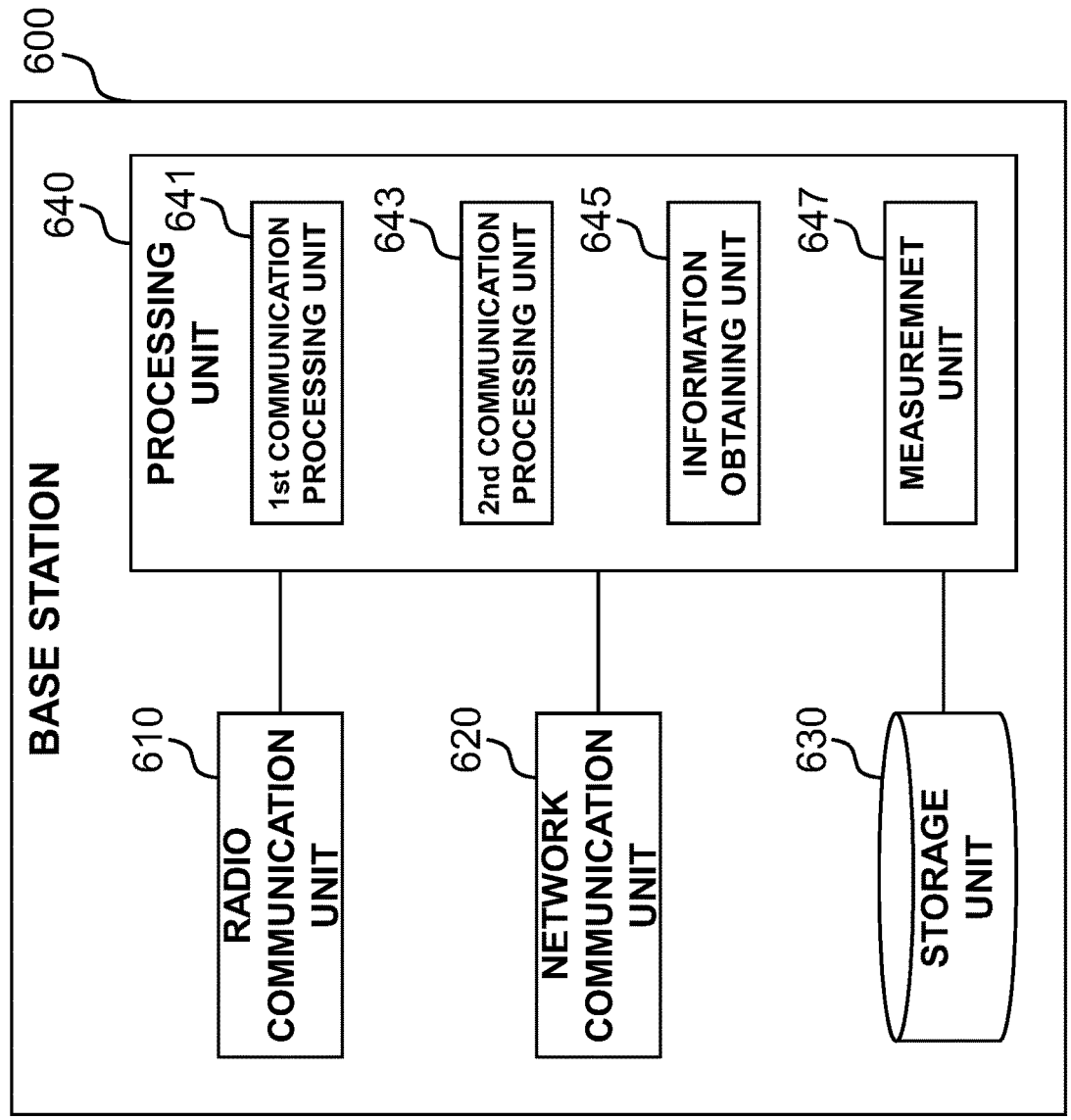
FIG. 9 is a block diagram illustrating an example of a schematic configuration of a base station according to a first example embodiment.

FIG. 9 is a block diagram illustrating an example of a schematic configuration of the base station 600 according to the first example embodiment. Referring to FIG. 9, the base station 600 includes a radio communication unit 610, a network communication unit 620, a storage unit 630 and a processing unit 640.

(1) Radio Communication Unit 610

The radio communication unit 610 transmits and receives signals wirelessly. For example, the radio communication unit 610 receives signals from a terminal apparatus and transmits signals to a terminal apparatus.

(2) Network Communication Unit 620

The network communication unit 620 is configured to receive signals from a network and transmit signals to a network.

(3) Storage Unit 630

The storage unit 630 is configured to store programs (instructions) and parameters for operations of the base station 600 as well as various data temporarily or permanently. The programs include one or more instructions for operations of the base station 600.

(4) Processing Unit 640

The processing unit 640 is configured to provide various functions of the base station 600. The processing unit 640 includes a first communication processing unit 641, a second communication processing unit 643, an information obtaining unit 645 and a measurement unit 647. Note that the processing unit 640 may further include another constituent element than these constituent elements. That is, the processing unit 640 may perform operations other than the operations of these constituent elements. Specific operations of the first communication processing unit 641, the second communication processing unit 643, the information obtaining unit 645 and the measurement unit 647 will be described later.

For example, the processing unit 640 (the second communication processing unit 643) communicates with a terminal apparatus (e.g. the terminal apparatus 700) through the radio communication unit 610. For example, the processing unit 640 (the first communication processing unit 641) communicates with another network node (e.g. a core network node or another base station) through the network communication unit 620.

(5) Example Implementation

The radio communication unit 610 may be implemented with an antenna, a radio frequency (RF) circuit and the like, and the antenna may be a directional antenna. The network communication unit 620 may be implemented with a network adapter, a network interface card and/or the like. The storage unit 630 may be implemented with a memory (e.g., a nonvolatile memory and/or volatile memory), a hard disk and/or the like. The processing unit 640 may be implemented with one or more processors such as a baseband (BB) processor, other types of processors and/or the like. The first communication processing unit 641, the second communication processing unit 643, the information obtaining unit 645 and the measurement unit 647 may be implemented with the same processor, or may be implanted separately by different processors. The memory (the storage unit 630) may be included in the one or more processors, or may be outside of the one or more processors.

The base station 600 may include a memory storing a program (instructions) and one or more processors capable of executing the program (instructions). The one or more processors may execute the program to perform the operations of the processing unit 640 (the operations of the first communication processing unit 641, the second communication processing unit 643, the information obtaining unit 645 and the measurement unit 647). The program may be a program that causes a processor to execute the operations of the processing unit 640 (the operations of the first communication processing unit 641, the second communication processing unit 643, the information obtaining unit 645 and the measurement unit 647).

Note that the base station 600 may be virtualized. In other words, the base station 600 may be implemented as a virtualized machine. In this case, the base station 600 (the virtualized machine) may operate as a virtual machine on a physical machine (hardware) including a processor, a memory and the like and a hypervisor.

<<2.2.7. Configuration of Terminal Apparatus>>

Figure 10:
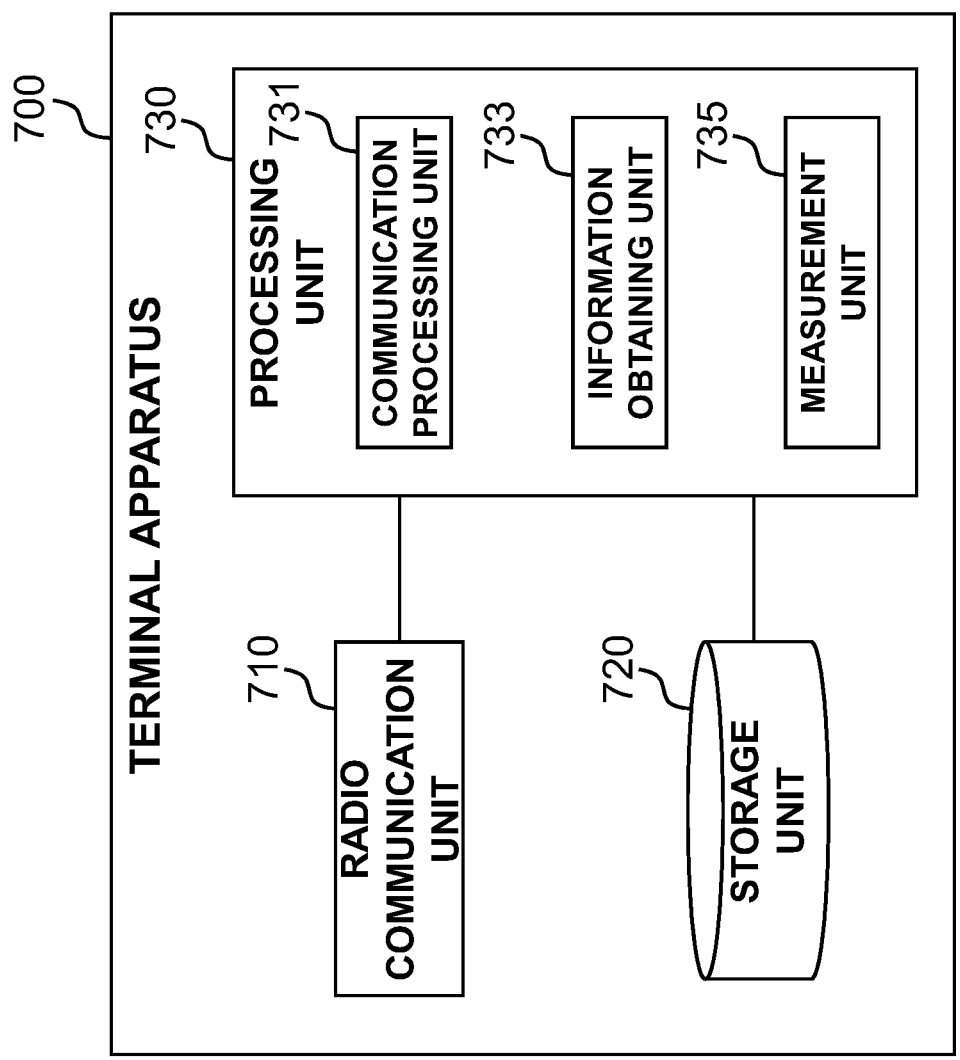
FIG. 10 is a block diagram illustrating an example of a schematic configuration of a terminal apparatus according to a first example embodiment.

FIG. 10 is a block diagram illustrating an example of a schematic configuration of the terminal apparatus 700 according to the first example embodiment. Referring to FIG. 10, the terminal apparatus 700 includes a radio communication unit 710, a storage unit 720 and a processing unit 730.

(1) Radio Communication Unit 710

The radio communication unit 710 transmits and receives signals wirelessly. For example, the radio communication unit 710 receives signals from a base station and transmits signals to a base station.

(2) Storage Unit 720

The storage unit 720 is configured to store programs (instructions) and parameters for operations of the terminal apparatus 700 as well as various data temporarily or permanently. The programs include one or more instructions for operations of the terminal apparatus 700.

(3) Processing Unit 730

The processing unit 730 is configured to provide various functions of the terminal apparatus 700. The processing unit 730 includes a communication processing unit 731, an information obtaining unit 733 and a measurement unit 735. Note that the processing unit 730 may further include another constituent element than these constituent elements. That is, the processing unit 730 may perform operations other than the operations of these constituent elements. Specific operations of the communication processing unit 731, the information obtaining unit 733 and the measurement unit 735 will be described later.

For example, the processing unit 730 (the communication processing unit 731) communicates with a base station (e.g. the base station 600) through the radio communication unit 710.

(4) Example Implementation

The radio communication unit 710 may be implemented with an antenna, a radio frequency (RF) circuit and the like. The storage unit 720 may be implemented with a memory (e.g., a nonvolatile memory and/or volatile memory), a hard disk and/or the like. The processing unit 730 may be implemented with one or more processors such as a baseband (BB) processor, other types of processors and/or the like. The communication processing unit 731, the information obtaining unit 733 and the measurement unit 735 may be implemented with the same processor, or may be implanted separately by different processors. The memory (the storage unit 720) may be included in the one or more processors, or may be outside of the one or more processors. As one example, the processing unit 730 may be implemented in a system on chip (SoC).

The terminal apparatus 700 may include a memory storing a program (instructions), and one or more processors capable of executing the program (instructions). The one or more processors may execute the program to perform operations of the processing unit 730 (operations of the communication processing unit 731, the information processing unit 733 and the measurement unit 735). The program may be a program that causes a processor to execute the operations of the processing unit 730 (operations of the communication processing unit 731, the information processing unit 733 and the measurement unit 735).

<<2.3. Technical Features>>

Next, technical features of the first example embodiment are described with reference to FIG. 11 to FIG. 18.

(1) Control Information

In the first example embodiment, first control information and second control information related to unlicensed spectrum are generated, transmitted and used. First, the first control information and the second control information will be described. In addition, third control information will be also described.

(1-1) First Control Information

First control information is information indicating communication service quality for unlicensed spectrum.

Terminal Apparatus/Communication Bearer

For example, the communication service quality is communication service quality for the terminal apparatus 700, and the first control information is information for the terminal apparatus 700 (information generated for the terminal apparatus 700).

More specifically, for example, the communication service quality is communication service quality for a communication bearer of the terminal apparatus 700, and the first control information is information for the communication bearer. That is, the first control information is information generated per communication bearer. For example, the communication bearer is a radio access bearer (RAB) (e.g. an E-UTRAN radio access bearer (E-RAB)). Alternatively, the communication bearer may be a radio bearer (RB) or may be an EPS bearer. Alternatively, the communication bearer may be a packet data unit (PDU) session of a 5Gsystem or a QoS flow.

Alternatively, the first control information is information generated per terminal apparatus.

Specific Example

For example, the first control information is one or more quality of service (QoS) parameters for unlicensed spectrum.

For example, the one or more QoS parameters are one or more downlink QoS parameters for unlicensed spectrum and/or one or more uplink QoS parameters for unlicensed spectrum.

For example, the one or more QoS parameters includes one or more communication bearer level QoS parameters for unlicensed spectrum. Specifically, for example, the one or more communication bearer level QoS parameters includes at least one of a quality class identifier (QCI), an allocation and retention priority (ARP), a guaranteed bitrate (GBR), a maximum bitrate (MBR), a packet delay budget (PDB) and a packet error loss rate (PELR) for unlicensed spectrum.

Note that the one or more QoS parameters are not limited to communication bearer level QoS parameters and, for example, may include an aggregated maximum bitrate (AMBR) for unlicensed spectrum.

(1-2) Second Control Information

Second control information is information regarding which of licensed spectrum and unlicensed spectrum is used.

Terminal Apparatus/Communication Bearer

For example, the second control information is information for the terminal apparatus 700 (information generated for the terminal apparatus 700).

More specifically, for example, the second control information is information for a communication bearer of the terminal apparatus 700. That is, the second control information is information generated per communication bearer. For example, the communication bearer is a radio access bearer (RAB) (e.g. an E-RAB). Alternatively, the communication bearer may be a radio bearer (RB) or may be an EPS bearer. Alternatively, the communication bearer may be a PDU session of a 5G system or a QoS flow.

Note that the second control information may be information generated per communication service quality. Alternatively, the second control information may be information generated per terminal apparatus.

Specific Example

As one example, the second control information is information indicating which of licensed spectrum and unlicensed spectrum is used for a communication bearer.

More specifically, for example, the second control information indicates any one of "(1) allow only an unlicensed band", "(2) not allow use of an unlicensed band", "(3) use a licensed band as far as possible if resources of the licensed band are available" and "(4) use an unlicensed band as far as possible if resources of the unlicensed band are available".

As one example, the second control information is License Exempt Access Profile parameter, License Exempt Access Policy parameter described later, and/or the like.

Alternatively, the second control information may be information indicating a spectrum to be used for a communication bearer, and the spectrum may be one of a licensed spectrum and an unlicensed spectrum. That is, the second control information may be information indicating a specific spectrum.

Alternatively/furthermore, the second control information may indicate a ratio between communication in licensed spectrum and communication in unlicensed spectrum. The second control information may indicate an upper limit and/or a lower limit of traffic for communication of licensed spectrum or unlicensed spectrum.

Note that, as described above, the second control information may be generated not per communication bearer but per communication service quality. In this case, the wording "for a communication bearer" for the second control information may be replaced with "for a communication service quality". Alternatively, as described above, the second control information may be generated not per communication bearer but per terminal apparatus. In this case, the wording "for a communication bearer" for the second control information may be replaced with "for the terminal apparatus 700".

(1-3) Third Control Information

Third control information is information indicating communication service quality for licensed spectrum. That is, communication service quality for licensed spectrum (and third control information indicating the communication service quality) and communication service quality for unlicensed spectrum (and first control information indicating the communication service quality) are prepared.

Terminal apparatus/Communication bearer

For example, the communication service quality is communication service quality for the terminal apparatus 700, and the third control information is information for the terminal apparatus 700 (information generated for the terminal apparatus 700).

More specifically, for example, the communication service quality is communication service quality for a communication bearer of the terminal apparatus 700, and the third control information is information for the communication bearer. That is, the third control information is information generated per communication bearer. For example, the communication bearer is a radio access bearer (RAB) (e.g. E-RAB). Alternatively, the communication bearer may be a radio bearer, or may be an EPS bearer. Alternatively, the communication bearer may be a PDU session of a 5G system, or may be a QoS flow.

Specific Example

For example, the third control information is one or more quality of service (QoS) parameters for licensed spectrum. Specific examples of QoS parameters are the same as examples described in connection with the first control information. Hence, overlapping descriptions are omitted here.

(1-4) Generation

As described later, the first control information is generated in the core network 10 (the first core network node 100 and/or the second core network node 200).

On the other hand, as described later, the second control information is, for example, generated in the core network 10 (the first core network node 100 and/or the second core network node 200), and is also generated in the radio access network 20 (the base station 600). Both the second control information generated in the core network 10 and the second control information generated in the radio access network 20 are information regarding which of licensed spectrum and unlicensed spectrum is used, but may be different from each other in terms of specific information. As one example, while the second control information generated in the core network 10 may be information indicating which of licensed spectrum and unlicensed spectrum is used, the second control information generated in the radio access network 20 may be information indicating a spectrum to be used. For example, the second control information may be information indicating any unlicensed spectrum to be used among a plurality of unlicensed spectrums.

(2) Generation of Control Information in a Core Network (2-1) Subject

The first control information and the second control information are generated in the core network 10.

For example, the first core network node 100 (the generating unit 135) generates the first control information and the second control information. For example, the second core network node 200 (the generating unit 235) also generates the first control information and the second control information.

Specifically, for example, first, the second core network node 200 (the generating unit 235) generates first control information, and then the first core network node 100 (the generating unit 135) newly generates first control information based on the first control information generated by the second core network node 200. Alternatively, first, the first core network node 100 (the generating unit 135) may generate first control information, and then the second core network node 200 (the generating unit 235) newly generates first control information based on the first control information generated by the first core network node 100.

Alternatively, only one of the first core network node 100 (the generating unit 135) and the second core network node 200 (the generating unit 235) may generate the first control information and the second control information.

Alternatively, one of the first core network node 100 (the generating unit 135) and the second core network node 200 (generating unit 235) may generate the first control information, and the other of the first core network node 100 (the generating unit 135) and the second core network node 200 (generating unit 235) may generate the second control information.

Note that, for example, the third control information may be generated together with the first control information.

(2-2) Input Information

While the first control information and the second control information are information for the terminal apparatus 700 (information generated for the terminal apparatus 700) as described above, the first control information and the second control information are generated, for example, based on terminal related information related to the terminal apparatus 700.

Preference Information

For example, the terminal related information includes preference information on use of unlicensed spectrum. The preference information is provided by the terminal apparatus 700.

For example, a user inputs his/her own preference on an operation screen of the terminal apparatus 700, and the terminal apparatus 700 generates the preference information in response to the input.

Specifically, for example, the preference information indicates any one of "(1) allow only an unlicensed band", "(2) not allow use of an unlicensed band", "(3) use a licensed band as far as possible if resources of the licensed band are available" and "(4) use an unlicensed band as far as possible if resources of the unlicensed band are available".

As one example, the preference information is License Exempt Access Preference parameter described later.

For example, when a user wants to receive communication service with high quality and high reliability, the user inputs "(2) not allow use of an unlicensed band". For example, when a user desires communication with great capacity in a long time even if delay is large, the user inputs "(1) allow only an unlicensed band" or "(4) use an unlicensed band as far as possible if resources of the unlicensed band are available".

Alternatively/furthermore, the preference information may indicate a ratio between communication in licensed spectrum and communication in unlicensed spectrum. In addition, the preference information may indicate an upper limit and/or a lower limit of traffic for communication of licensed spectrum or unlicensed spectrum.

For example, the preference information may be information generated per terminal apparatus. Alternatively, the preference information may be information generated per communication bearer.

Subscriber Information

For example, the terminal related information includes subscriber information on use of unlicensed spectrum. The subscriber information is stored in the core network 10 for the terminal apparatus 700. More specifically, for example, the subscriber information is stored by the third core network node 300.

Specifically, for example, the subscriber information indicates any one of "(1) allow only an unlicensed band", "(2) not allow use of an unlicensed band", "(3) use a licensed band as far as possible if resources of the licensed band are available" and "(4) use an unlicensed band as far as possible if resources of the unlicensed band are available".

As one example, the subscriber information includes License Exempt Access Permission parameter described later.

For example, if an operator wants to provide communication service with high quality and high reliability for VIP users, the subscriber information indicates "(2) not allow use of an unlicensed band". For example, if resources of spectrum which an operator has are not enough, but the operator wants to accommodate many users, the subscriber information indicates "(1) allow only an unlicensed band" or "(4) use an unlicensed band as far as possible if resources of the unlicensed band are available". For example, if the terminal apparatus 700 is an apparatus for M2M communication, the subscriber information indicates "(1) allow only an unlicensed band" because data is transmitted periodically for a long time but delay is acceptable for transmission of the data.

Furthermore, for example, the subscriber information indicates communication service quality for unlicensed spectrum. In this case, for example, the subscriber information includes one or more QoS parameters (e.g. QCI, ARP, GBR, MBR, PDB, PELR and/or the like) for unlicensed spectrum. The subscriber information may further indicate a correspondence relation/mapping between QoS parameters and spectrums.

FIG. 11 is an explanatory diagram illustrating an example of subscriber information stored in a third core network node 300. As illustrated in FIG. 11, the third core network node 300 includes License Exempt Access Permission and QoS for Unlicensed band as subscriber information on use of unlicensed spectrum.

Alternatively/furthermore, the subscriber information may indicate a ratio between communication in licensed spectrum and communication in unlicensed spectrum. The subscriber information may indicate an upper limit and/or a lower limit of traffic for communication of licensed spectrum or unlicensed spectrum.

For example, the subscriber information may be information generated per terminal apparatus. Alternatively, the subscriber information may be information generated per communication bearer.

Quality Related Information

For example, the terminal related information includes quality related information related to achievement status of communication service quality for unlicensed spectrum in unlicensed spectrum. The quality related information is provided by the base station 600 and/or the terminal apparatus 700.

More specifically, for example, the quality related information is information indicating an achievement level of the communication service quality in unlicensed spectrum. For example, the achievement level is a time ratio at which the communication service quality is achieved in unlicensed spectrum.

For example, the communication service quality is communication service quality for a communication bearer, and the quality related information is information generated per communication bearer. Alternatively, the quality related information may be information generated per terminal apparatus.

Moving Speed Information/Location Information

The terminal related information may include moving speed information indication a moving speed of at least one of the terminal apparatus 700 and the base station 600 communicating the terminal apparatus 700, and/or location information indicating a location of at least one of the terminal apparatus 700 and the base station 600.

As one example, the terminal related information may include first moving speed information indicating a moving speed of the base station 600, first location information indicating a location of the base station 600, second moving speed information indicating a moving speed of the terminal apparatus 700, and second location information indicating a location of the terminal apparatus 700. The first moving speed information and the first location information may be provided by the base station 600. The second moving speed information and the second location information may be provided by the terminal apparatus 700 or base station 600.

Charging Information

The terminal related information may include charging information for the terminal apparatus 700. The charging information may be stored by the second core network node 200.

Specifically, the charging information may be a charging plan or a charging policy for the terminal apparatus 700.

Traffic Information

The terminal related information may include traffic information indicating traffic of the terminal apparatus 700 or a communication bearer of the terminal apparatus 700 in licensed spectrum or unlicensed spectrum. The traffic information may be provided by the terminal apparatus 700 and/or the base station 600, or may be generated in the fourth core network node 400 and/or the fifth core network node 500.

Terminal related information used for generation of the first control information and the second control information has been described above. Of course, terminal related information used for the first control information and terminal related information used for the second control information may be different from each other.

(2-3) Example of Generation of Second Control Information

Examples of generation of the second control information will be described. Note that, of course, a method of generation of the second control information is not limited to these examples.

Generation by Second Core Network Node 200

The first core network node 100 (the communication processing unit 131) receives the preference information (License Exempt Access Preference) and the quality related information from the base station 600 or the terminal apparatus 700. The first core network node 100 (the communication processing unit 131) receives the subscriber information (License Exempt Access Permission) from the third core control node 300. Then the first core network node 100 (the communication processing unit 131) transmits the preference information, the quality related information and the subscriber information so that the second core network node 200 can receive the preference information, the quality related information and the subscriber information. As an example, the preference information, the quality related information and the subscriber information may be transmitted to the fourth core network node 400 (e.g. the S-GW 400) by the first core network node 100 (e.g. the MME 100) (the communication processing unit 131), may be forwarded to the fifth core network node 500 (e.g. the P-GW 500) by the fourth core network node 400 (the communication processing unit 431), and may be forwarded to the second core network node 200 (e.g. the PCRF 200) by the fifth core network node 500 (the communication processing unit 531). As another example, the preference information, the quality related information and the subscriber information may be transmitted directly to the second core network node 200 (e.g. PCF 200) by the first core network node 100 (e.g. the AMF/SMF 100) (the communication processing unit 131). The second core network node 200 (the communication processing unit 231) receives the preference information, the quality related information and the subscriber information.

The second core network node 200 (the information obtaining unit 233) obtains the preference information, the quality related information and the subscriber information. Furthermore, the second core network node 200 (the information obtaining unit 233) also obtains the charging information. Then the second core network node 200 (the generating unit 235) generates the second control information (e.g. information indicating which of licensed spectrum and unlicensed spectrum is used for a communication bearer) (License Exempt Access Policy) based on the preference information, the subscriber information, the quality related information and the charging information.

As a first example, the charging information indicates reception of service with QoS guaranteed even if expensive, as a charging plan or the charging policy. In this case, the second core network node 200 (the generating unit 235) generates second control information indicating "(2) not allow use of an unlicensed band".

As a second example, the charging information indicates reception of service at as low price as possible, as a charging plan or a charging policy. In this case, the second core network node 200 (the generating unit 235) generates second control information indicating "(1) allow only an unlicensed band" or "(4) use an unlicensed band as far as possible if resources of the unlicensed band are available". For example, the second core network node 200 (the generating unit 235) generates second control information indicating one of "(1) allow only an unlicensed band" and "(4) use an unlicensed band as far as possible if resources of the unlicensed band are available" which matches the subscriber information (License Exempt Access Permission) or the preference information (License Exempt Access Preference).

As a third example, the charging information is different from information of the first example and information of the second example described above. In addition, the quality related information indicates an achievement level of communication service quality for unlicensed spectrum in unlicensed spectrum, and the achievement level is low. In this case, the second core network node 200 (the generating unit 235) generates second control information indicating "(2) not allow use of an unlicensed band" or "(3) use a licensed band as far as possible if resources of the licensed band are available". For example, the second core network node 200 (the generating unit 235) generates second control information indicating one of "(2) not allow use of an unlicensed band" and "(3) use a licensed band as far as possible if resources of the licensed band are available", which matches the subscriber information (License Exempt Access Permission) or the preference information (License Exempt Access Preference). On the other side, if the achievement level is high, the second core network node 200 (the generating unit 235) generates second control information indicating "(4) use an unlicensed band as far as possible if resources of the unlicensed band are available".

Note that, the second core network node 200 (the information obtaining unit 233) may further obtain the traffic information. Then the second core network node 200 (generating unit 235) may generate the second control information further based on the traffic information. As one example, if traffic in licensed spectrum indicated by the traffic information is higher than an upper limit indicated by the charging information, the second core network node 200 (the generating unit 235) may generate second control information indicating "(1) allow only an unlicensed band".

The second core network node 200 (the information obtaining unit 233) may further obtain the moving speed information. For example, as well as the preference information, the first core network node 100 (the communication processing unit 131) may transmit the moving speed information, and the second core network node 200 (the communication processing unit 231) may receive the moving speed information. The second core network node 200 (the generating unit 235) may generate the second control information further based on the moving speed information. As an example, if a moving speed of the base station 600 (e.g. a base station mounted on a vehicle or an airplane) indicated by the moving speed information is high, the second core network node 200 (the generating unit 235) may generate second control information indicating "(1) allow only an unlicensed band" in order to avoid interference to licensed spectrum. As another example, if a moving speed of the terminal apparatus 700 indicated by the moving speed information is high, and reliability is required for communication, the second core network node 200 (the generating unit 235) may generate second control information indicating "(2) not allow use of an unlicensed band". If a moving speed of the terminal apparatus 700 indicated by the moving speed information is low and reliability is not required for communication, the second core network node 200 (the generating unit 235) may generate second control information indicating "(1) allow only an unlicensed band".

The second core network node 200 (the information obtaining unit 233) may further obtain the location information. For example, as well as the preference information, the first core network node 100 (the communication processing unit 131) may transmit the location information, and the second core network node 200 (the communication processing unit 231) may receive the location information. The second core network node 200 (the generating unit 235) may generate the second control information further based on the location information. As one example, if a location of the base station 600 indicated by the location information is in an area where WLAN access points are crowded extremely (an area where unlicensed spectrum is likely to be congested), the second core network node 200 (the generating unit 235) may generate second control information indicating "(2) not allow use of an unlicensed band" or "(3) use a licensed band as far as possible if resources of the licensed band are available". On the other hand, if a location of the base station 600 indicated by the location information is in an area where there are few other WLAN access points (an area where unlicensed spectrum is unlikely to be congested), the second core network node 200 (the generating unit 235) may generate second control information indicating "(1) allow only an unlicensed band" or "(4) use an unlicensed band as far as possible if resources of the unlicensed band are available"

Generation by First Core Network Node 100

The first core network node 100 (the communication processing unit 131 receives the preference information (License Exempt Access Preference) form the base station 600 or the terminal apparatus 700. In addition, the first core network node 100 (the communication processing unit 131) receives the subscriber information (License Exempt Access Permission) from the third core network node 300. Furthermore, the first core network node 100 (the communication processing unit 131) receives second control information (License Exempt Access Profile) generated by the second core network node 200.

The first core network node 100 (the information obtaining unit 133) obtains the preference information, the subscriber information, and the second control information (License Exempt Access Policy) generated by the second core network node 200. Then the first core network node 100 (the generating unit 135) newly generate second control information (License Exempt Access Profile) based on the preference information, the subscriber information, and the second control information generated by the second core network node 200.

For example, if the second control information (License Exempt Access policy) generated by the second core network node 200 is obtained, the first core network node 100 (the generating unit 135) generates second control information (License Exempt Access Profile) which is the same as the second control information (License Exempt Access Policy). If the second control information (License Exempt Access Policy) generated by the second core network node 200 is not obtained, the first core network node 100 (the generating unit 135) generates second control information (License Exempt Access Profile) based on the subscriber information and the preference information. For example, if the subscriber information indicates "(2) not allow use of an unlicensed band", the first core network node 100 (the generating unit 135) generates second control information (License Exempt Access profile) indicating "(2) not allow use of an unlicensed band". For example, if the subscriber information indicates "(1) allow only an unlicensed band" and the preference information indicates "(1) allow only an unlicensed band" or "(4) use an unlicensed band as far as possible if resources of the unlicensed band are available", the first core network node 100 (the generating unit 135) generates second control information (License Exempt Access Profile) which is the same as the preference information.

Note that, as well as the second core network node 200 (the generating unit 235) or instead of the second core network node 200 (the generating unit 235), the first core network node 100 (the generating unit 135) may generate second control information (License Exempt Access Profile) based on the quality related information, the moving speed information, the location information, the charging information and/or the traffic information.

The second core network node 200 (the generating unit 235) may not generate the first control information, and the first core network node 100 (the generating unit 135) may generate the first control information. Alternatively, the second core network node 200 (the generating unit 235) may generate the first control information, and the first core network node 100 (the generating unit 135) may not generate the first control information.

The second core network node 200 (the generating unit 235) may not generate the second control information, and the first core network node 100 (the generating unit 135) may generate the second control information. Alternatively, the second core network node 200 (the generating unit 235) may generate the second control information, and the first core network node 100 (the generating unit 135) may not generate the second control information.

(2-4) Example of Generation of First Control Information

Examples of generation of the first control information will be described. Note that, of course, a method of generation of the first control information is not limited to these examples.

Generation by a Second Core Network Node 200

For example, the second core network node 200 (the information obtaining unit 233) obtains the subscriber information and the charging information. Then, for example, the second core network node 200 (the generating unit 235) generates the first control information (information indicating communication service quality for unlicensed spectrum) based on the subscriber information and the charging information.

For example, the subscriber information indicates communication service quality for unlicensed spectrum, and the second core network node 200 (the generating unit 235) generate the first control information so that the communication service quality is guaranteed. For example, if the charging information indicates reception of service with QoS guaranteed even if expensive, as a charging plan or a charging policy, the second core network node 200 (the generating unit 235) generates first control information indicating high communication service quality for unlicensed spectrum. For example, the charging information indicates reception of service at as low price as possible, as a charging plan or a charging policy, the second core network node 200 (the generating unit 235) generates first control information indicating low communication service quality for unlicensed spectrum.

Note that the second core network node 200 (the information obtaining unit 233) may further obtain the preference information, the quality related information, the traffic information, the moving speed information and/or the location information. Then the second core network node 200 (the generating unit 235) may generate the first control information based on the information.

For example, if the preference information indicates "(1) allow only an unlicensed band" or "(4) use an unlicensed band as far as possible if resources of the unlicensed band are available", the second core network node 200 (the generating unit 235) may generate the first control information so that communication service quality for unlicensed spectrum does not become lower than the current level.

For example, the quality related information indicates an achievement level of communication service quality for unlicensed spectrum in unlicensed spectrum, and the achievement level is low, the second core network node 200 (the generating unit 235) may generate first control information indicating lower communication service quality for unlicensed spectrum.

For example, the traffic in unlicensed spectrum indicated by the traffic information is higher that an upper limit indicated by the charging information, the second core network node 200 (the generating unit 235) may generate first control information indicating lower communication service quality for unlicensed spectrum.

For example, a moving speed of the base station 600 (e.g. a base station mounted on a vehicle or an airplane) or the terminal apparatus 700 indicated by the moving speed information is high, the second core network node 200 (the generating unit 235) may generate first control information indicating low communication service quality for unlicensed spectrum.

For example, a location of the base station 600 indicated by the location information is in an area where WLAN access points are crowded extremely (an area where unlicensed spectrum is likely to be congested), the second core network node 200 (the generating unit 235) may generate first control information indicating low communication service quality for unlicensed spectrum.

Generation by First Core Network Node 100

The first core network node 100 (the information obtaining unit 133) obtains the subscriber information, the charging information, the preference information, the quality related information, the traffic information, the moving speed information and/or the location information. Then the first core network node 100 (the generating unit 135) generates the first control information based on the information. For example, the first core network node 100 (the generating unit 135) generates the first control information as well as examples above described in connection with the second core network node 200 (the generating unit 235).

For example, the first core network node 100 (the information obtaining unit 133) obtains the first control information generated by the second core network node 200 (the generating unit 235). Then the first core network node 100 (the generating unit 135) newly generates first control information indicating communication service quality for unlicensed spectrum based on the first control information generated by the second core network node 200 (the generating unit 235). For example, the first core network node 100 (the generating unit 135) newly generates first control information by adjusting communication service quality indicated by the first control information generated by the second core network node 200 (the generating unit 235), based on the subscriber information, the charging information, the preference information, the quality related information, the traffic information, the moving speed information and/or the location information.

Note that the second core network node 200 (the generating unit 235) may not generate the first control information, and the first core network node 100 (the generating unit 135) may generate the first control information. Alternatively, the second core network node 200 (the generating unit 235) may generate the first control information, and the first core network node 100 (the generating unit 135) may not generate the first control information.

(3) Transmission of Control Information from a Core Network to an Access Network Transmission to a Base Station The first core network node 100 (the information obtaining unit 133) obtains the first control information, the second control information and the third control information. Then the first core network node 100 (the communication processing unit 131) transmits the first control information, the second control information and the third control information to the base station 600. The base station 600 (the first communication processing unit 641) receives the first control information, the second control information and the third control information.

For example, the first core network node 100 (the communication processing unit 131) transmits, to the base station 600, a message for configuring a communication bearer, and the message includes the first control information, the second control information and the third control information. The base station 600 (the first communication processing unit 641) receives the message. As one example, the message is an INITIAL CONTEXT SETUP REQUEST message or an E-RAB SETUP REQUEST message.

FIG. 12 is an explanatory diagram illustrating an example of an INITIAL CONTEXT SETUP REQUEST message according to a first example embodiment. Referring to FIG. 12, an INITIAL CONTEXT SETUP REQUEST message includes, as the first control information, UE Aggregate Maximum Bit Rate for Unlicensed band and E-RAB Level QoS Parameters for unlicensed band. The message includes License Exempt Access Profile as the second control information. The message includes, as the third control information, UE Aggregate Maximum Bit Rate and E-RAB Level QoS Parameters.

FIG. 13 is an explanatory diagram illustrating an example of UE Aggregate Maximum Bit Rate for Unlicensed band according to a first example embodiment. Referring FIG. 13, UE Aggregate Maximum Bit Rate for Unlicensed band includes information for downlink (UE Aggregate Maximum Bit Rate Downlink) and information for uplink (UE Aggregate Maximum Bit Rate Uplink).

FIG. 14 is an explanatory diagram illustrating an example of E-RAB Level QoS Parameters for Unlicensed band according to a first example embodiment. Referring FIG. 14, E-RAB Level QoS Parameters for Unlicensed band includes QCI, ARP, GBR, PDB and PELR for an unlicensed band.

FIG. 15 is an explanatory diagram illustrating an example of License Exempt Access Profile according to a first example embodiment. Referring FIG. 15, License Exempt Access Profile indicates any one of only License Exempt Access allowed (="(1) allow only an unlicensed band"), License Exempt Access not allowed (="(2) not allow use of an unlicensed band", License access preferred(="(3) use a licensed band as far as possible if resources of the licensed band are available" and License Exempt Access Preferred (="(4) use an unlicensed band as far as possible if resources of the unlicensed band are available".

Note that Subscriber Profile ID for RAT/Frequency priority (SPID) (an existing parameter) may be extended for unlicensed spectrum instead of adding License Exempt Access Profile (a new parameter) as the second control information. SPID per communication bearer may be generated and transmitted.

The second control information may be included in a header of a packet instead of a S1AP message.

Transmission to a Terminal Apparatus

The first core network node 100 (the communication processing unit 131) may transmit the first control information, the second control information and/or the third control information to the terminal apparatus 700 via the base station 600. The terminal apparatus 700 (the communication processing unit 731) may receive the first control information, the second control information and/or the third control information.

Specifically, the first core network node 100 (the communication processing unit 131) may transmit, to the terminal apparatus 700, a NAS message including the first control information, the second control information and/or the third control information. The base station 600 (the first communication processing unit 641) may receive the NAS message, and the base station 600 (the second communication processing unit 643) may transmit the NAS message to the terminal apparatus 700. The terminal apparatus 700 (the communication processing unit 731) may receive the NAS message.

(4) Use of Control Information by a Base Station (4-1) Determination of Spectrum (Second Control Information)

The base station 600 (the second communication processing unit 643) determines which of licensed spectrum and unlicensed spectrum is used, based on the second control information (information regarding which of licensed spectrum and unlicensed spectrum is used).

Unit of Determination

As described above, for example, the second control information is information for a communication bearer of the terminal apparatus 700. That is, the second control information is information generated per communication bearer. In this case, the base station 600 (the second communication processing unit 643) determines, based on the second control information, which of licensed spectrum and unlicensed spectrum is used for the communication bearer (i.e. for transmission of data of the communication bearer). This makes it possible, for example, to use proper spectrum for each communication bearer (for each service).

Alternatively, the second control information may be generated per communication service quality. In this case, the base station 600 (the second communication processing unit 643) may determine, based on the second control information, which of licensed spectrum and unlicensed spectrum is used for the communication service quality (i.e.

for transmission of data of a communication bearer with the communication service quality).

Alternatively, the second control information may be generated per terminal apparatus. In this case, the base station 600 (the second communication processing unit 643) may determine, based on the second control information, which of licensed spectrum and unlicensed spectrum is used for the terminal apparatus 700 (i.e. for transmission of data between the base station 600 and the terminal apparatus 700).

Determined Spectrum

For example, the base station 600 (the second communication processing unit 643) determines a specific spectrum to be used. That is, the base station 600 (the second communication processing unit 643) determines use of a specific spectrum. The specific spectrum is one of a licensed spectrum and an unlicensed spectrum.

Alternatively, the base station 600 (the second communication processing unit 643) may not determine a specific spectrum to be used, but may determine whether licensed spectrum is used or unlicensed spectrum is used.

Determination of a spectrum to be used is may performed for both downlink and uplink. Alternatively, determination of a spectrum to be used may be performed for only one of downlink and uplink.

Consideration of Status of Communication in Unlicensed Spectrum

For example, the base station 600 (the second communication processing unit 643) determines which of licensed spectrum and unlicensed spectrum is used, based on the second control information and status of communication in unlicensed spectrum.

For example, the status of communication in unlicensed spectrum includes status of interference in unlicensed spectrum. Specifically, for example, the status of interference is measurements of receive signal strength indication (RSSI) in unlicensed spectrum. For example, the base station 600 (the second communication processing unit 643) determines use of unlicensed spectrum in which RSSI is low (e.g. RSSI is lower than a threshold).

For example, the status of communication in unlicensed spectrum includes status of radar in unlicensed spectrum. Specifically, for example, the status of radar is a result of detection of radar in unlicensed spectrum. For example, the base station 600 (the second communication processing unit 643) determines use of unlicensed spectrum in which radar is not detected.

Specific Examples of Determination

As a first example, if the second control information indicates "(1) allow only an unlicensed band", the base station 600 (the second communication processing unit 643) determines use of unlicensed spectrum for a communication bearer.

As a second example, if the second control information indicates "(4) use an unlicensed band as far as possible if resources of the unlicensed band are available", the base station 600 (the second communication processing unit 643) confirms usage status of resources of unlicensed spectrum (for example using admission control or the like). Then, if unlicensed spectrum seems to be available, the base station 600 (the second communication processing unit 643) determines use of unlicensed spectrum for a communication bearer. Note that, as described above, the base station 600 (the second communication processing unit 643) determines use of unlicensed spectrum in which radar is not detected and RSSI is low.

As third example, if the second control information indicates "(3) use a licensed band as far as possible if resources of the licensed band are available", the base station 600 (the second communication processing unit 643) confirms usage status of resources of licensed spectrum (for example using admission control or the like). Then, if resources of licensed spectrum do not seem to be available, the base station 600 (the second communication processing unit 643) determines use of unlicensed spectrum for a communication bearer.

For example, as described above, the base station 600 determines which of licensed spectrum and unlicensed spectrum is used, based on second control information transmitted from the core network 10 to the base station 600. For example, this enables the base station 600 to determine a spectrum to be used (a licensed spectrum or an unlicensed spectrum), according to a policy of the core network 10. That is, it is easier for the base station 600 to determine a spectrum to be used. In addition, as subscriber information and/or charging information may be also used, it is possible to use spectrum suitable for the terminal apparatus 700 (and its communication bearer). As a result, a good communication service may be provided even when unlicensed spectrum is used. In addition, it may be possible to avoid the situation where only unlicensed spectrum is used. As a result, fairness with other communication methods may be maintained in unlicensed spectrum.

Consideration of Other Information

The base station 600 (the second communication processing unit 643) may further consider other information when determining which of licensed spectrum and unlicensed spectrum is used.

For example, the base station 600 (the second communication processing unit 643) may determine which of licensed spectrum and unlicensed spectrum is used, further based on the first control information (information indicating communication service quality for unlicensed spectrum). As one example, if communication service quality for unlicensed spectrum is likely to be achieved, the base station 600 (the second communication processing unit 643) may determine use of unlicensed spectrum.

For example, the base station 600 (the second communication processing unit 643) may determine which of licensed spectrum and unlicensed spectrum is used, further based on the preference information, the moving speed information, the location information, the quality related information, the subscriber information, the charging information, the traffic information and/or the like.

As one example, if a moving speed of the terminal apparatus 700 indicated by the moving speed information is high, and reliability is required for communication, the base station 600 (the second communication processing unit 643) may determine use of licensed spectrum. On the other hand, if a moving speed of the terminal apparatus 700 indicated by the moving speed information is low, and reliability is not required for communication, the base station 600 (the second communication processing unit 643) may determine use of unlicensed spectrum.

As another example, if a moving speed of the base station 600 (e.g. a base station mounted on a vehicle or an airplane) indicated by the moving speed information is high, the base station 600 (the second communication processing unit 643) may determine use of unlicensed spectrum in order to avoid interference to licensed spectrum.

As yet another example, if a location of the base station 600 indicated by the location information is in an area where WLAN access points are crowded extremely (an area where unlicensed spectrum is likely to be congested), the base station 600 (the second communication processing unit 643) may determine use of licensed spectrum. On the other hand, if a location of the base station 600 indicated by the location information is in an area where there are few other WLAN access points (an area where unlicensed spectrum is unlikely to be congested), the base station 600 (the second communication processing unit 643) may determine use of unlicensed spectrum.

Individual Case

As described above, for example, the base station 600 (the second communication processing unit 643) determines use of unlicensed spectrum.

For example, in case of LAA or LTE-U, the base station 600 (the second communication processing unit 643) determines use of unlicensed spectrum as an SCell.

For example, in case of LWIP, the base station 600 (the second communication processing unit 643) determines use of WLAN (i.e. use of spectrum of WLAN which is unlicensed spectrum).

For example, in case of RCLWI, the base station 600 (the second communication processing unit 643) determines use of WLAN (i.e. use of spectrum of WLAN which is unlicensed spectrum).

Generation of Second Control Information

For example, the base station 600 (the second communication processing unit 643) newly generate second control information regarding which of licensed spectrum and unlicensed spectrum is used (e.g. for a communication bearer) in response to determination of which of licensed spectrum and unlicensed spectrum is used (e.g. for a communication bearer). That is, apart from second control information transmitted from the core network 10 to the base station 600, the base station 600 (the second communication processing unit 643) newly generate second control information in response to the determination. As described later, the second control information newly generated by the base station 600 is transmitted to the terminal apparatus 700 and/or another base station.

For example, the base station 600 (the second communication processing unit 643) determines a specific spectrum to be used (e.g. for a communication bearer), and generate second control information indicating the specific spectrum. That is, the second control information indicates a spectrum to be used for a communication bearer.

Alternatively, the base station 600 (the second communication processing unit 643) does not determine a specific spectrum to be used, but determines whether licensed spectrum is used or unlicensed spectrum is used (e.g. for a communication bearer), and generates second control information indicating which of licensed spectrum and unlicensed spectrum is used (e.g. for a communication bearer).

Note that, as described in connection with second control information, both the second control information transmitted from the core network 10 to the base station 600 and the second control information generated by the base station 600 are information regarding which of licensed spectrum and unlicensed spectrum is used, but may be different from each other in terms of specific information. As one example, while the second control information transmitted form the core network 10 to the base station 600 may be information indicating which of licensed spectrum and unlicensed spectrum is used, the second control information generated by the base station 600 may be information indicating a specific spectrum to be used.

Dynamic Determination and Generation

For example, the base station 600 (the second communication processing unit 643) may determine a spectrum to be used for a communication bearer not statically (e.g. only once) but dynamically if necessary. That is, the base station 600 (the second communication processing unit 643) may change a spectrum to be used for a communication bearer.

In addition, the base station 600 (the second communication processing unit 643) may generate the second control information in response to dynamic determination.

(4-2) Control of Radio Communication (First Control Information)

The base station 600 (the second communication processing unit 643) performs control of radio communication using unlicensed spectrum, based on the first control information (information indicating communication service quality for unlicensed spectrum). The radio communication is radio communication between the base station 600 and the terminal apparatus 700.

First Example: Allocation of Radio Resources

For example, the control includes allocation of radio resources for the radio communication.

For example, as described above, the first control information includes one or more communication bearer level QoS parameters (QCI, ARP, GBR, MBR, PDB and/or PELR) for unlicensed spectrum. In this case, as the control, the base station 600 (the second communication processing unit 643) allocates radio resources of unlicensed spectrum for transmission of data of a communication bearer so that the one or more communication bearer level QoS parameters are achieved.

Accordingly, for example, radio communication is performed in unlicensed spectrum so that communication service quality for unlicensed spectrum is achieved. Therefore, an increase of traffic in unlicensed spectrum may be suppressed, and congestion in unlicensed spectrum may be avoided. As a result, QoS required for unlicensed spectrum may be achieved. In this manner, a good communication service may be provided even when unlicensed spectrum is used. In addition, fairness with other communication methods may be maintained in unlicensed spectrum.

As one example, the radio communication is downlink radio communication, and the radio resources are downlink radio resources. As another example, the radio communication is uplink radio communication, and the radio resources are uplink radio resources.

Second Example: Rate Control

The control may include rate control of the radio communication.

For example, as described above, the first control information may include, as a QoS parameter for unlicensed spectrum, aggregated maximum bitrate (AMBR) for unlicensed spectrum. In this case, as the control, the base station 600 (the second communication processing unit 643) may control a rate of the radio communication so that a maximum bitrate of radio communication using unlicensed spectrum does not exceed the AMBR.

Accordingly, for example, an increase of traffic in unlicensed spectrum may be suppressed, and congestion of unlicensed spectrum may be avoided. As a result, QoS required for unlicensed spectrum may be achieved. In this manner, a good communication service may be provided even when unlicensed spectrum is used. In addition, fairness with other communication methods may be maintained in unlicensed spectrum.

Note that, of course, the control is not limited to examples described above.

(4-3) Measurement (First Control Information)

The base station 600 (the measurement unit 647) performs, based on the first control information (information indicating communication service quality for unlicensed spectrum), measurement for achievement status of the communication service quality in unlicensed spectrum. Then the base station 600 (the measurement unit 647) generates quality related information related to the achievement status.

Link Direction

For example, the measurement is measurement for downlink. Alternatively, the measurement may be measurement for uplink or may include measurement for both downlink and uplink.

First example: whether communication service quality is achieved

As a first example, the measurement is measurement of whether the communication service quality is achieved in unlicensed spectrum.

For example, the quality related information is information indicating that the communication service quality is not achieved in unlicensed spectrum. In this case, the base station 600 (the measurement unit 647) generates the quality related information when the communication service quality is not achieved in unlicensed spectrum.

Specifically, for example, as described above, the first control information includes one or more communication bearer level QoS parameters (QCI, ARP, GBR, MBR, PDB and/or PELR) for unlicensed spectrum. In this case, the base station 600 (the measurement unit 647) generates the quality related information when, for example, GBR, PDB and/or PELR are not achieved in unlicensed spectrum. Note that, for example, when unlicensed spectrum is congested, it is sometimes hard for the base station 600 to get a transmission opportunity even if the base station 600 performs carrier sense. As a result, GBR, PDB and/or PELR may not be achieved.

For example, unlicensed spectrum may be used by WLAN apparatuses or base stations or terminal apparatuses of other mobile network operators. Therefore, communication service quality may not be achieved in unlicensed spectrum due to influence of the WLAN apparatuses, the base stations or the terminal apparatuses. The measurement makes it possible, for example, to know that communication service quality for unlicensed spectrum is not achieved.

Second Example: Achievement Level

As a second example, the measurement is measurement of an achievement level of the communication service quality in unlicensed spectrum. For example, the achievement level is a time ratio at which the communication service quality is achieved in unlicensed spectrum.

For example, the quality related information is information indicating the achievement level.

The measurement makes it possible, for example, to know how much communication service quality for unlicensed spectrum is achieved. That is, it is possible to know whether use of unlicensed spectrum is appropriate.

Per Communication Bearer

For example, the communication service quality is communication service quality for a communication bearer. In this case, the measurement may be performed per communication bearer, and the quality related information may be generated per communication bearer.

(5) Transmission of Control Information in a Radio Access Network (5-1) Transmission from a Base Station to a Terminal Apparatus The base station 600 (the information obtaining unit 645) obtains the first control information, the second control information and the third control information. Then the base station 600 (the second communication processing unit 643) transmits the first control information, the second control information and the third control information to the terminal apparatus 700. The terminal apparatus 700 (the communication processing unit 731) receives the first control information, the second control information and the third control information.

For example, the base station 600 (the second communication processing unit 643) transmits, to the terminal apparatus 700, configuration information of a logical channel or a communication bearer, and the configuration information includes the first control information, the second control information and the third control information. As one example, the configuration information is LogicalChannelConfig. For example, this enables provision of control information according to a configuration of a logical channel or a communication bearer. For example, the base station 600 (the second communication processing unit 643) transmits, to the terminal apparatus 700, an RRC message including the configuration information.

FIG. 16 is an explanatory diagram illustrating an example of LogicalChannelConfig according to a first example embodiment. In particular, this example is an example of a case of LAA. Referring to FIG. 16, LogicalChannelConfig includes dl-carrierFreq-rxx (the second control information) and QoS-unlicensed-band-rxx (the first control information) in laa-DL-Allowed-rxx. dl-carrierFreq-rxx (the second control information) indicates a spectrum (EARFCN) to be used for downlink. Information indicating a spectrum to be used for uplink may be further included. QoS-unlicensed-band-rxx (the first control information) includes one or more QoS parameters for unlicensed spectrum.

Note that laa-DL-Allowed-rxx is defined, for example, as described in FIG. 17. Existing laa-DL-Allowed-rxx may be applied to an SCell for uplink LAA, but cannot be applied to a PSCell of dual connectivity. Therefore, as described in FIG. 17, laa-DL-Allowed-rxx according to the first example embodiment may be extended to be applied to a PSCell of dual connectivity and be also applied to uplink LAA.

For example, the first control information, the second control information and the third control information may be associated with a Data Radio Bearer (DRB) ID or a Logical Channel ID (or Logical Channel Group ID) (for example in the configuration information and/or the RRC message).

In case of RCLWI, the second control information may be steer command UE.

Note that, for example, the base station 600 transmits, to the terminal apparatus 700, the first control information and the third control information transmitted from the core network 10 to the base station 600. For example, the base station 600 transmits, to the terminal apparatus 700, not second control information transmitted from the core network 10 to the base station 600 but second control information newly generated by the base station 600 in response to determination which of licensed spectrum and unlicensed spectrum is used.

(5-2) Transmission Between Base Stations

The base station 600 (the first communication processing unit 641) may transmit the first control information, the second control information and the third control information to another base station.

As one example, base station 600 may be a source base station of a handover, and the other base station may be a target base station of the handover. In this case, the base station 600 (the first communication processing unit 641) may transmit, to the other base station, a handover request message including the first control information, the second control information and the third control information. For example, this enables transfer of control information between base stations in response to a handover.

As another example, the base station 600 may be a master base station (e.g. an MeNB) of dual connectivity, and the other base station may be a secondary base station (e.g. an SeNB) of dual connectivity. In this case, the base station 600 (the first communication processing unit 641) may transmit, to the other base station, a dual connectivity related message including the first control information, the second control information and the third control information. As one example, the dual connectivity related message may be an SENB ADDITION REQUEST message. Alternatively, the dual connectivity related message may be an SENB RECONFIGURATION COMPLETE message or an SENB MODIFICATION REQUEST message.

Note that the base station 600 (the first communication processing unit 641) may receive the first control information, the second control information and the third control information from another base station.

(6) Use of Control Information by a Terminal Apparatus (6-1) Use of Spectrum (Second Control Information)

The terminal apparatus 700 (the communication processing unit 731) determines a spectrum to be used, based on the second control information (information regarding which of licensed spectrum and unlicensed spectrum is used). Then the terminal apparatus 700 (the communication processing unit 731) communicates with the base station 600 using the spectrum.

For example, the second control information is information generated per communication bearer. In this case, the terminal apparatus 700 (the communication processing unit 731) determines, based on the second control information, a spectrum to be used for a communication bearer corresponding to the second control information. Then the terminal apparatus 700 (the communication processing unit 731) communicates with the base station 600 using the spectrum for the communication bearer. The terminal apparatus 700 (the communication processing unit 731) may transmit, to the base station 600, data of the communication bearer (data corresponding to DBR ID or Logical Channel ID of the communication bearer) using the spectrum. The terminal apparatus 700 (the communication processing unit 731) may receive, from the base station 600, data of the communication bearer using the spectrum. This makes it possible, for example, to transmit uplink data using desired spectrum (licensed spectrum or unlicensed spectrum) for each communication bearer. Note that, as the base station 600 allocates radio resources of the spectrum to the terminal apparatus 700, and notifies the terminal apparatus 700 of the radio resources, the terminal apparatus 700 uses the spectrum based on allocation of the radio resources.

For example, the second control information is information indicating a specific spectrum to be used for a communication bearer, and the specific spectrum is a licensed spectrum or an unlicensed spectrum. In this case, the spectrum determined by the terminal apparatus 700 (the communication processing unit 731) is the specific spectrum. That is, the terminal apparatus 700 (the communication processing unit 731) determines use of the specific spectrum for the communication bearer.

Alternatively, the second control information may be information indicating which of licensed spectrum and unlicensed spectrum is used for a communication bearer. For example, if the second control information indicates that licensed spectrum is used for the communication bearer, the terminal apparatus 700 (the communication processing unit 731) may determine use of any licensed spectrum for the communication bearer. Alternatively, the terminal apparatus 700 (the communication processing unit 731) may select a specific licensed spectrum for the communication bearer, and determine use of the specific licensed spectrum for the communication bearer. For example, if the second control information indicates that unlicensed spectrum is used for the communication bearer, the terminal apparatus 700 (the communication processing unit 731) may determine use of any unlicensed spectrum for the communication bearer. Alternatively, the terminal apparatus 700 (the communication processing unit 731) may select a specific unlicensed spectrum for the communication bearer, and determine use of the specific unlicensed spectrum for the communication bearer.

(6-2) Measurement (First Control Information)

The terminal apparatus 700 (the measurement unit 735) performs, based on the first control information (information indicating communication service quality for unlicensed spectrum), measurement for achievement status of the communication service quality in unlicensed spectrum. Then the terminal apparatus 700 (the measurement unit 735) generates quality related information related to the achievement status.

Link Direction

For example, the measurement is measurement for uplink. Alternatively, the measurement may be measurement for downlink or may include measurement for both uplink and downlink.

First example: whether communication service quality is achieved

As a first example, the measurement is measurement of whether the communication service quality is achieved in unlicensed spectrum.

For example, the quality related information is information indicating that the communication service quality is not achieved in unlicensed spectrum. In this case, the terminal apparatus 700 (the measurement unit 735) generates the quality related information when the communication service quality is not achieved in unlicensed spectrum.

Specifically, for example, as described above, the first control information includes one or more communication bearer level QoS parameters (QCI, ARP, GBR, MBR, PDB and/or PELR) for unlicensed spectrum. In this case, the terminal apparatus 700 (the measurement unit 735) generates the quality related information when, for example, GBR, PDB and/or PELR are not achieved in unlicensed spectrum. Note that, for example, when unlicensed spectrum is congested, it is sometimes hard for the terminal apparatus 700 to get a transmission opportunity even if the terminal apparatus 700 performs carrier sense. As a result, GBR, PDB and/or PELR may not be achieved.

For example, unlicensed spectrum may be used by WLAN apparatuses or base stations or terminal apparatuses of other mobile network operators. Therefore, communication service quality may not be achieved in unlicensed spectrum due to influence of the WLAN apparatuses, the base stations or the terminal apparatuses. The measurement makes it possible, for example, to know that communication service quality for unlicensed spectrum is not achieved.

Second Example: Achievement Level

As a second example, the measurement is measurement of an achievement level of the communication service quality in unlicensed spectrum. For example, the achievement level is a time ratio at which the communication service quality is achieved in unlicensed spectrum.

For example, the quality related information is information indicating the achievement level.

The measurement makes it possible, for example, to know how much communication service quality for unlicensed spectrum is achieved. That is, it is possible to know whether use of unlicensed spectrum is appropriate.

Per Communication Bearer

For example, the communication service quality is communication service quality for a communication bearer. In this case, the measurement may be performed per communication bearer, and the quality related information may be generated per communication bearer.

(7) Quality Related Information (First Example: Information Indicating Communication Service Quality is not Achieved)

(7-1) Transmission by a Terminal Apparatus

As described above, the terminal apparatus 700 (the measurement unit 735) performs, based on the first control information, measurement for achievement status of communication service quality for unlicensed spectrum in unlicensed spectrum. Then the terminal apparatus 700 (the measurement unit 735) generates quality related information related to the achievement status. For example, the measurement is measurement of whether the communication service quality is achieved in unlicensed spectrum, and the quality related information is information indicating that the communication service quality is not achieved in unlicensed spectrum. The quality related information may be information requesting switch of spectrum (or a base station).

The terminal apparatus 700 (the information obtaining unit 733) obtains the quality related information (information indicating that the quality service quality is not achieved in unlicensed spectrum). Then the terminal apparatus 700 (the communication processing unit 731) transmits the quality related information to the base station 600. The base station 600 (the second communication processing unit 643) receives the quality related information from the terminal apparatus 700.

The terminal apparatus 700 (the communication processing unit 731) transmits, to the base station 600) the quality related information (information indicating that the quality service quality is not achieved in unlicensed spectrum) when the communication service quality is not achieved in unlicensed spectrum. The terminal apparatus 700 (the communication processing unit 731) does not transmit the quality related information to the base station 600 when the communication service quality is achieved in unlicensed spectrum.

For example, the terminal apparatus 700 (the communication processing unit 731) transmits, to the base station 600, an RRC message including the quality related information. As one example, the RRC message is a measurement report message including the quality related information.

(7-2) Use by a Base Station (Switch of Spectrum)

As described above, the terminal apparatus 700 (the communication processing unit 731) transmits the quality related information to the base station 600. The base station 600 (the second communication processing unit 643) receives the quality related information from the terminal apparatus 700. The quality related information is information indicating that the communication service quality is not achieved in unlicensed spectrum.

As described above, the base station 600 (the measurement unit 647) performs, based on the first control information, measurement for achievement status of communication service quality for unlicensed spectrum in unlicensed spectrum. Then the base station 600 (the measurement unit 647) generates quality related information related to the achievement status. For example, the measurement is measurement of whether the communication service quality is achieved in unlicensed spectrum, and the quality related information is information indicating that the communication service quality is not achieved in unlicensed spectrum.

The base station 600 (the information obtaining unit 635) obtains the quality related information (the quality related information transmitted from the terminal apparatus 700 to the base station 600, or the quality related information generated by the base station 600). Then the base station 600 (the second communication processing unit 643) performs switch of spectrum for the terminal apparatus 700 based on the quality related information. That is, the base station 600 (the second communication processing unit 643) performs switch of spectrum for the terminal apparatus 700 if measurement by the terminal apparatus 700 and/or the base station 600 reveals that communication service quality for unlicensed spectrum is not achieved in unlicensed spectrum.

For example, the switch is switch from unlicensed spectrum to licensed spectrum. Alternatively, the switch may be switch from unlicensed spectrum to other unlicensed spectrum.

Note that the switch may be called as a frequency handover.

Switch Per Communication Bearer

For example, the communication service quality is communication service quality for a communication bearer, the quality related information is information generated per communication bearer, and the switch is switch of spectrum for the communication bearer of the terminal apparatus 700. That is, the base station 600 (the second communication processing unit 643) performs switch of spectrum for the communication bearer based on the quality related information for the communication bearer of the terminal apparatus 700.

Consideration of status of communication in unlicensed spectrum

For example, the base station 600 (the second communication processing unit 643) performs switch of spectrum for the terminal apparatus 700 based on the quality related information and status of communication in unlicensed spectrum.

For example, the status of communication in unlicensed spectrum includes status of interference in unlicensed spectrum. Specifically, for example, the status of interference is measurements of RSSI in unlicensed spectrum. For example, RSSI in unlicensed spectrum used for a communication bearer of the terminal apparatus 700 is high (e.g. the RSSI is higher than a threshold). In this case, the base station 600 (the second communication processing unit 643) switches spectrum for the communication bearer from the unlicensed spectrum to licensed spectrum or other unlicensed spectrum.

For example, the status of communication in unlicensed spectrum includes status of radar in unlicensed spectrum. Specifically, for example, the status of radar is a result of detection of radar in unlicensed spectrum. For example, radar is detected in unlicensed spectrum used for the communication bearer of the terminal apparatus 700. In this case, the base station 600 (the second communication processing unit 643) switches spectrum for the communication bearer from the unlicensed spectrum to licensed spectrum or other unlicensed spectrum.

The licensed spectrum or the other unlicensed spectrum which is spectrum (for a communication bearer of the terminal apparatus 700) after switch may be, for example, spectrum in which a level of interference is lower than a level of interference in unlicensed spectrum used for a communication bearer of the terminal apparatus 700, or spectrum in which RSSI is lower than RSSI in unlicensed spectrum used for a communication bearer of the terminal apparatus 700.

The licensed spectrum or the other unlicensed spectrum which is spectrum (for a communication bearer of the terminal apparatus 700) after switch may be, for example, spectrum in which radar is not detected.

The licensed spectrum or the other unlicensed spectrum which is spectrum (for a communication bearer of the terminal apparatus 700) after switch may be, for example, spectrum for which quality related information corresponding to quality which can satisfy a level is configured. Determination whether the spectrum can satisfy a level of quality corresponding to configured quality related information may be performed by the base station 600 (the second communication processing unit 643). The base station 600 (the second communication processing unit 643) may perform the determination based on information obtained from the first core network node 100 or the second core network node 200.

(7-3) Others

Although examples in which the base station 600 (the second communication processing unit 643) performs switch of spectrum for the terminal apparatus 700 based on the quality related information are described, the first example embodiment is not limited to these examples. For example, the base station 600 (the second communication processing unit 643) may perform switch of a base station (or a cell) for the terminal apparatus 700 based on the quality related information. The switch of a base station may be switch of a secondary base station (SeNB) or switch of a WLAN access point.

In addition, although examples in which the terminal apparatus 700 (the communication processing unit 731) transmits, to the base station 600, an RRC message including the quality related information are described, the first example embodiment is not limited to these examples. For example, the terminal apparatus 700 (the communication processing unit 731) may transmit, to the first core network node 100, a NAS message including the quality related information. Then, the first core network node 100 (the communication processing unit 131) may transmit the quality related information to the base station 600. Alternatively, the first core network node 100 (the communication processing unit 131) may transmit, to the base station 600, control information indicating switch of spectrum.

As described above, spectrum for the terminal apparatus 700 is switched based on the quality related information. Accordingly, for example, spectrum is switched when communication service quality for unlicensed spectrum is not achieved. As a result, unlicensed spectrum may be used as far as the communication service quality is achieved. In other words, while unlicensed spectrum is used, the communication service quality may be generally achieved. In this manner, a good communication service may be provided even when unlicensed spectrum is used. In addition, it may be possible to avoid the situation where unlicensed spectrum continues to be used unjustly. As a result, fairness with other communication methods may be maintained in unlicensed spectrum.

(8) Quality Related Information (A Second Example: Information Indicating an Achievement Level of Communication Service Quality)

(8-1) Transmission by a Terminal Apparatus

As described above, the terminal apparatus 700 (the measurement unit 735) performs, based on the first control information, measurement for achievement status of communication service quality for unlicensed spectrum in unlicensed spectrum. Then the terminal apparatus 700 (the measurement unit 735) generates quality related information related to the achievement status. For example, the measurement is measurement of an achievement level of the communication service quality in unlicensed spectrum.

The terminal apparatus 700 (the communication obtaining unit 733) obtains the quality related information (information indicating the achievement level). The terminal apparatus 700 (the communication processing unit 731) transmits the quality related information to the base station 600. The base station 600 (the second communication processing unit 643) receives the quality related information from the terminal apparatus 700.

For example, the terminal apparatus 700 (the communication processing unit 731) transmits, to the base station 600, an RRC message including the quality related information (information indicating the achievement level). As one example, the RRC message is a measurement report message including the quality related information.

(8-2) Transmission by a Base Station

As described above, the base station 600 (the measurement unit 647) performs, based on the first control information, measurement for achievement status of communication service quality for unlicensed spectrum in unlicensed spectrum. Then the base station 600 (the measurement unit 647) generates quality related information related to the achievement status. For example, the measurement is measurement of an achievement level of the communication service quality in unlicensed spectrum.

As described above, the base station 600 (the second communication processing unit 643) receives the quality related information (information indicating the achievement level) from the terminal apparatus 700.

The base station 600 (the information obtaining unit 645) obtains the quality related information (information generated by the base station 600 and/or information indicating the achievement level) (information transmitted from the terminal apparatus 700 to the base station 600). Then the base station 600 (the first communication processing unit 641) transmits the quality related information to the first core network node 100. The first core network node 100 (the communication processing unit 131) receives the quality related information from the base station 600.

For example, the base station 600 (the first communication processing unit 641) transmits, to the first core network node 100, an S1AP message including the quality related information (information indicating the achievement level).

(8-3) Others

Although examples in which the terminal apparatus 700 (the communication processing unit 731) transmits the quality related information to the base station 600 and the base station 600 (the first communication processing unit 641) transmits the quality related information to the first core network node 100 are described, the example embodiment is not limited to these examples. For example, the terminal apparatus 700 (the communication processing unit 731) may transmits, to the first core network node 100, a NAS message including the quality related information.

As described above, the quality related information (information indicating the achievement level) is transmitted from the radio access network 20 to the core network 10. This makes it possible, for example, to modify a policy for use of unlicensed spectrum in the core network 10. Therefore, a good communication service may be provided even when unlicensed spectrum is used. Specifically, the core network 10 may modify at least one of the first control information and the second control information based on the quality related information.

(9) Transmission of Other Information (9-1) Preference Information

For example, the terminal apparatus 700 (the information obtaining unit 733) obtains preference information on use of unlicensed spectrum. Then the terminal apparatus 700 (the communication processing unit 731) transmits the preference information to the first core network node 100 (via the base station 600). The first core network node 100 receives the preference information.

For example, the terminal apparatus 700 (the communication processing unit 731) transmits, to the first core network node 100, a NAS message including the preference information. For example, the NAS message is an ATTACH REQUEST message, a PDN CONNECTIVITY REQUEST message or a Tracking Area Update message.

Alternatively, the terminal apparatus 700 (the communication processing unit 731) may transmit the preference information to the first core network 100 using a protocol such as EPS Session Management (ESM), EPS Mobility Management (EMM), Short Message Service (SMS) or the like.

Note that the terminal apparatus 700 (the communication processing unit 731) may transmit the preference information to the base station 600. For example, the terminal apparatus 700 (the communication processing unit 731) may transmit, to the base station 600, an RRC message including the preference information, and the base station 600 (the second communication processing unit 643) receives the preference information. Then, the base station 600 (the first communication processing unit 641) may transmit the preference information to the first core network node 100. For example, the base station 600 (the first communication processing unit 641) may transmit, to the first core network node 100, an S1AP message including the preference information.

(9-2) Moving Speed Information/Location Information

Terminal Apparatus

For example, the terminal apparatus 700 (the information obtaining unit 733) obtains location information indicating a location of the terminal apparatus 700, and moving speed information indicating a moving speed of the terminal apparatus 700. Then, the terminal apparatus 700 (the communication processing unit 731) transmits the location information and the moving speed information to the first core network node 100 (via the base station 600). The first core network node 100 receives the location information and the moving speed information. For example, the terminal apparatus 700 (the communication processing unit 731) transmits, to the first core network node 100, a NAS message including the location information and the moving speed information.

Alternatively, the terminal apparatus 700 (the communication processing unit 731) may transmit the location information and the moving speed information to the base station 600. For example, the terminal apparatus 700 (the communication processing unit 731) may transmit, to the base station 600, an RRC message including the location information and the moving speed information, and the base station 600 (the second communication processing unit 643) receives the location information and the moving speed information. Then, the base station 600 (the first communication processing unit 641) may transmit the location information and the moving speed information to the first core network node 100. For example, the base station 600 (the first communication processing unit 641) may transmit, to the first core network node 100, an S1AP message including the location information and the moving speed information.

Base Station

For example, the base station 600 (the information obtaining unit 645) obtains location information indicating a location of the base station 600, and moving speed information indicating a moving speed of the base station 600. Then, the base station 600 (the first communication processing unit 641) may transmit the location information and the moving speed information to the first core network node 100. The first core network node 100 receives the location information and the moving speed information. For example, the base station 600 (the first communication processing unit 641) may transmit, to the first core network node 100, an S1AP message including the location information and the moving speed information.

(9-3) Traffic Information

Terminal Apparatus

For example, the terminal apparatus 700 (the information obtaining unit 733) obtains traffic information indicating traffic of the terminal apparatus 700 or a communication bearer of the terminal apparatus 700 (e.g. traffic counted by the terminal apparatus 700) in licensed spectrum or unlicensed spectrum. Then, the terminal apparatus 700 (the communication processing unit 731) transmits the traffic information to the first core network node 100 (via the base station 600). The first core network node 100 receives the traffic information. For example, the terminal apparatus 700 (the communication processing unit 731) transmits, to the first core network node 100, a NAS message including the traffic information.

Alternatively, the terminal apparatus 700 (the communication processing unit 731) may transmit the traffic information to the base station 600. For example, the terminal apparatus 700 (the communication processing unit 731) may transmit, to the base station 600, an RRC message including the traffic information, and the base station 600 (the second communication processing unit 643) receives the traffic information. Then, the base station 600 (the first communication processing unit 641) may transmit the traffic information to the first core network node 100. For example, the base station 600 (the first communication processing unit 641) may transmit, to the first core network node 100, an S1AP message including the traffic information.

Base Station

For example, the base station 600 (the information obtaining unit 645) obtains traffic information indicating traffic of the terminal apparatus 700 or a communication bearer of the terminal apparatus 700 (e.g. traffic counted by the base station 600) in licensed spectrum or unlicensed spectrum. Then, the base station 600 (the first communication processing unit 641) may transmit the traffic information to the first core network node 100. The first core network node 100 receives the traffic information. For example, the base station 600 (the first communication processing unit 641) may transmit, to the first core network node 100, an S1AP message including the traffic information.

(9-4) Usage Status Information

The base station 600 (the information obtaining unit 645) obtains usage status information indicating usage status of unlicensed spectrum for a communication bearer. Then, the base station 600 (the first communication processing unit 641) may transmit the usage status information to the first core network node 100 (or another core network node).

For example, the usage status information is information indicating whether unlicensed spectrum is used for the communication bearer. Alternatively, the usage status information may be information indicating a specific spectrum used for the communication bearer.

This enables the core network 10 to know usage status of unlicensed spectrum per communication bearer.

(9-5) Others

Access Point Name (APN) for communication using unlicensed spectrum may be defined, and the APN may be input by a user in the terminal apparatus 700. Then the APN may be also transmitted to the first core network node 100 or the base station 600.

(10) A Series of Operation Related to Control Information

Figure 18:
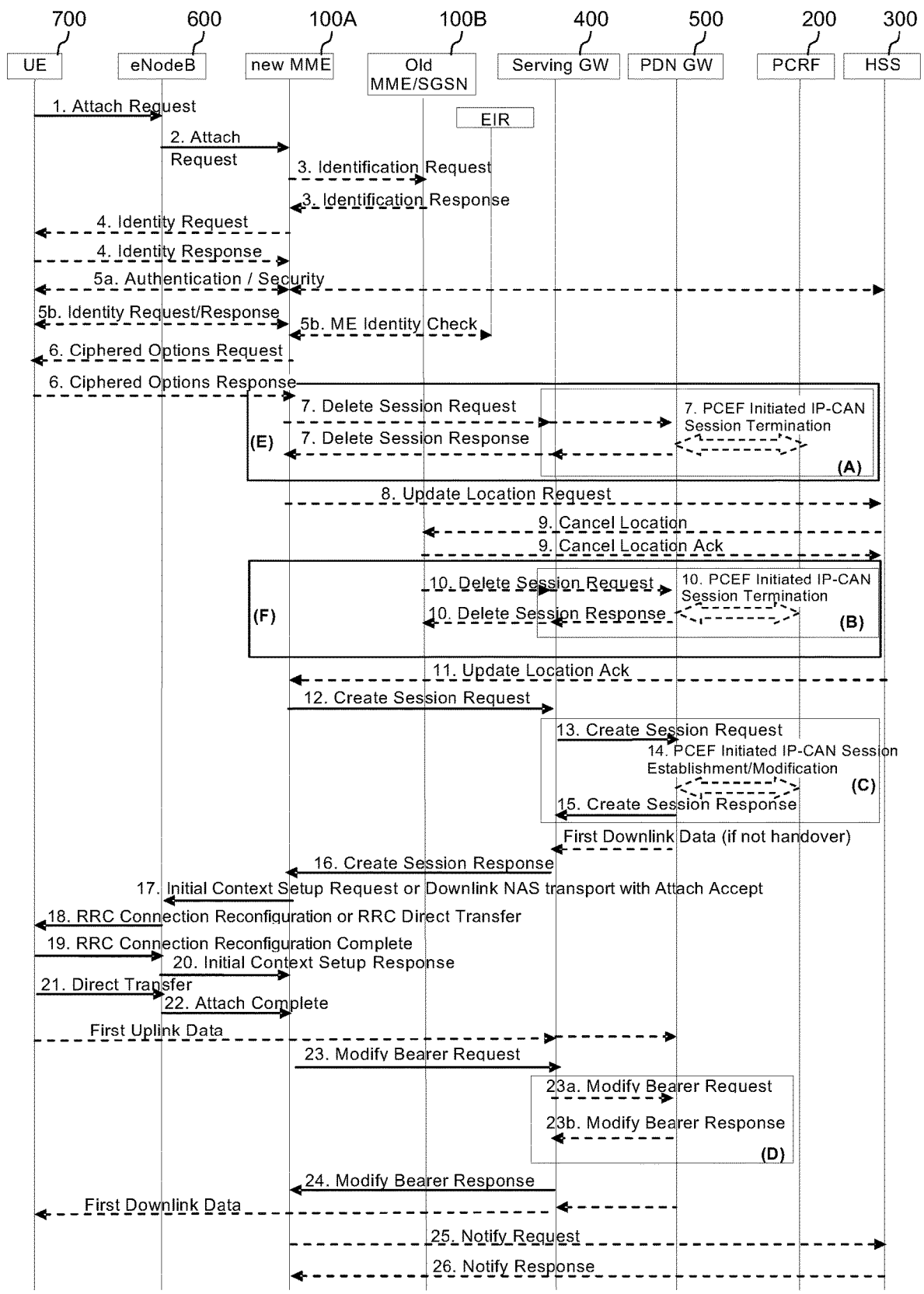
FIG. 18 is a sequence diagram for describing a series of operations related to control information according to a first example embodiment.

FIG. 18 is a sequence diagram for describing a series of operations related to control information according to a first example embodiment. The sequence diagram is a sequence diagram of Attach request procedure (3GPP TS 24.301).

In step 1, the UE 700 transmits ATTACH REQUEST message. If a default bearer is established, the ATTACH REQUEST message includes a PDN CONNECTIVITY REQUEST message in an EMS message container. Furthermore, the PDN CONNECTIVITY REQUEST message includes Protocol configuration option (3GPP TS 24.008, 10.5.6.3). This Protocol configuration option includes License Exempt Access Preference parameter (preference information).

In step 8, the MME 100A transmits, to an HSS 300, an UPDATE LOCATION message for performing location registration (3GPP TS 29.272 V14.3.0). In step 11, the HSS 300 transmits an UPDATE LOCATION ANSWER message to the MME 100A. The UPDATE LOCATION ANSWER message includes License Exempt Access Permission parameter (subscriber information) and one or more QoS parameters for unlicensed spectrum (subscriber information).

In step 12 and 13, a CREATE SESSION REQUEST message is transmitted from the MME 100 to the S-GW 400, and transmitted from the S-GW 400 to the P-GW 500. The CREATE SESSION REQUEST message includes parameters such as, for example, License Exempt Access preference parameter (preference information), License Exempt Access Permission parameter (subscriber information), one or more QoS parameters for unlicensed spectrum (subscriber information) and the like. In step 14, these parameters are transmitted from the P-GW 500 to the PCRF 200.

The PCRF 200 generates License Exempt Access Policy (second control information) based on the parameters transmitted from the P-GW 500 to the PCRF 200 and charging information stored by the PCRF 200. Furthermore, the PCRF 200 may generate one or more QoS parameters for unlicensed spectrum (first control information) based on the parameters and the charging information. In step 14, PCRF 200 transmits the License Exempt Access policy (second control information) and one or more QoS parameters for unlicensed spectrum (first control information) to the P-GW 500.

In step 15 and 16, a CREATE SESSION RESPONSE message is transmitted form the P-GW 500 to the S-GW 400, and transmitted from the S-GW 400 to the MME 100. The CREATE SESSION RESPONSE message includes, for example, License Exempt Access Policy (the second control information) and one or more QoS parameters for unlicensed spectrum (the first control information).

MME 100 generates License Exempt Access Profile (the second control information) based on License Exempt Access Preference parameter (preference information), License Exempt Access Permission parameter (subscriber information), License Exempt Access Policy (the second control information) and the like. MME 100 generates one or more QoS parameters for unlicensed spectrum (the first control information) based on the one or more QoS parameters transmitted by the PCRF 200 and/or the HSS 300 (first control information and/or subscriber information) and the like.

In step 17, the MME 100 transmits an INITIAL CONTEXT SETUP REQUEST message to the eNB 600. The INITIAL CONTEXT SETUP REQUEST message includes License Exempt Access Profile (the second control information) and the one or more QoS parameters for unlicensed spectrum (the first control information).

The eNB 600 determines a spectrum to be used for E-RAB based on License Exempt Access Profile (second control information) and the like.

For example, in step 18, the eNB 600 transmits, to the UE 700, an RRC message including information indicating the spectrum (second control information) and the one or more QoS parameters for unlicensed spectrum (first control information).

(11) Supplement for a 5G system

Even in a 5G system, the preference information (License Exempt Access Preference) is provided by the terminal apparatus 700 (UE 700) as described above. For example, it is desired to use a licensed band when high reliability and low latency are desired as Ultra-Reliable Low-Latency Communications (URLLC). Therefore, in such a case, for example, the preference information indicates "(2) not allow use of an unlicensed band".

Even in a 5G system, the subscriber information (License Exempt Access Permission) is stored by the third core network node 300 (UDM 300) as described above. For example, if the terminal apparatus 700 (UE 700) is a terminal apparatus for Massive IoT communication, communication may be performed periodically for a long time, and delay of data may be acceptable. Therefore, in such a case, for example, the subscriber information (License Exempt Access Permission) indicates "(1) allow only an unlicensed band".

The "communication bearer" described in the first example embodiment is, for example, a PDU session in a 5G system. Therefore, "communication bearer" may be replaced with "PDU session" in the above descriptions. For example, the first core network node 100 (AMF/SMF 100)

transmits the first control information, the second control information and/or the third control information to the base station 600 (the gNB 600 or the ng-eNB 600) at the time of establishment request of a PDU session.

In a 5G system, a network slice may be considered. For example, the first control information and/or the second control information may be generated based on a network slice. As one example, the second control information (information regarding which of licensed spectrum and unlicensed spectrum is used) may be generated per network slice (and PDU session, communication service quality (QoS) or terminal apparatus). The base station 600 (the gNB 600 or the ng-eNB 600) may determine a spectrum to be used per network slice (and PDU session, communication service quality (QoS) or terminal apparatus).

In a 5G system, "communication service quality for a network slice" may be defined instead of "communication service quality for unlicensed spectrum" or together with "communication service quality for unlicensed spectrum".

(12) Examples of Other Systems

The system 1 according to the first example embodiment is not limited to a 4G system or a 5G system. For example, the system 1 may be a W-CDMA or CDMA based third generation (3G) system, and the base station 600 may be a radio network controller (RNC) and/or a Node B. For example, the system 1 may be a second generation (2G) system such as GSM (registered trademark) or the like, and the base station 600 may be a base station controller (BSC) and/or a base transceiver station (BTS).

The technical features of the first example embodiment may be applied, in the same manner, to communication by a relay node, communication between terminal apparatuses such as proximity service (ProSe) and D2D, or communication of V2X. In this case, for example, the base station 600 may be a relay node, a terminal apparatus which performs communication between terminal apparatuses, or a node which performs V2X communication respectively.

(13) Others

In the first example embodiment, communication using unlicensed spectrum is not limited to communication of a mobile communication method such as LTE or NR or communication of WLAN. Communication using unlicensed spectrum may be MuLTEFire, or may be Zigbee (registered trademark), Bluetooth (registered trademark), Low-Power Wide-Area Network (LPWA), WiSUN, LoRa, SIGFOX or the like. Such communication and communication of licensed spectrum (e.g. communication of LTE or NR) may be combined.

<<2.4. First Example Modification>>

An above described example of the first example embodiment, the first core network node 100 (e.g. the MME 100 or AMF/SMF 100) generates the first control information and the second control information, and transmits the first control information and the second control information to the base station 600. However, the first example embodiment is not limited to this example.

For example, according to the first example modification of the first example embodiment, an operation and maintenance apparatus 800 may generate the first control information and the second control information, and transmit the first control information and the second control information to the base station 600. That is, the above described operations of the first core network node 100 may be performed by the operation and maintenance apparatus 800.

Figure 19:
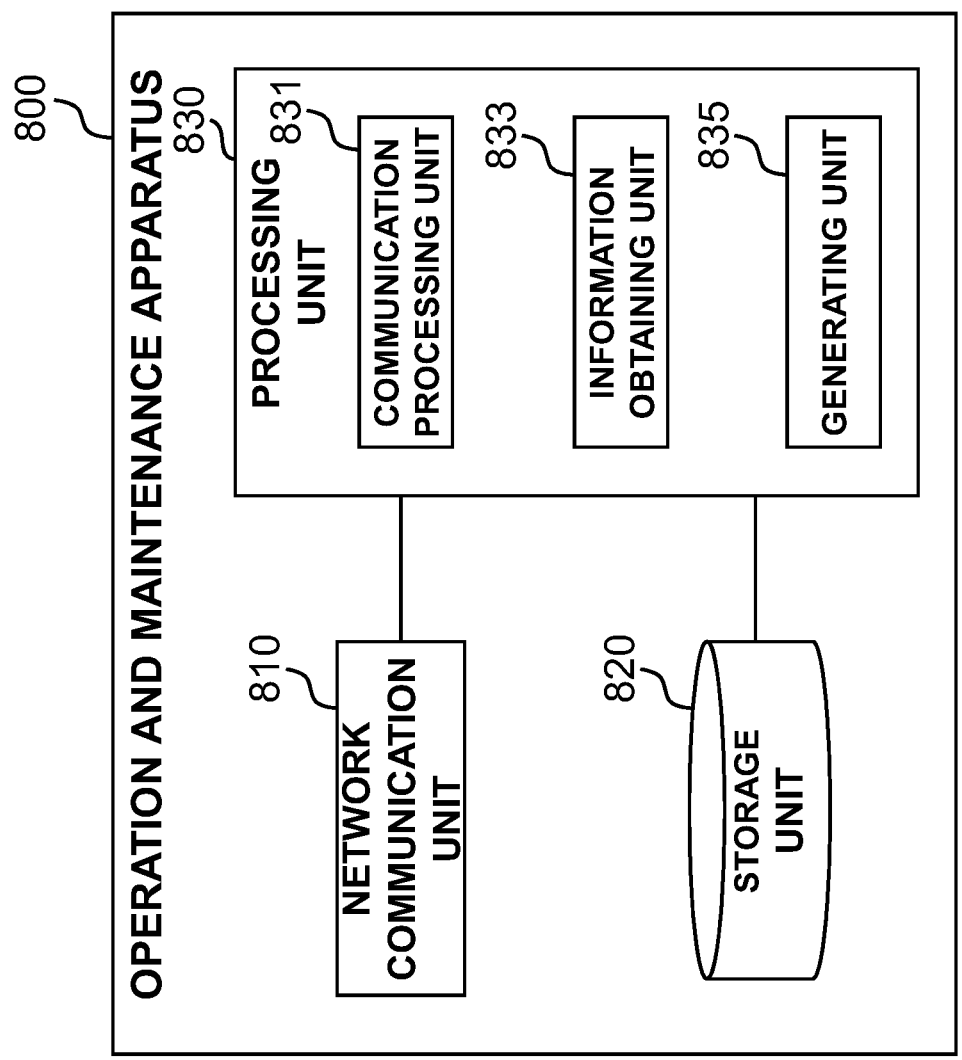
FIG. 19 is a block diagram illustrating an example of a schematic configuration of an operation and management apparatus according to a first example modification of a first example embodiment.

FIG. 19 is a block diagram illustrating an example of a schematic configuration of the operation and management apparatus 800 according to the first example modification of the first example embodiment. Referring to FIG. 19, the operation and management apparatus 800 includes a network communication unit 810, a storage unit 820 and a processing unit 830. In addition, the processing unit 830 includes the communication processing unit 831, the information obtaining unit 833 and the generating unit 835.

Note that descriptions for the network communication unit 810, the storage unit 820 and the processing unit 830 of the operation and management apparatus 800 are, for example, the same as above descriptions for the network communication unit 110, the storage unit 120 and the processing unit 130 of the first core network node 100. In addition, descriptions of the communication processing unit 831, the information obtaining unit 833 and the generating unit 835 of the operation and management apparatus 800 are, for example, the same as above descriptions for the communication processing unit 131, the information obtaining unit 133 and the generating unit 135 of the first core network node 100. Hence, overlapping descriptions are omitted here.

<<2.5. Second Example Modification>>

In the second example modification of the first example embodiment, a method of charging for unlicensed spectrum may be introduced.

(1) Technical Problem

A mobile network operator which uses license spectrum (spectrum for which a license is required) holds a license of the licensed spectrum by paying a spectrum user fee or making a large investment by a frequency auction.

A mobile network operator does business activities by collecting communication fees from users of mobile phones. There are various forms of communication fees. As one example, a communication fee for voice communication is a fixed fee (for example monthly), and a communication fee for packet communication is a fixed fee for data volume equal to or less than predetermined volume. Regarding packet communication, when data volume exceeds the predetermined volume, a communication rate is limited to a low rate. However, the limitation is lifted by paying an additional fee. That is, regarding packet communication, when data volume exceeds the predetermined volume, a communication fee is substantially a pay-as-you-go fee.

On the other hand, communication using unlicensed spectrum (spectrum for which no license is required) (e.g. LAA, LWA, LWIP, RCLWI, LTE-U or the like) may be performed. A mobile network operator does not have to pay a spectrum user fee or make a large investment for use of unlicensed spectrum. Therefore, it is reasonable to differentiate charging between communication using licensed spectrum and communication using unlicensed spectrum.

For example, if Unlicensed National Information Infrastructure (U-NII-1) or U-NII-3 of 5 GHz for which no license is required is used, no payment of a spectrum user fee and no large investment by a frequency auction is required. Therefore, it is reasonable that a communication fee is comparably low.

However, in 3GPP (e.g. 3GPP TS 23.203, 3GP TS 32.251, and the like), differentiation of charging is not considered for communication methods such as LAA, LWA, LWIP, RCLWI, LTE-U and the like.

Specifically, there are descriptions for IP Flow Mobility (IFOM) Charging in 5.2.1.7 of 3GPP TS 32.251. In IFOM, it is assumed that different IP flows in the same PDN connection are connected/transmitted simultaneously in 3GPP and WLAN respectively. It is described that Flow-based bearer charging (FBC) is performed for respective accesses in the P-GW in this case. As access types of connection destinations are different, the P-GW can identify whether it is WLAN or LTE. Specifically, the P-GW communicates with an ePDG (in case of untrusted WLAN access) or TWAG (in case of trusted WLAN access) in case of WLAN, and communicates with a S-GW in case of LTE. Therefore, the P-GW can know, from communication with the S-GW, that the communication is communication of LTE, or can know, from communication with the ePDG or the TWAG, that the communication is communication of WLAN.

However, a charging method used in IFOM and the like cannot be applied to an access method using unlicensed spectrum (License Exempt Access). Specifically, for example, in LAA, licensed spectrum and unlicensed spectrum is used by carrier aggregation for transmission of downlink data from an eNB to a UE. Although data of each E-RAB is transmitted on a GTP tunnel from an S-GW to an eNB, the S-GW cannot know whether the eNB uses licensed spectrum or unlicensed spectrum for transmission of the data. In addition, of course, the S-GW cannot know volume of data transmitted using unlicensed spectrum. Therefore, the S-GW cannot differentiate use of licensed spectrum and use of unlicensed spectrum to count data volume. Therefore, it is not possible to differentiate data volume in licensed spectrum and data volume in unlicensed spectrum to perform charging when LAA, LTE-U, LWA, LWIP, RCLWI or the like is used.

In the same manner, there is no method, in a base station, to report data volume (volume of transmitted or received data, and volume of data which failed to be transmitted or received) per spectrum to a core network when a plurality of spectrums are used by carrier aggregation (CA), dual connectivity (DC) or the like. Therefore, it is not possible to differentiate use of licensed spectrum and use of unlicensed spectrum to perform charging in a core network.

Regarding this, for example, PLT (JP 2016-197796 A) describes "a function to count volume of data transmitted or received in each of licensed spectrum and unlicensed spectrum, and to notify a control apparatus of the result, may be included". In addition, another PLT (JP 2015-167313 A) describes a method to add a charging flag to data and report data volume. However, as it is not guaranteed that QoS predetermined for an unlicensed band is achieved, QoS in unlicensed spectrum is not achieved even if charging for users is guaranteed.

(2) Technical Features

According to the second example modification of the first example embodiment, the base station 600 (the information obtaining unit 645) obtains usage information regarding use of unlicensed spectrum for a communication bearer (E-RAB). Then the base station 600 (the first communication processing unit 641) transmits the usage information to the core network 10.

For example, the usage information is information indicating which of licensed spectrum and unlicensed spectrum is used for a communication bearer (E-RAB). Alternatively, the usage information may be information indicating a spectrum to be used for a communication bearer (E-RAB).

For example, the base station 600 (the first communication processing unit 641) transmits, to the core network 10, a message including the usage information. The message may be an S1AP INITIAL CONTEXT SETUP RESPONSE message. Alternatively, the message may be an E-RAB SETUP RESPONSE, a HANDOVER NOTIFY, a PATH SWITCH REQUEST, an E-RAB MODIFICATION INDICATION and/or the like. Note that the message is not limited to these examples.

For example, the base station 600 (the first communication processing unit 641) transmits the usage information to the first core network node 100. Then the first core network node 100 (the communication processing unit 131) receives the usage information, and transmits the usage information to the fourth core network node 400 and/or the fifth core network node 500.

This enables, for example, the fourth core network node 400 and/or the fifth core network node 500 to know whether unlicensed spectrum is used for a communication bearer. Therefore, the fourth core network node 400 and/or the fifth core network node 500 may count data volume for a licensed band and data volume for an unlicensed band, and may calculate an achievement level of QoS.

When spectrum used for a communication bearer is changed due to a handover or the like, the base station 600 (the first communication processing unit 641) transmits new usage information to the first core network node 100. For example, the base station 600 (the first communication processing unit 641) transmits, to the first core network node 100, a message (e.g. an E-RAB MODIFICATION INDICATION or the like) including the usage information. Furthermore, this usage information is transmitted to the fourth core network node 400 and/or the fifth core network node 500.

GTP protocol may be used for transmission of the usage information except S1AP protocol. For example, a GTP header may be extended as described in FIG. 20. Specifically, Extension Header Type of a GTP header of 3GPP TS 29.281 V.14.0.0 may be extended. This enables the fourth core network node 400 (S-GW) and/or the fifth core network node 500 (P-GW) to know whether an unlicensed band is used for an E-RAB. Therefore, the fourth core network node 400 and/or the fifth core network node 500 may count data volume for licensed spectrum and data volume for unlicensed spectrum, and may calculate an achievement level of QoS.

In case of LAA, LTE-U, LWA, LWIP, RCLWI or the like, the base station 600 (the first communication processing unit 641 and the second communication processing unit 643) may count data volume of PDCP protocol data units (PDUs) transmitted or received in an unlicensed band per QCI and volume of data transmitted or received in a licensed band, and may calculate an achievement level of QoS in an unlicensed band. The Data volume may be counted for each of downlink and uplink. Counted data volume may be data volume at a PDCP PDU level, or may be data volume at a PDCP SDU level.

Notification of data volume and/or an achievement level of QoS may be performed per QoS flow, per radio communication method, or per spectrum.

For example, the base station 600 (the first communication processing unit 641) notifies a Charging Data Function (CDF) of data volume and/or an achievement level of QoS in case of offline charging of CDR. The base station 600 (the first communication processing unit 641) notifies an Online Charging System (OCS) of data volume and/or an achievement level of QoS in case of online charging. Alternatively, the base station 600 (the first communication processing unit 641) may notify an operation and maintenance apparatus of the base station 600 of CDR, and the operation and maintenance apparatus may notify the CDF or the OCS of CDR. The CDF or the OCS can perform charging processing based on both CDR from the base station 600 and CDR from the fourth core network node 400 (S-GW) and/or the fifth core network node 500 (P-GW). For example, it is possible to differentiate pay-as-you-go charging in an unlicensed band and pay-as-you-go charging in a licensed band. In addition, pay-as-you-go charging per spectrum is also possible.

Alternatively, the base station 600 (the first communication processing unit 641) may notify the first core network node 100 (MME) of data volume and/or an achievement level of QoS (e.g. per licensed band/unlicensed band, per frequency band, per QCI, or per downlink/uplink). The first core network node 100 (the communication processing unit 131) may notify the CDF or the OCS of data volume and/or an achievement level of QoS as CDR. Alternatively, the first core network node 100 (the communication processing unit 131) may notify the fourth core network node 400 of data volume and/or an achievement level of QoS, and the fourth core network node 400 may notify CDF or OCS of data volume and/or an achievement level of QoS as CDR.

When LIPA or SIPTO is performed, the base station 600 (the first communication processing unit 641) may notify the CDF or the OCS of data volume and/or an achievement level of QoS as CDR via L-GW. The base station 600 (the first communication processing unit 641) may notify the CDF or the OCS of data volume and/or an achievement level of QoS as CDR via a MEC server.

The terminal apparatus 700 (the communication processing unit 731) may calculate a count of data volume and/or an achievement level of QoS (as well as base station 600). Then the terminal apparatus 700 (the communication processing unit 731) may notify the base station 600 of data volume and/or an achievement level of QoS in an RRC message. Alternatively, the terminal apparatus 700 (the communication processing unit 731) may notify the first core network node 100 of data volume and/or an achievement level of QoS in a NAS message.

Note that notification of data volume and/or an achievement level of QoS may be performed at the time of release of a communication bearer or periodically.

Of course, the above described technical features may be applied not only if the system 1 is a 4G system but also if the system 1 is a 5G system.

<<<3. Second Example Embodiment>>>

Figure 21:
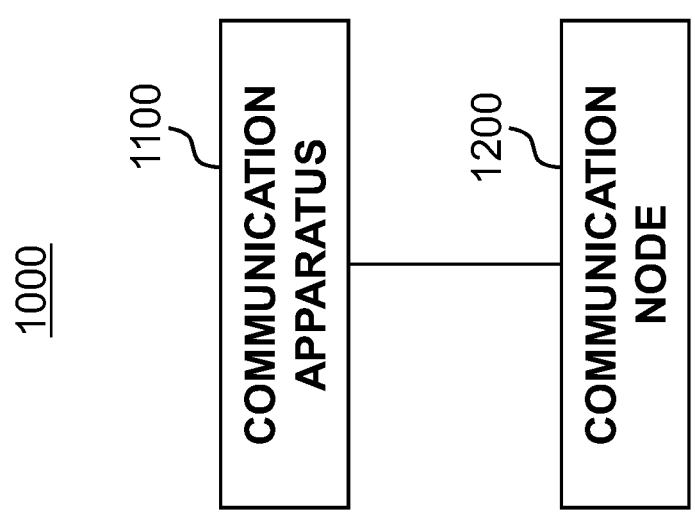
FIG. 21 is an explanatory diagram illustrating an example of a schematic configuration of a system according to a second example embodiment.

Subsequently, a second example embodiment of the present disclosure will be described with reference to FIG. 21 to FIG. 22. While the above described first example embodiment is a specific example embodiment, the second example embodiment is an example embodiment more generalized from a certain point of view.

<<3.1. Configuration of System>>

Firstly, a system 1000 according to the second example embodiment is described with reference to FIG. 21. FIG. 21 is an explanatory diagram illustrating an example of a schematic configuration of the system 1000 according to the second example embodiment of the present disclosure. Referring to FIG. 21, the system 1000 includes a communication apparatus 1100 and a communication node 1200.

The communication node 1200 is a node which communicates in a radio access network.

As one example, the communication apparatus 1100 is the first core network node 100 of the first example embodiment. In this case, the communication node 1200 is the base station 600 or the terminal apparatus 700 of the first example embodiment.

As another example, the communication apparatus 1100 may be the base station 600 of the first example embodiment. In this case, the communication node 1200 is the terminal apparatus 700 or another base station of the first example embodiment.

Note that the communication apparatus 1100 and the communication node 1200 of the second example embodiment is not limited to these examples.

<<3.2. Configuration of Communication Apparatus>>

Figure 22:
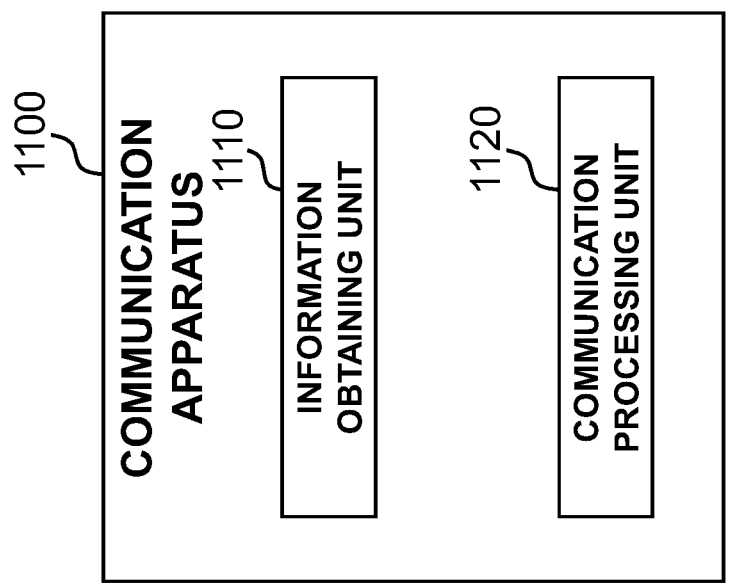
FIG. 22 is a block diagram illustrating an example of a schematic configuration of a communication apparatus according to a second example embodiment.

FIG. 22 is a block diagram illustrating an example of a schematic configuration of the communication apparatus 1100 according to the second example embodiment. Referring to FIG. 22, the communication apparatus 1100 includes an information obtaining unit 1110 and a communication processing unit 1120.

Specific operations of the information obtaining unit 1110 and the communication processing unit 1120 will be described later.

The information obtaining unit 1110 and the communication processing unit 1120 may be implemented with one or more processors and a memory. The memory may be included in the one or more processors, or may be outside of the one or more processors.

The communication apparatus 1100 may include a memory storing a program (instructions) and one or more processors capable of executing the program (instructions). The one or more processors may execute the program to perform the operations of the information obtaining unit 1110 and the communication processing unit 1120. The program may be a program that causes a processor to execute the operations of the information obtaining unit 1110 and the communication processing unit 1120.

Note that the communication apparatus 1100 may be virtualized. In other words, the communication apparatus 1100 may be implemented as a virtualized machine. In this case, the communication apparatus 1100 (the virtualized machine) may operate as a virtual machine on a physical machine (hardware) including a processor, a memory and the like and a hypervisor.

<<3.3. Technical Features>>

Technical features of the second example embodiment are described.

The communication apparatus 1100 (the information obtaining unit 1110) obtains first control information indicating communication service quality for unlicensed spectrum. Then the communication apparatus 1100 (the communication processing unit 1120 transmits the first control information to the communication node 1200.

Descriptions for specific content and generation method of the first control information are, for example, the same as the above descriptions for the first example embodiment. Descriptions for operations based on the first control information are, for example, the same as the above descriptions for the first example embodiment. Hence, overlapping descriptions are omitted here. Note that the second example embodiment is not limited to this example.

Accordingly, for example, radio communication may be performed so that communication service quality for unlicensed spectrum is achieved in unlicensed spectrum. Therefore, a good communication service may be provided even when unlicensed spectrum is used.

<<<4. Third Example Embodiment>>>

Subsequently, a third example embodiment of the present disclosure will be described with reference to FIG. 23 to FIG. 26. While the above described first example embodiment is a specific example embodiment, the third example embodiment is an example embodiment more generalized from a certain point of view (which is different form one of the second example embodiment).

<<4.1. Configuration of System>>

Figure 23:
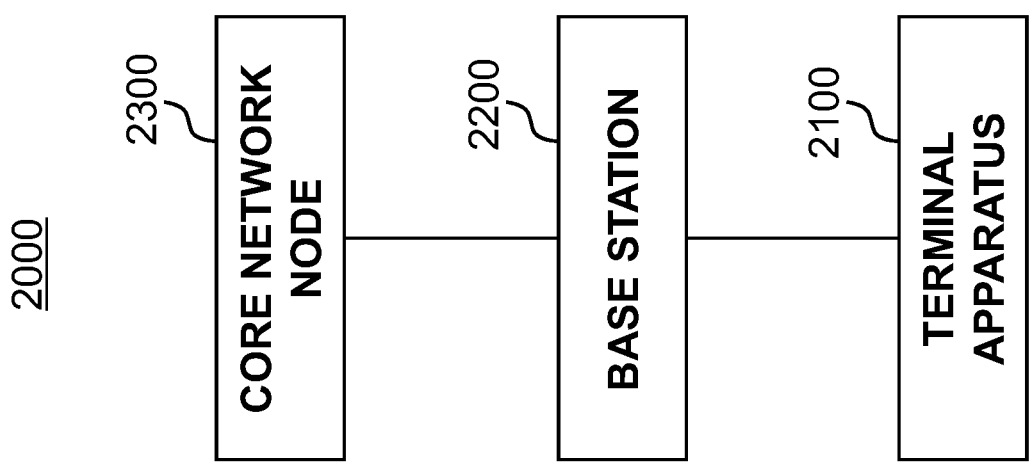
FIG. 23 is an explanatory diagram illustrating an example of a schematic configuration of a system according to a third example embodiment.

Firstly, a system 2000 according to the third example embodiment is described with reference to FIG. 23. FIG. 23 is an explanatory diagram illustrating an example of a schematic configuration of the system 2000 according to the third example embodiment of the present disclosure. Referring to FIG. 23, the system 2000 includes a terminal apparatus 2100, a base station 2200 and a core network node 2300.

As one example, the terminal apparatus 2100 is the terminal apparatus 700 of the first example embodiment, the base station 2200 is the base station 600 of the first example embodiment, and the core network node 2300 is the first core network node 100 of the first example embodiment.

Note that the terminal apparatus 2100, the base station 2200 and the core network node 2300 of the third example embodiment are not limited to this example.

<<4.2. Configuration of Each Node>>

Next, a configuration of each node according to the third example embodiment is described with reference to FIG. 24 to FIG. 26.

<<4.2.1. Configuration of Terminal Apparatus>>

Figure 24:
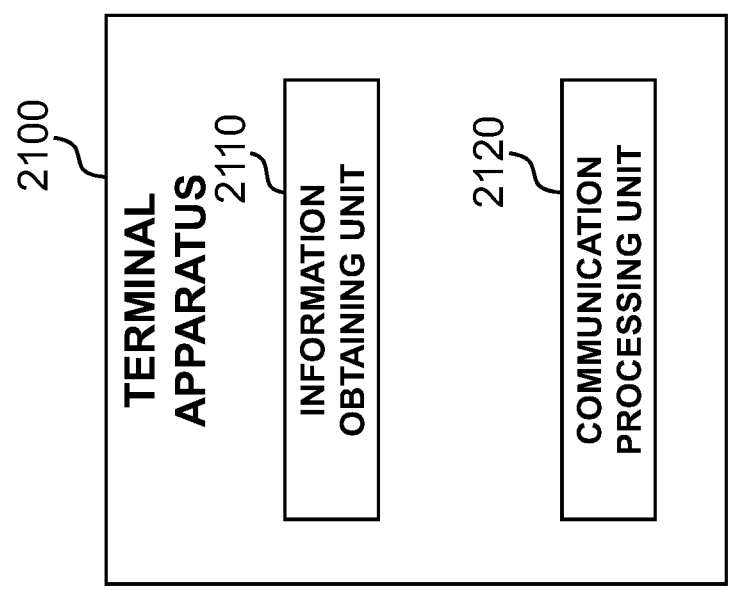
FIG. 24 is a block diagram illustrating an example of a schematic configuration of a terminal apparatus according to a third example embodiment.

FIG. 24 is a block diagram illustrating an example of a schematic configuration of the terminal apparatus 2100 according to the third example embodiment. Referring to FIG. 24, the terminal apparatus 2100 includes an information obtaining unit 2110 and a communication processing unit 2120.

Specific operations of the information obtaining unit 2110 and the communication processing unit 2120 will be described later.

The information obtaining unit 2110 and the communication processing unit 2120 may be implemented with one or more processors and a memory. The memory may be included in the one or more processors, or may be outside of the one or more processors.

The terminal apparatus 2100 may include a memory storing a program (instructions) and one or more processors capable of executing the program (instructions). The one or more processors may execute the program to perform the operations of the information obtaining unit 2110 and the communication processing unit 2120. The program may be a program that causes a processor to execute the operations of the information obtaining unit 2110 and the communication processing unit 2120.

<<4.2.2. Configuration of Base Station>>

Figure 25:
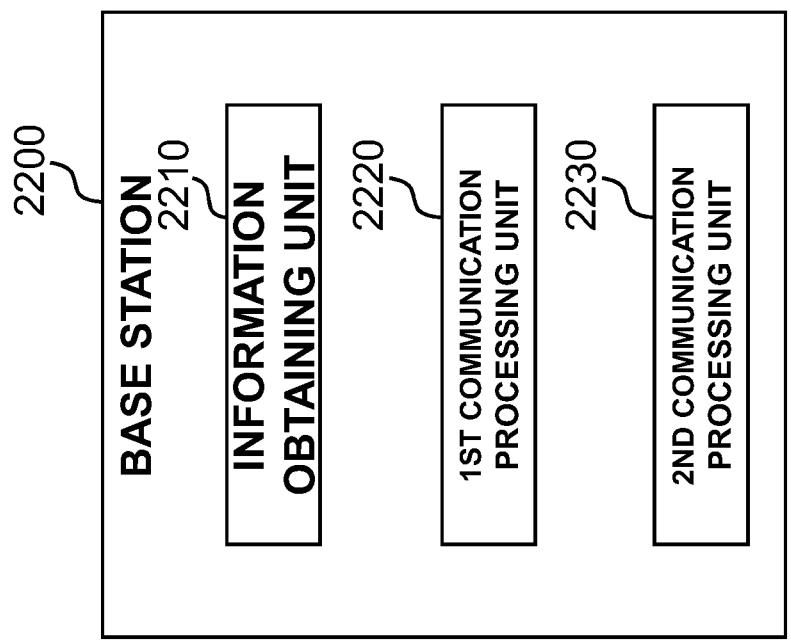
FIG. 25 is a block diagram illustrating an example of a schematic configuration of a base station according to a third example embodiment.

FIG. 25 is a block diagram illustrating an example of a schematic configuration of the base station 2200 according to the third example embodiment. Referring to FIG. 25, the base station 2200 includes an information obtaining unit 2210, a first communication processing unit 2220 and a second communication processing unit 2230.

Specific operations of the information obtaining unit 2210, the first communication processing unit 2220 and the second communication processing unit 2230 will be described later.

The information obtaining unit 2210, the first communication processing unit 2220 and the second communication processing unit 2230 may be implemented with one or more processors and a memory. The memory may be included in the one or more processors, or may be outside of the one or more processors.

The base station 2200 may include a memory storing a program (instructions) and one or more processors capable of executing the program (instructions). The one or more processors may execute the program to perform the operations of the information obtaining unit 2210, the first communication processing unit 2220 and the second communication processing unit 2230. The program may be a program that causes a processor to execute the operations of the information obtaining unit 2210, the first communication processing unit 2220 and the second communication processing unit 2230.

Note that the base station 2200 may be virtualized. In other words, the base station 2200 may be implemented as a virtualized machine. In this case, the base station 2200 (the virtualized machine) may operate as a virtual machine on a physical machine (hardware) including a processor, a memory and the like and a hypervisor.

<<4.2.3. Configuration of Core Network Node>>

Figure 26:
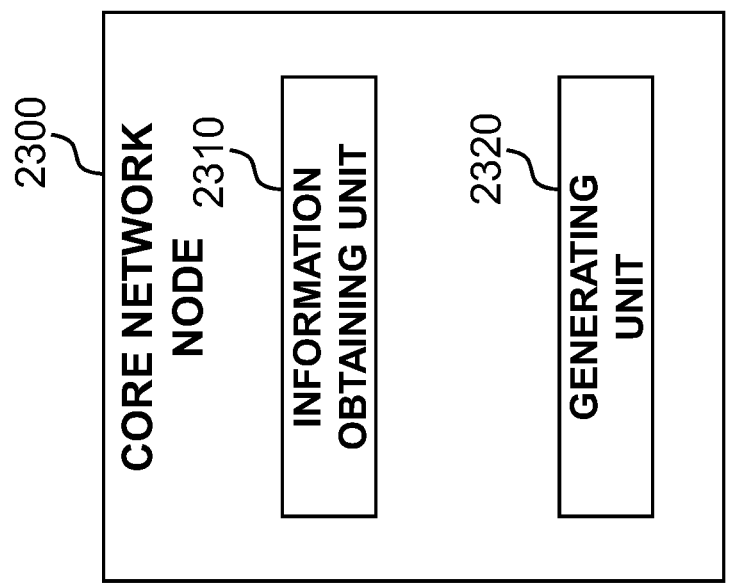
FIG. 26 is a block diagram illustrating an example of a schematic configuration of a core network node according to a third example embodiment.

FIG. 26 is a block diagram illustrating an example of a schematic configuration of the core network node 2300 according to the third example embodiment. Referring to FIG. 26, the core network node 2300 includes an information obtaining unit 2310 and a generating unit 2320.

Specific operations of the information obtaining unit 2310 and the generating unit 2320 will be described later.

The information obtaining unit 2310 and the generating unit 2320 may be implemented with one or more processors and a memory. The memory may be included in the one or more processors, or may be outside of the one or more processors.

The core network node 2300 may include a memory storing a program (instructions) and one or more processors capable of executing the program (instructions). The one or more processors may execute the program to perform the operations of the information obtaining unit 2310 and the generating unit 2320. The program may be a program that causes a processor to execute the operations of the information obtaining unit 2310 and the generating unit 2320.

Note that the core network node 2300 may be virtualized. In other words, the core network node 2300 may be implemented as a virtualized machine. In this case, the core network node 2300 (the virtualized machine) may operate as a virtual machine on a physical machine (hardware) including a processor, a memory and the like and a hypervisor.

<<4.3. Technical Features>>

Technical features of the third example embodiment are described.

(1) Operations of a Terminal Apparatus

The terminal apparatus 2100 (the information obtaining unit 2110) obtains quality related information related to achievement status of communication service quality for unlicensed spectrum in unlicensed spectrum. Then the terminal apparatus 2100 (the communication processing unit 2120) transmits the quality related information to the base station 2200 or the core network node 2300.

Descriptions for specific content, generation method and transmission method of the quality related information are, for example, the same as the above descriptions for the first example embodiment. Hence, overlapping descriptions are omitted here. Note that the third example embodiment is not limited to this example.

(2) Operations of a Base Station

First Operation

The base station 2200 (the information obtaining unit 2210) obtains quality related information related to achievement status of communication service quality for unlicensed spectrum in unlicensed spectrum. The quality related information is quality related information for the terminal apparatus 2100 communicating the base station 2200. Then the base station 2200 (the second communication processing unit 2230) performs switch of spectrum (or a base station) for the terminal apparatus 700 based on the quality related information.

Descriptions for specific content and generation method of the quality related information, and descriptions for a switching method are, for example, the same as the above descriptions for the first example embodiment. Hence, overlapping descriptions are omitted here. Note that the third example embodiment is not limited to this example.

Accordingly, for example, spectrum is switched when communication service quality for unlicensed spectrum is not achieved. As a result, only if the communication service quality is achieved, unlicensed spectrum may be used. In other words, while unlicensed spectrum is used, the communication service quality is generally achieved. In this manner, a good service may be provided even when unlicensed spectrum is used.

Second Operation

The base station 2200 (the information obtaining unit 2210) obtains quality related information related to achievement status of communication service quality for unlicensed spectrum in unlicensed spectrum. Then the base station 2200 (the first communication processing unit 2220) transmits the quality related information to the core network node 2300.

Descriptions for specific content, generation method and transmission method of the quality related information are, for example, the same as the above descriptions for the first example embodiment. Hence, overlapping descriptions are omitted here. Note that the third example embodiment is not limited to this example.

(3) Operations of a Core Network Node

The core network node 2300 (information obtaining unit 2310) obtains quality related information related to achievement status of communication service quality for unlicensed spectrum in unlicensed spectrum. Then the core network node 2300 (the generating unit 2320) generates, based on the quality related information, first control information indicating the communication service quality, or second control information regarding which of licensed spectrum and unlicensed spectrum is used.

Descriptions for specific content of the quality related information and generation method of the first control information and the second control information are, for example, the same as the above descriptions for the first example embodiment. Hence, overlapping descriptions are omitted here. Note that the third example embodiment is not limited to this example.

This makes it possible, for example, to modify a policy for use of unlicensed spectrum in the core network 10. Therefore, a good communication service may be provided even when unlicensed spectrum is used.

While the example embodiments of the present disclosure have been described, the present disclosure is not limited to these example embodiments. It will be understood by those skilled in the art that these example embodiments are merely examples and various modification can be made without departing from the scope and the spirit of the present disclosure.

For example, the steps in any processing described herein need not be performed chronologically in the order illustrated in the corresponding sequence diagram. For example, the steps of the processing may be performed in an order different from the order illustrated as the corresponding sequence diagram or may be performed in parallel. Moreover, one or some of the steps of the processing may be deleted, or one or more steps may be added to the processing.

An apparatus including constituent elements of the nodes described herein (e.g. the communication processing unit, the information obtaining unit, the generating unit, and/or the measurement unit) may be provided. Moreover, methods including processing of such constituent elements may be provided, and programs that causes processors to execute processing of such constituent elements may be provided. Furthermore, non-transitory computer readable recording media having recorded thereon the program may be provided. Of course, such apparatuses, modules, methods, programs and non-transitory computer readable recording media are also included in the present disclosure.

Some of or all the above-described example embodiments can be described as in the following Supplementary Notes A, but are not limited to the following.

(Supplementary Note A1)

A communication apparatus comprising:

an information obtaining unit configured to obtain first control information indicating communication service quality for unlicensed spectrum; and a communication processing unit configured to transmit the first control information to a communication node which communicates in a radio access network.

(Supplementary Note A2)

The communication apparatus according to Supplementary Note A1, wherein the first control information is one or more quality of service (QoS) parameters for unlicensed spectrum.

(Supplementary Note A3)

The communication apparatus according to Supplementary Note A2, wherein the one or more QoS parameters includes one or more downlink QoS parameters for unlicensed spectrum or one or more uplink QoS parameters for unlicensed spectrum.

(Supplementary Note A4)

The communication apparatus according to Supplementary Note A2 or A3, wherein the one or more QoS parameters includes one or more communication bearer level QoS parameters for unlicensed spectrum.

(Supplementary Note A5)

The communication apparatus according to Supplementary Note A4, wherein the one or more communication bearer level QoS parameters includes at least one of a quality class identifier (QCI), an allocation and retention priority (ARP), a guaranteed bitrate (GBR), a maximum bitrate (MBR), a packet delay budget (PDB) and a packet error loss rate (PELR) for unlicensed spectrum.

(Supplementary Note A6)

The communication apparatus according to any one of Supplementary Notes A2 to A5, wherein the one or more QoS parameters includes an aggregated maximum bitrate (AMBR) for unlicensed spectrum.

(Supplementary Note A7)

The communication apparatus according to any one of Supplementary Notes A1 to A5, wherein the first control information is information generated per communication bearer.

(Supplementary Note A8)

The communication apparatus according to any one of Supplementary Notes A1 to A7, wherein the information obtaining unit is configured to obtain the first control information and second control information regarding which of licensed spectrum and unlicensed spectrum is used; and the communication processing unit is configured to transmit the first control information and the second control information to the communication node.

(Supplementary Note A9)

The communication apparatus according to Supplementary Note A8, wherein the second control information is information generated per communication bearer.

(Supplementary Note A10)

The communication apparatus according to Supplementary Note A8 or A9, wherein the second control information is information indicating which of licensed spectrum and unlicensed spectrum is used for a communication bearer.

(Supplementary Note A11)

The communication apparatus according to Supplementary Note A8 or A9, wherein the second control information is information indicating a spectrum to be used for a communication bearer, and the spectrum is one of a licensed spectrum and an unlicensed spectrum.

(Supplementary Note A12)

The communication apparatus according to any one of Supplementary Notes A8 to A11, wherein the second control information is information generated for a terminal apparatus based on terminal related information related to the terminal apparatus.

(Supplementary Note A13)

The communication apparatus according to any one of Supplementary Notes A1 to A12, wherein the first control information is information generated for a terminal apparatus based on terminal related information related to the terminal apparatus.

(Supplementary Note A14)

The communication apparatus according to any one of Supplementary Notes A12 to A13, wherein the terminal related information includes preference information on use of unlicensed spectrum, the preference information being provided by the terminal apparatus.

(Supplementary Note A15)

The communication apparatus according to any one of Supplementary Notes A12 to A14, wherein the terminal related information includes subscriber information on use of unlicensed spectrum, the subscriber information being stored in a core network for the terminal apparatus.

(Supplementary Note A16)

The communication apparatus according to any one of Supplementary Notes A12 to A15, wherein the terminal related information includes moving speed information indicating a moving speed of at least one of the terminal apparatus and a base station communicating with the terminal apparatus, or location information indicating a location of at least one of the terminal apparatus and the base station.

(Supplementary Note A17)

The communication apparatus according to any one of Supplementary Notes A12 to A16, wherein the terminal related information includes quality related information related to achievement status of communication service quality for unlicensed spectrum in unlicensed spectrum.

(Supplementary Note A18)

The communication apparatus according to Supplementary Note A17, wherein the quality related information is information indicating an achievement level of the communication service quality in unlicensed spectrum.

(Supplementary Note A19)

The communication apparatus according to Supplementary Note A18, wherein the achievement level is a time ratio at which the communication service quality is achieved in unlicensed spectrum.

(Supplementary Note A20)

The communication apparatus according to any one of Supplementary Notes A12 to A19, wherein the terminal related information includes charging information for the terminal apparatus.

(Supplementary Note A21)

The communication apparatus according to any one of Supplementary Notes A12 to A20, wherein the terminal related information includes traffic information indicating traffic of the terminal apparatus or a bearer of the terminal apparatus in licensed spectrum or unlicensed spectrum.

(Supplementary Note A22)

The communication apparatus according to any one of Supplementary Notes A1 to A21, wherein the information obtaining unit configured to obtain the first control information and third control information indicating communication service quality for licensed spectrum, and the communication processing unit is configured to transmit the first control information and the third control information to the communication node.

(Supplementary Note A23)

The communication apparatus according to any one of Supplementary Notes A1 to A22, wherein the communication apparatus is a core network node, and the communication node is a base station or a terminal apparatus.

(Supplementary Note A24)

The communication apparatus according to Supplementary Note A23, wherein the communication processing unit is configured to transmit, to the communication node, a message for configuring a communication bearer, and the message includes the first control information.

(Supplementary Note A25)

The communication apparatus according to Supplementary Note A24, wherein the communication node is a base station, and the message is an INITIAL CONTEXT SETUP REQUEST message or an E-RAB SETUP REQUUEST message.

(Supplementary Note A26)

The communication apparatus according to any one of Supplementary Notes A1 to A22, wherein the communication apparatus is an apparatus for operation and maintenance, and the communication node is a base station.

(Supplementary Note A27)

The communication apparatus according to any one of Supplementary Notes A1 to A22, wherein the communication apparatus is a base station, and the communication node is another base station or a terminal apparatus.

(Supplementary Note A28)

The communication apparatus according to Supplementary Note A27, wherein the communication processing unit is configured to transmit, to the communication node, configuration information for a logical channel or a communication bearer, and the configuration information includes the first control information.

(Supplementary Note A29)

The communication apparatus according to Supplementary Note A28, wherein the configuration information is LogicalChannelConfig.

(Supplementary Note A30)

The communication apparatus according to any one of Supplementary Notes A27 to A29, wherein the communication apparatus is a source base station of a handover, the communication node is a target base station of a handover, and the communication processing unit is configured to transmit, to the communication node, a handover request message including the first control information.

(Supplementary Note A31)

The communication apparatus according to any one of Supplementary Notes A27 to A29, wherein the communication apparatus is a master base station of dual connectivity, the communication node is a secondary base station of dual connectivity, and the communication processing unit is configured to transmit, to the communication node, a dual connectivity related message including the first control information.

(Supplementary Note A32)

A base station comprising:

a first communication processing unit configured to receive first control information indicating communication service quality for unlicensed spectrum; and a second communication processing unit configured to perform, based on the first control information, control of radio communication using unlicensed spectrum.

(Supplementary Note A33)

The base station according to Supplementary Note A32, wherein the control includes allocation of radio resources for the radio communication.

(Supplementary Note A34)

The base station according to Supplementary Note A32 or A33, wherein the control includes rate control of the radio communication.

(Supplementary Note A35)

The base station according to any one of Supplementary Notes A32 to A34, wherein the first communication processing unit is configured to transmit the first control information to another base station, or the second communication processing unit is configured to transmit the first control information to a terminal apparatus.

(Supplementary Note A36)

The base station according to any one of Supplementary Notes A32 to A35, wherein the first communication processing unit is configured to receive second control information regarding which of licensed spectrum and unlicensed spectrum is used, and the second communication processing unit is configured to determine, based on the second control information, which of licensed spectrum and unlicensed spectrum is used.

(Supplementary Note A37)

The base station according to Supplementary Note A36, wherein the second communication processing unit is configured to determine which of licensed spectrum and unlicensed spectrum is used, based on the second control information and status of communication in unlicensed spectrum.

(Supplementary Note A38)

The base station according to Supplementary Note A37, wherein the status includes at least one of status of interference in unlicensed spectrum and status of radar in unlicensed spectrum.

(Supplementary Note A39)

A terminal apparatus comprising:

a communication processing unit configured to receive first control information indicating communication service quality for unlicensed spectrum; and a measurement unit configured to perform, based on the first control information, measurement for achievement status of the communication service quality in unlicensed spectrum.

(Supplementary Note A40)

The terminal apparatus according to Supplementary Note A39, wherein the measurement is measurement of whether the communication service quality is achieved in unlicensed spectrum.

(Supplementary Note A41)

The terminal apparatus according to Supplementary Note A39, wherein the measurement is measurement of an achievement level of the communication service quality in unlicensed spectrum.

(Supplementary Note A42)

The terminal apparatus according to any one of Supplementary Notes A39 to A41, wherein the communication processing unit is configured to receive second control information regarding which of licensed spectrum and unlicensed spectrum is used, and determine, based on the second control information, a spectrum to be used.

(Supplementary Note A43)

The terminal apparatus according to Supplementary Note A42, wherein the second control information is information generated per communication bearer, and the communication processing unit is configured to determine, based on the second control information, a spectrum to be used for a communication bearer corresponding to the second control information.

(Supplementary Note A44)

A method comprising:

obtaining first control information indicating communication service quality for unlicensed spectrum; and transmitting the first control information to a communication node which communicates in a radio access network.

(Supplementary Note A45)

A method comprising:

receiving first control information indicating communication service quality for unlicensed spectrum; and performing, based on the first control information, control of radio communication using unlicensed spectrum.

(Supplementary Note A46)

A method comprising:

receiving first control information indicating communication service quality for unlicensed spectrum; and performing, based on the first control information, measurement for achievement status of the communication service quality in unlicensed spectrum.

(Supplementary Note A47)

A program that causes a processor to execute:

obtaining first control information indicating communication service quality for unlicensed spectrum; and transmitting the first control information to a communication node which communicates in a radio access network.

(Supplementary Note A48)

A program that causes a processor to execute:

receiving first control information indicating communication service quality for unlicensed spectrum; and performing, based on the first control information, control of radio communication using unlicensed spectrum.

(Supplementary Note A49)

A program that causes a processor to execute:

receiving first control information indicating communication service quality for unlicensed spectrum; and performing, based on the first control information, measurement for achievement status of the communication service quality in unlicensed spectrum.

(Supplementary Note A50)

A non-transitory computer readable recording medium having recorded thereon a program that causes a processor to execute:

obtaining first control information indicating communication service quality for unlicensed spectrum; and transmitting the first control information to a communication node which communicates in a radio access network.

(Supplementary Note A51)

A non-transitory computer readable recording medium having recorded thereon a program that causes a processor to execute:

receiving first control information indicating communication service quality for unlicensed spectrum; and performing, based on the first control information, control of radio communication using unlicensed spectrum.

(Supplementary Note A52)

A non-transitory computer readable recording medium having recorded thereon a program that causes a processor to execute:

receiving first control information indicating communication service quality for unlicensed spectrum; and performing, based on the first control information, measurement for achievement status of the communication service quality in unlicensed spectrum.

Some of or all the above-described example embodiments can be described as in the following Supplementary Notes B, but are not limited to the following.

(Supplementary Note B1)

A terminal apparatus comprising:

an information obtaining unit configured to obtain quality related information related to achievement status of communication service quality for unlicensed spectrum in unlicensed spectrum; and a communication processing unit configured to transmit the quality related information to a base station or a core network node.

(Supplementary Note B2)

The terminal apparatus according to Supplementary Note B1, wherein the communication service quality is communication service quality for a communication bearer, and the quality related information is information generated per communication bearer.

(Supplementary Note B3)

The terminal apparatus according to Supplementary Note B1 or B2, further comprising:

a measurement unit configured to perform measurement for the achievement status and generate the quality related information.

(Supplementary Note B4)

The terminal apparatus according to Supplementary Note B3, wherein the communication processing unit is configured to receive first control information indicating the communication service quality, and the measurement unit is configured to perform the measurement based on the first control information.

(Supplementary Note B5)

The terminal apparatus according to Supplementary Note B3 or B4, wherein the measurement is measurement of whether the communication service quality is achieved in unlicensed spectrum.

(Supplementary Note B6)

The terminal apparatus according to any one of Supplementary Notes B1 to B5, wherein the quality related information is information indicating that the communication service quality is not achieved in unlicensed spectrum.

(Supplementary Note B7)

The terminal apparatus according to any one of Supplementary Notes B1 to B6, wherein the communication processing unit is configured to transmit the quality related information to the base station or the core network node if the communication service quality is not achieved in unlicensed spectrum.

(Supplementary Note B8)

The terminal apparatus according to Supplementary Note B3 or B4, wherein the measurement is measurement of an achievement level of the communication service quality in unlicensed spectrum.

(Supplementary Note B9)

The terminal apparatus according to any one of Supplementary Notes B1 to B4 and 8, wherein the quality related information is information indicating an achievement level of the communication service quality in unlicensed spectrum.

(Supplementary Note B10)

The terminal apparatus according to Supplementary Note B8 or B9, the achievement level is a time ratio at which the communication service quality is achieved in unlicensed spectrum.

(Supplementary Note B11)

The terminal apparatus according to any one of Supplementary Notes B1 to B10, wherein the communication processing unit is configured to transmit, to the base station, a measurement report message including the quality related information.

(Supplementary Note B12)

The terminal apparatus according to any one of Supplementary Notes B1 to B11, wherein the information obtaining unit is configured to obtain preference information on use of unlicensed spectrum, and the communication processing unit is configured to transmit the preference information to the base station or the core network node.

(Supplementary Note B13)

The terminal apparatus according to any one of Supplementary Notes B1 to B12, wherein the information obtaining unit is configured to obtain location information indicating a location of the terminal apparatus or moving speed information indicating a moving speed of the terminal apparatus, and the communication processing unit configured to transmit the location information or the moving speed information to the base station or the core network node.

(Supplementary Note B14)

The terminal apparatus according to any one of Supplementary Notes B1 to B13, wherein the information obtaining unit is configured to obtain traffic information indicating traffic of the terminal apparatus or a communication bearer of the terminal apparatus in licensed spectrum or unlicensed spectrum, and the communication processing unit is configured to transmit the traffic information to the base station or the core network node.

(Supplementary Note B15)

A base station comprising:

an information obtaining unit configured to obtain quality related information related to achievement status of communication service quality for unlicensed spectrum in unlicensed spectrum; and the first communication processing unit configured to transmit the quality related information to a core network node.

(Supplementary Note B16)

The base station according to Supplementary Note B15, wherein the communication service quality is communication service quality for a communication bearer, and the quality related information is information generated per communication bearer.

(Supplementary Note B17)

The base station according to Supplementary Note B15 or B16, further comprising:

a second communication processing unit configured to receive the quality related information form a terminal apparatus.

(Supplementary Note B18)

The base station according to any one of Supplementary Notes B15-B17, further comprising:

a measurement unit configured to perform measurement for the achievement status and generate the quality related information.

(Supplementary Note B19)

The base station according to Supplementary Note B18, wherein the first communication processing unit is configured to receive first control information indicating the communication service quality, and the measurement unit is configured to perform the measurement based on the first control information.

(Supplementary Note B20)

The base station according to any one of Supplementary Notes B15-B19, wherein the quality related information is information indicating an achievement level of the communication service quality in unlicensed spectrum.

(Supplementary Note B21)

The base station according to Supplementary Note B20, wherein the achievement level is a time ratio at which the communication service quality is achieved in unlicensed spectrum.

(Supplementary Note B22)

The base station according to any one of Supplementary Notes B15-B21, wherein the information obtaining unit is configured to obtain location information indicating a location of the base station or moving speed information indicating a moving speed of the base station, the first communication processing unit is configured to transmit the location information or the moving speed information to the core network node.

(Supplementary Note B23)

The base station according to any one of Supplementary Notes B15-B22, wherein the quality related information is information for a terminal apparatus communicating with the base station, the information obtaining unit is configured to obtain traffic information indicating traffic of the terminal apparatus or a communication bearer of the terminal apparatus in licensed spectrum or unlicensed spectrum, and the first communication processing unit is configured to transmit the traffic information to the base station or the core network node.

(Supplementary Note B24)

The base station according to any one of Supplementary Notes B15-B23, wherein the quality related information is information for a terminal apparatus communicating with the base station, the base station further comprises a second communication processing unit configured to receive, from the terminal apparatus, preference information on use of unlicensed spectrum, location information indicating a location of the terminal apparatus, moving speed information indicating a moving speed of the terminal apparatus, or traffic information indicating traffic of the terminal apparatus or a communication bearer of the terminal apparatus in licensed spectrum or unlicensed spectrum, and the first communication processing unit is configured to transmit, to the core network, the preference information, the location information, the moving speed information or the traffic information.

(Supplementary Note B25)

The base station according to any one of Supplementary Notes B15-B24, wherein the information obtaining unit is configured to obtain usage status information indicating usage status of unlicensed spectrum for a communication bearer, and the first communication processing unit is configured to transmit the usage status information to the core network node or another core network node.

(Supplementary Note B26)

A base station comprising:

an information obtaining unit configured to obtain quality related information for a terminal apparatus communicating with the base station, the quality related information being related to achievement status of communication service quality for unlicensed spectrum in unlicensed spectrum; and a communication processing unit configured to perform, based on the quality related information, switch of spectrum or a base station for the terminal apparatus.

(Supplementary Note B27)

The base station according to Supplementary Note B26, wherein the quality related information is information indicating that the communication service quality is not achieved in unlicensed spectrum.

(Supplementary Note B28)

The base station according to Supplementary Note B26 or B27, wherein the communication service quality is communication service quality for a communication bearer, the communication related information is information generated per communication bearer, and the switch is switch of spectrum or base station for a communication bearer of the terminal apparatus.

(Supplementary Note B29)

The base station according to any one of Supplementary Notes B26-B28, wherein the communication processing unit is configured to perform the switch based on the quality related information and status of communication in unlicensed spectrum.

(Supplementary Note B30)

The base station according to Supplementary Note B29, wherein the status includes at least one of status of interference in unlicensed spectrum and status of radar in unlicensed spectrum.

(Supplementary Note B31)

The base station according to any one of Supplementary Notes B26-B30, wherein the switch is switch from unlicensed spectrum to licensed spectrum, or switch from unlicensed spectrum to other unlicensed spectrum.

(Supplementary Note B32)

A core network node comprising:

an information obtaining unit configured to obtain quality related information related to achievement status of communication service quality for unlicensed spectrum in unlicensed spectrum; and a generating unit configured to generate, based on the quality related information, first control information indicating the communication service quality or second control information related to which of licensed spectrum and unlicensed spectrum is used.

(Supplementary Note B33)

The core network node according to Supplementary Note B32, wherein the quality related information is information indicating an achievement level of the communication service quality in unlicensed spectrum.

(Supplementary Note B34)

The core network node according to Supplementary Note B32 or B33, wherein the communication service quality is communication service quality for a communication bearer, and the communication related information, the first control information and the second control information are information generated per communication bearer.

(Supplementary Note B35)

The core network node according to any one of Supplementary Notes B32 to B34, wherein the first control information and the second control information are information generated for a terminal apparatus based on terminal related information related to the terminal apparatus, and the terminal related information includes the quality related information.

(Supplementary Note B36)

The core network node according to Supplementary Note B35, wherein the terminal related information includes moving speed information indicating a moving speed of at least one of the terminal apparatus and a base station communicating with the terminal apparatus, or location information indicating a location of at least one of the terminal apparatus and the base station.

(Supplementary Note B37)

The core network node according to Supplementary Note B35 or B36, wherein the terminal related information includes preference information on use of unlicensed spectrum, the preference information being provided by the terminal apparatus.

(Supplementary Note B38)

The core network node according to any one of Supplementary Notes B35 to B37, wherein the terminal related information includes traffic information indicating traffic of the terminal apparatus or a communication bearer of the terminal apparatus in licensed spectrum or unlicensed spectrum.

(Supplementary Note B39)

The core network node according to any one of Supplementary Notes B35 to B38, wherein the terminal related information includes subscriber information on use of unlicensed spectrum, the subscriber information being stored in a core network for the terminal apparatus.

(Supplementary Note B40)

The core network node according to any one of Supplementary Notes B35 to B39, wherein the terminal related information includes charging information for the terminal apparatus.

(Supplementary Note B41)

A method comprising:

obtaining quality related information related to achievement status of communication service quality for unlicensed spectrum in unlicensed spectrum; and transmitting the quality related information to a base station or a core network node.

(Supplementary Note B42)

A method comprising:

obtaining quality related information related to achievement status of communication service quality for unlicensed spectrum in unlicensed spectrum; and transmitting the quality related information to a core network node.

(Supplementary Note B43)

A method comprising:

obtaining quality related information for a terminal apparatus communicating with a base station, the quality related information being related to achievement status of communication service quality for unlicensed spectrum in unlicensed spectrum; and performing, based on the quality related information, switch of spectrum or a base station for the terminal apparatus.

(Supplementary Note B44)

A method comprising:

obtaining quality related information related to achievement status of communication service quality for unlicensed spectrum in unlicensed spectrum; and generating, based on the quality related information, first control information indicating the communication service quality or second control information related to which of licensed spectrum and unlicensed spectrum is used.

(Supplementary Note B45)

A program that causes a processor to execute:

obtaining quality related information related to achievement status of communication service quality for unlicensed spectrum in unlicensed spectrum; and transmitting the quality related information to a base station or a core network node.

(Supplementary Note B46)

A program that causes a processor to execute:

obtaining quality related information related to achievement status of communication service quality for unlicensed spectrum in unlicensed spectrum; and transmitting the quality related information to a core network node.

(Supplementary Note B47)

A program that causes a processor to execute:

obtaining quality related information for a terminal apparatus communicating with a base station, the quality related information being related to achievement status of communication service quality for unlicensed spectrum in unlicensed spectrum; and performing, based on the quality related information, switch of spectrum or a base station for the terminal apparatus.

(Supplementary Note B48)

A program that causes a processor to execute:

obtaining quality related information related to achievement status of communication service quality for unlicensed spectrum in unlicensed spectrum; and generating, based on the quality related information, first control information indicating the communication service quality or second control information related to which of licensed spectrum and unlicensed spectrum is used.

(Supplementary Note B49)
A non-transitory computer readable recording medium having recorded thereon a program that causes a processor to execute:
obtaining quality related information related to achievement status of communication service quality for unlicensed spectrum in unlicensed spectrum; and
transmitting the quality related information to a base station or a core network node.
(Supplementary Note B50)
A non-transitory computer readable recording medium having recorded thereon a program that causes a processor to execute:
obtaining quality related information related to achievement status of communication service quality for unlicensed spectrum in unlicensed spectrum; and
transmitting the quality related information to a core network node.
(Supplementary Note B51)
A non-transitory computer readable recording medium having recorded thereon a program that causes a processor to execute:
obtaining quality related information for a terminal apparatus communicating with a base station, the quality related information being related to achievement status of communication service quality for unlicensed spectrum in unlicensed spectrum; and
performing, based on the quality related information, switch of spectrum or a base station for the terminal apparatus.
(Supplementary Note B52)
A non-transitory computer readable recording medium having recorded thereon a program that causes a processor to execute:
obtaining quality related information related to achievement status of communication service quality for unlicensed spectrum in unlicensed spectrum; and
generating, based on the quality related information, first control information indicating the communication service quality or second control information related to which of licensed spectrum and unlicensed spectrum is used.

INDUSTRIAL APPLICABILITY

In a mobile communication system, it is possible to provide a good communication service even when unlicensed spectrum is used.

REFERENCE SIGNS LIST 1, 1000, 2000 System
100 First Core Network Node, MME, AMF/SMF
200 Second Core Network Node, PCRF, PCF
600, 2200 Base Station, eNB, gNB, ng-eNB
700, 2100 Terminal Apparatus, UE
1100 Communication Apparatus
1200 Communication Node
2300 Core Network Node

What is claimed is:
1. A communication apparatus comprising:
a memory storing instructions; and
one or more processors configured to execute the instructions to:
obtain first control information indicating communication service quality for unlicensed spectrum and second control information regarding which of licensed spectrum and unlicensed spectrum is used; and
transmit the first control information and the second control information to a communication node which communicates in a radio access network,
wherein the second control information is information generated for a terminal apparatus based on terminal related information related to the terminal apparatus, the terminal related information including quality related information indicating an achievement level of communication service quality for the unlicensed spectrum, the achievement level being a time ratio at which the communication service quality is achieved in the unlicensed spectrum.
2. The communication apparatus according to claim 1, wherein the first control information is one or more quality of service (QoS) parameters for unlicensed spectrum.
3. The communication apparatus according to claim 2, wherein the one or more QoS parameters includes one or more downlink QoS parameters for unlicensed spectrum or one or more uplink QoS parameters for unlicensed spectrum.
4. The communication apparatus according to claim 2, wherein the one or more QoS parameters includes one or more communication bearer level QoS parameters for unlicensed spectrum.
5. The communication apparatus according to claim 4, wherein the one or more communication bearer level QoS parameters includes at least one of a quality class identifier (QCI), an allocation and retention priority (ARP), a guaranteed bitrate (GBR), a maximum bitrate (MBR), a packet delay budget (PDB) and a packet error loss rate (PELR) for unlicensed spectrum.
6. The communication apparatus according to claim 2, wherein the one or more QoS parameters includes an aggregated maximum bitrate (AMBR) for unlicensed spectrum.
7. The communication apparatus according to claim 1, wherein the one or more processors are further configured to execute the instructions to:
obtain the first control information and second control information regarding which of licensed spectrum and unlicensed spectrum is used; and
transmit the first control information and the second control information to the communication node.
8. The communication apparatus according to claim 7, wherein the second control information is information generated for a terminal apparatus based on terminal related information related to the terminal apparatus.
9. The communication apparatus according to claim 1, wherein the first control information is information generated for a terminal apparatus based on terminal related information related to the terminal apparatus.
10. The communication apparatus according to claim 8, wherein the terminal related information includes preference information on use of unlicensed spectrum, the preference information being provided by the terminal apparatus.
11. The communication apparatus according to claim 8, wherein the terminal related information includes subscriber information on use of unlicensed spectrum, the subscriber information being stored in a core network for the terminal apparatus.
12. The communication apparatus according to claim 8, wherein the terminal related information includes moving speed information indicating a moving speed of at least one of the terminal apparatus and a base station communicating with the terminal apparatus, or location information indicating a location of at least one of the terminal apparatus and the base station.

13. The communication apparatus according to claim 8, wherein the terminal related information includes quality related information related to achievement status of communication service quality for unlicensed spectrum in unlicensed spectrum.

14. The communication apparatus according to claim 8, wherein the terminal related information includes charging information for the terminal apparatus.

15. The communication apparatus according to claim 8, wherein the terminal related information includes traffic information indicating traffic of the terminal apparatus or a bearer of the terminal apparatus in licensed spectrum or unlicensed spectrum.

16. The communication apparatus according to claim 1, wherein
    the communication apparatus is a core network node, and
    the communication node is a base station or a terminal apparatus.

17. The communication apparatus according to claim 1, wherein
    the communication apparatus is an apparatus for operation and maintenance, and
    the communication node is a base station.

18. The communication apparatus according to claim 1, wherein
    the communication apparatus is a base station, and
    the communication node is another base station or a terminal apparatus.

19. A base station comprising:
    a memory storing instructions; and
    one or more processors configured to execute the instructions to:
        receive first control information indicating communication service quality for unlicensed spectrum and second control information regarding which of licensed spectrum and unlicensed spectrum is used; and
        perform, based on the first control information and the second control information, control of radio communication using unlicensed spectrum,
    wherein the second control information is information generated for a terminal apparatus based on terminal related information related to the terminal apparatus, the terminal related information including quality related information indicating an achievement level of communication service quality for the unlicensed spectrum, the achievement level being a time ratio at which the communication service quality is achieved in the unlicensed spectrum.

20. A terminal apparatus comprising:
    a memory storing instructions; and
    one or more processors configured to execute the instructions to:
        receive first control information indicating communication service quality for unlicensed spectrum; and
        perform, based on the first control information, measurement of achievement level of the communication service quality in unlicensed spectrum,
    wherein the one or more processors is further configured to execute the instructions to:
        receive second control information regarding which of licensed spectrum and unlicensed spectrum is used and being generated per communication bearer; and
        determine, based on the second control information, a spectrum to be used for the communication bearer corresponding to the second control information.

* * * * *